United States Patent [19]
Okita

[11] Patent Number: 6,052,410
[45] Date of Patent: Apr. 18, 2000

[54] TRANSMISSION APPARATUS, RECEPTION APPARATUS AND COMMUNICATION APPARATUS AS WELL AS MODEM SIGNAL TRANSMISSION AND RECEPTION METHOD

[75] Inventor: Ryoji Okita, Kawasaki, Japan

[73] Assignee: Fujitsu Limited, Kawasaki, Japan

[21] Appl. No.: 08/953,649

[22] Filed: Oct. 17, 1997

[30] Foreign Application Priority Data

Nov. 18, 1996  [JP]  Japan ................................. 8-306466
Nov. 19, 1996  [JP]  Japan ................................. 8-308540

[51] Int. Cl.⁷ ....................................... H04B 1/38
[52] U.S. Cl. ..................... 375/222; 375/296; 375/340; 375/371
[58] Field of Search ..................... 375/219, 220, 375/221, 222, 223, 257, 269, 273, 295, 296, 340, 346, 371; 332/100, 103, 117, 114; 379/90.01, 100.01; 395/200.3

[56] References Cited

U.S. PATENT DOCUMENTS 4,542,369  9/1985  Kasuga ................................. 341/144

FOREIGN PATENT DOCUMENTS

| 0 118 762 | 9/1984 | European Pat. Off. . |
| 0 585 089A2 | 3/1994 | European Pat. Off. . |
| 1 444 216 | 7/1976 | United Kingdom . |
| 2 183 115A | 5/1987 | United Kingdom . |
| 2 247 370A | 2/1992 | United Kingdom . |
| 2 293 288 | 3/1996 | United Kingdom . |

Primary Examiner—Stephen Chin
Assistant Examiner—Chieh M. Fan
Attorney, Agent, or Firm—Armstrong, Westerman, Hattori, McLeland & Naughton

[57] ABSTRACT

A transmission apparatus applied as a modem connected to a private branch exchange discriminates coordinates of an analog signal inputted thereto on a two-dimensional coordinate plane and transmits the signal, whose coordinates have been discriminated, as a digital signal. The transmission apparatus includes a frequency shifting section for performing frequency shifting for the inputted analog signal so that a tone signal of a single frequency may be a dc signal, and a coordinate discrimination section for discriminating coordinates on the two-dimensional coordinate plane of the analog signal for which the frequency shifting by the frequency shifting section has been performed. By the transmission apparatus, a single tone signal is transmitted without suffering from deterioration of the S/N ratio and so forth.

13 Claims, 33 Drawing Sheets

F I G. 13
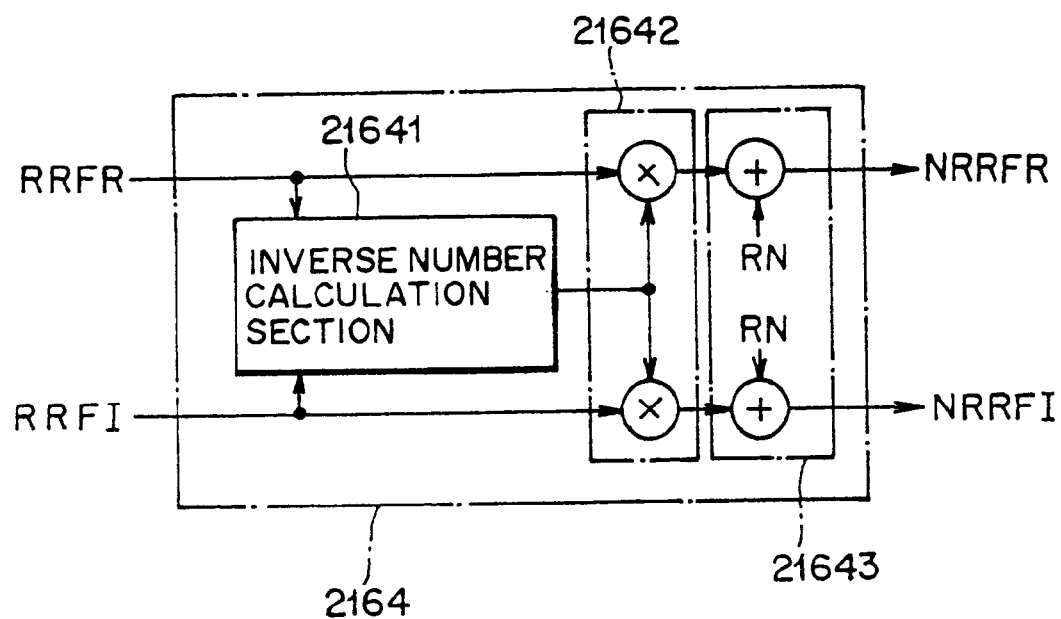

FIG. 14

| 1300Hz | $\cos\theta_1$ | $\sin\theta_1$ |
| --- | --- | --- |
| 900Hz | $\cos\theta_2$ | $\sin\theta_2$ |
| 600Hz | $\cos\theta_3$ | $\sin\theta_3$ |
| 300Hz | $\cos\theta_4$ | $\sin\theta_4$ |

215A-1

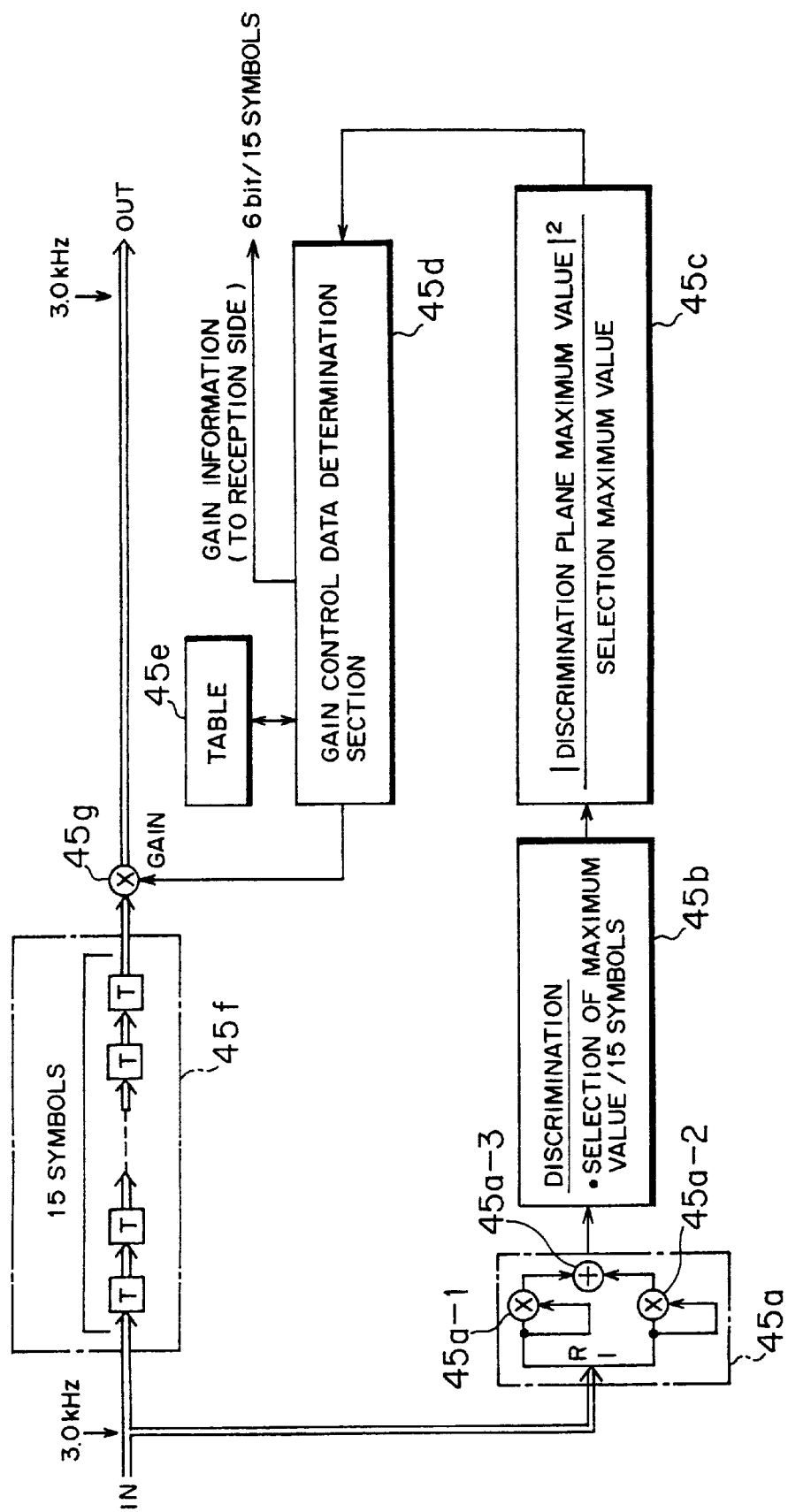

FIG. 18

| INPUT: $r^2$ | | GAIN | | GAIN INFORMATION | INPUT: $r^2$ | | GAIN | | GAIN INFORMATION |
|---|---|---|---|---|---|---|---|---|---|
| dBm | HEX | dB | HEX | | dBm | HEX | dB | HEX | |
| $-\infty$ | 0000 | $-\infty$ | 0000 | 0 | -24 | $(2E-3)^2 \times 104E$ | +24 | $2E3 \times 7ECB$ | 38 |
| -61 | $(2E-10)^2 \times 354E$ | +61 | $2E10 \times 4620$ | 1 | -23 | $(2E-3)^2 \times 1487$ | +23 | $2E3 \times 7101$ | 39 |
| | | | | | -22 | $(2E-3)^2 \times 19D8$ | +22 | $2E3 \times 64B7$ | 40 |
| -60 | $(2E-9)^2 \times 10C7$ | +60 | $2E9 \times 7D00$ | 2 | -21 | $(2E-3)^2 \times 2089$ | +21 | $2E3 \times 59C3$ | 41 |
| -59 | $(2E-9)^2 \times 151F$ | +59 | $2E9 \times 6F68$ | 3 | -20 | $(2E-3)^2 \times 28F6$ | +20 | $2E3 \times 5000$ | 42 |
| -58 | $(2E-9)^2 \times 1A97$ | +58 | $2E9 \times 634A$ | 4 | -19 | $(2E-3)^2 \times 3391$ | +19 | $2E3 \times 474D$ | 43 |
| -57 | $(2E-9)^2 \times 217A$ | +57 | $2E9 \times 587E$ | 5 | | | | | |
| -56 | $(2E-9)^2 \times 2A24$ | +56 | $2E9 \times 4EDF$ | 6 | -18 | $(2E-2)^2 \times 103B$ | +18 | $2E2 \times 7F18$ | 44 |
| -55 | $(2E-9)^2 \times 350E$ | +55 | $2E9 \times 464B$ | 7 | -17 | $(2E-2)^2 \times 146E$ | +17 | $2E2 \times 7145$ | 45 |
| | | | | | -16 | $(2E-2)^2 \times 19B9$ | +16 | $2E2 \times 64F4$ | 46 |
| -54 | $(2E-8)^2 \times 10B3$ | +54 | $2E8 \times 7D4C$ | 8 | -15 | $(2E-2)^2 \times 2062$ | +15 | $2E2 \times 59FA$ | 47 |
| -53 | $(2E-8)^2 \times 1505$ | +53 | $2E8 \times 6FAC$ | 9 | -14 | $(2E-2)^2 \times 28C4$ | +14 | $2E2 \times 5031$ | 48 |
| -52 | $(2E-8)^2 \times 1A77$ | +52 | $2E8 \times 6387$ | 10 | -13 | $(2E-2)^2 \times 3352$ | +13 | $2E2 \times 4778$ | 49 |
| -51 | $(2E-8)^2 \times 2151$ | +51 | $2E8 \times 58B4$ | 11 | | | | | |
| -50 | $(2E-8)^2 \times 29F1$ | +50 | $2E8 \times 4F0F$ | 12 | -12 | $(2E-1)^2 \times 1027$ | +12 | $2E1 \times 7F65$ | 50 |
| -49 | $(2E-8)^2 \times 34CE$ | +49 | $2E8 \times 4676$ | 13 | -11 | $(2E-1)^2 \times 1456$ | +11 | $2E1 \times 718A$ | 51 |
| | | | | | -10 | $(2E-1)^2 \times 199A$ | +10 | $2E1 \times 6531$ | 52 |
| -48 | $(2E-7)^2 \times 109E$ | +48 | $2E7 \times 7D98$ | 14 | -9 | $(2E-1)^2 \times 203A$ | +9 | $2E1 \times 5A30$ | 53 |
| -47 | $(2E-7)^2 \times 14EC$ | +47 | $2E7 \times 6FF0$ | 15 | -8 | $(2E-1)^2 \times 2893$ | +8 | $2E1 \times 5061$ | 54 |
| -46 | $(2E-7)^2 \times 1A57$ | +46 | $2E7 \times 63C3$ | 16 | -7 | $(2E-1)^2 \times 3314$ | +7 | $2E1 \times 47A4$ | 55 |
| -45 | $(2E-7)^2 \times 2129$ | +45 | $2E7 \times 58EA$ | 17 | | | | | |
| -44 | $(2E-7)^2 \times 29BF$ | +44 | $2E7 \times 4F3F$ | 18 | -6 | $(2E-0)^2 \times 1013$ | +6 | $2E0 \times 7FB2$ | 56 |
| -43 | $(2E-7)^2 \times 348E$ | +43 | $2E7 \times 46A0$ | 19 | -5 | $(2E-0)^2 \times 143D$ | +5 | $2E0 \times 71CF$ | 57 |
| | | | | | -4 | $(2E-0)^2 \times 197B$ | +4 | $2E0 \times 656F$ | 58 |
| -42 | $(2E-6)^2 \times 108A$ | +42 | $2E6 \times 7DF4$ | 20 | -3 | $(2E-0)^2 \times 2013$ | +3 | $2E0 \times 5A67$ | 59 |
| -41 | $(2E-6)^2 \times 14D3$ | +41 | $2E6 \times 7034$ | 21 | -2 | $(2E-0)^2 \times 2862$ | +2 | $2E0 \times 5092$ | 60 |
| -40 | $(2E-6)^2 \times 1A37$ | +40 | $2E6 \times 6400$ | 22 | -1 | $(2E-0)^2 \times 32D6$ | +1 | $2E0 \times 47CF$ | 61 |
| -39 | $(2E-6)^2 \times 2101$ | +39 | $2E6 \times 5920$ | 23 | 0 | $(2E-0)^2 \times 4000$ | 0 | $2E0 \times 4000$ | 62 |
| -38 | $(2E-6)^2 \times 298C$ | +38 | $2E6 \times 4F6F$ | 24 | | | | | |
| -37 | $(2E-6)^2 \times 344E$ | +37 | $2E6 \times 46CB$ | 25 | +1 | $(2E+1)^2 \times 1425$ | -1 | $2E-1 \times 7215$ | 63 |
| | | | | | +2 | $(2E+1)^2 \times 195C$ | -2 | $2E-1 \times 65AD$ | — |
| -36 | $(2E-5)^2 \times 1076$ | +36 | $2E5 \times 7E31$ | 26 | +3 | $(2E+1)^2 \times 1FBD$ | -3 | $2E-1 \times 5A9E$ | — |
| -35 | $(2E-5)^2 \times 14B9$ | +35 | $2E5 \times 7078$ | 27 | +4 | $(2E+1)^2 \times 2831$ | -4 | $2E-1 \times 50C3$ | — |
| -34 | $(2E-5)^2 \times 1A17$ | +34 | $2E5 \times 643D$ | 28 | +5 | $(2E+1)^2 \times 3299$ | -5 | $2E-1 \times 47FB$ | — |
| -33 | $(2E-5)^2 \times 20D9$ | +33 | $2E5 \times 5956$ | 29 | +6 | $(2E+1)^2 \times 3FB2$ | -6 | $2E-1 \times 4027$ | — |
| -32 | $(2E-5)^2 \times 295A$ | +32 | $2E5 \times 4F9F$ | 30 | +7 | $(2E+1)^2 \times 5031$ | -7 | $2E-1 \times 392D$ | — |
| -31 | $(2E-5)^2 \times 340F$ | +31 | $2E5 \times 46F6$ | 31 | | | | | |
| -30 | $(2E-4)^2 \times 1062$ | +30 | $2E4 \times 7E7E$ | 32 | | | | | |
| -29 | $(2E-4)^2 \times 14A0$ | +29 | $2E4 \times 70BC$ | 33 | | | | | |
| -28 | $(2E-4)^2 \times 19F8$ | +28 | $2E4 \times 647A$ | 34 | | | | | |
| -27 | $(2E-4)^2 \times 20B1$ | +27 | $2E4 \times 598D$ | 35 | | | | | |
| -26 | $(2E-4)^2 \times 2928$ | +26 | $2E4 \times 4FCF$ | 36 | | | | | |
| -25 | $(2E-4)^2 \times 33D0$ | +25 | $2E4 \times 4722$ | 37 | | | | | |

F I G. 20
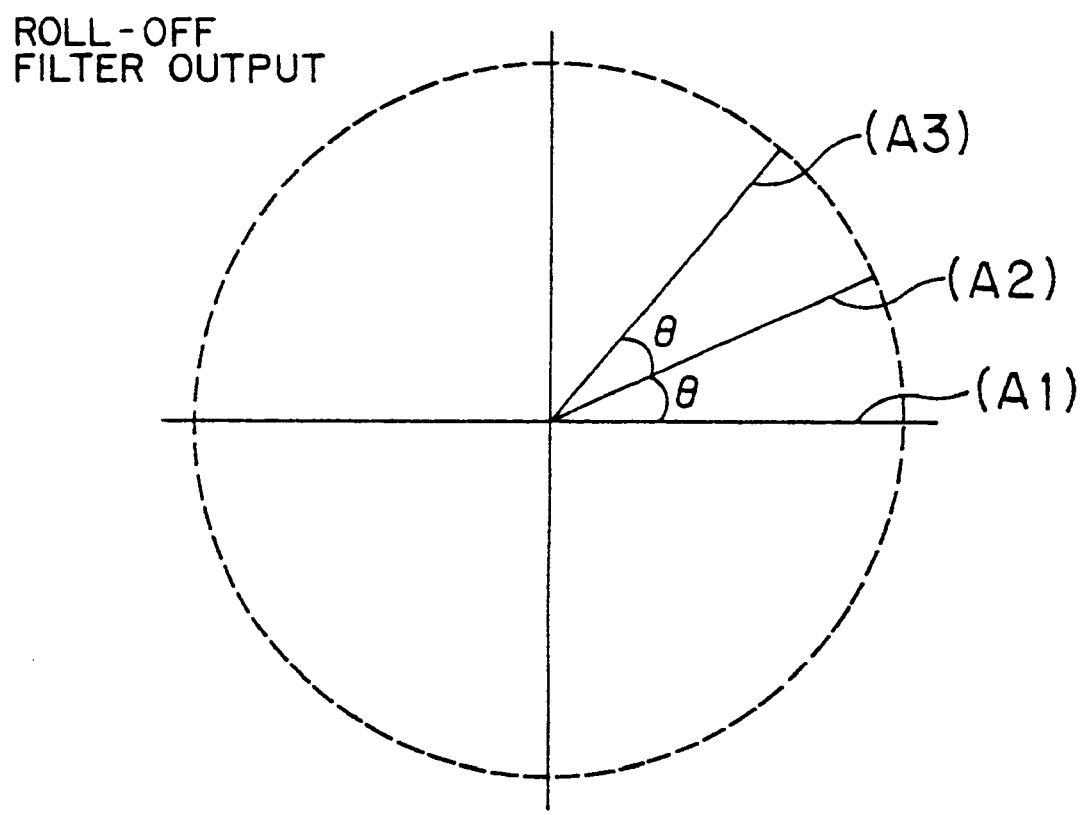

F I G. 21
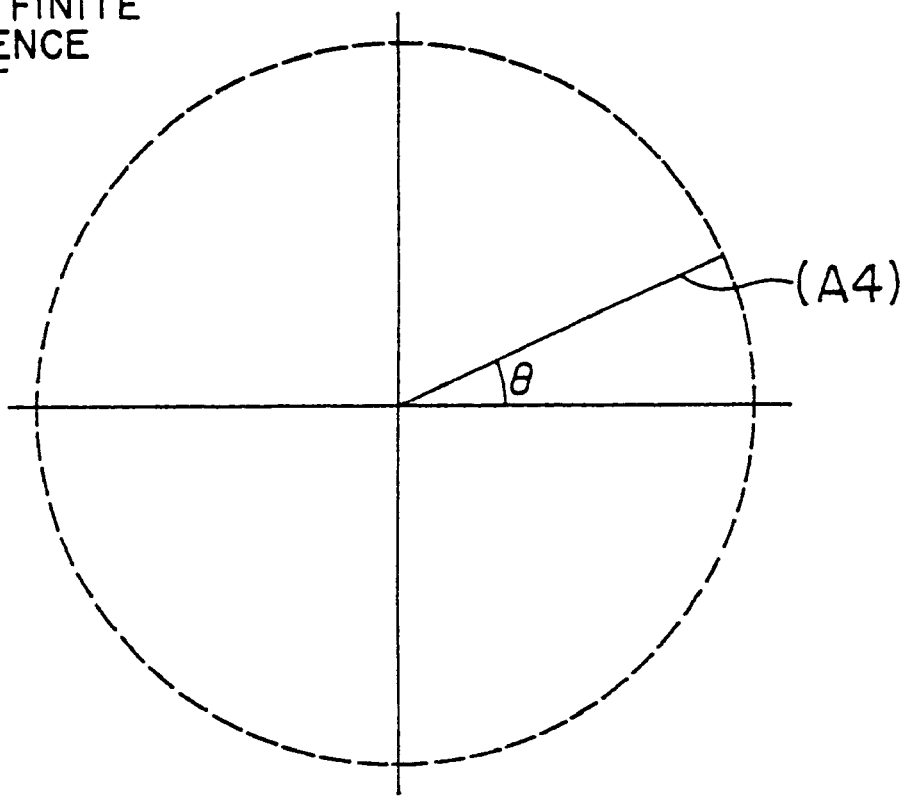

F I G. 22
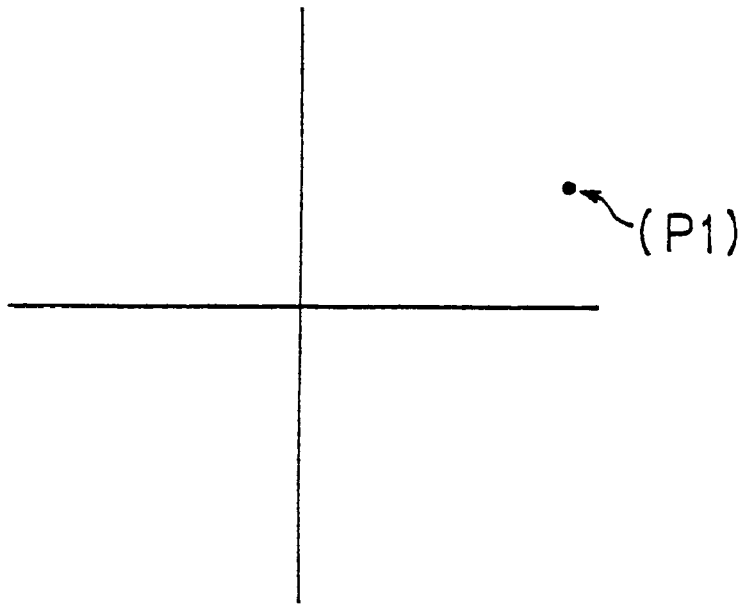

TRANSMISSION APPARATUS, RECEPTION APPARATUS AND COMMUNICATION APPARATUS AS WELL AS MODEM SIGNAL TRANSMISSION AND RECEPTION METHOD

BACKGROUND OF THE INVENTION

This invention relates to a modem signal transmission and reception apparatus which on one hand converts an analog signal such as voice or a carrier of a modem into digital data and transmits the digital data together with dial information and other information and on the other hand receives reception data from an opposing apparatus, and more particularly to a transmission apparatus, a reception apparatus and a communication apparatus as well as a modem signal transmission and reception method suitable for use with communication between apparatus connected to each other by a toll network connected via a metal circuit or an in-band ringer.

Generally, where communication is performed by a dedicated line such as a metal line between a telephone set or a FAX terminal accommodated in a private branch exchange (PBX) and another telephone set or another FAX terminal accommodated in another private branch exchange, an in-band ringer (IBR) or a modem (modulator-demodulator) is interposed on the dedicated line which interconnects the private branch exchanges as seen in FIG. 31.

Referring to FIG. 31, a private branch exchange 103 is connected to a dedicated line 111 as a toll network by an in-band ringer 104 and a modem 105 while another private branch exchange 108 is connected to the dedicated line 111 by another in-band ringer 107 and another modem 106.

The in-band ringer 104 performs signal conversion processing of dial information and other necessary information between the private branch exchange 103 and the dedicated line 111. Similarly, the in-band ringer 107 performs signal conversion processing of dial information and other necessary information between the private branch exchange 108 and the dedicated line 111. Both of the in-band ringers 104 and 107 use a single tone signal of, for example, approximately 3 kHz as a dial signal to be outputted to the dedicated line 111 side.

The modem 105 is connected to the opposing modem 106 via the dedicated line 111, and, on one hand, transmits a transmission analog signal from a terminal 101 or 102 on the private branch exchange 103 to the modem 106 and, on the other hand, receives an analog signal from a terminal 109 or 110 on the opposing private branch exchange 108 side.

Similarly, the modem 106, on one hand, transmits a transmission analog signal from the terminal 109 or 110 on the private branch exchange 108 side to the modem 105 and, on the other hand, receives an analog signal from the terminal 101 or 102 on the opposing private branch exchange 103 side.

Consequently, communication can be performed between a terminal accommodated in the private branch exchange 103 (for example, a FAX terminal 101 or a telephone terminal 102) and another terminal accommodated in the other private branch exchange 108 (for example, a FAX terminal 109 or a telephone terminal 110) via the in-band ringers 104 and 107, the modems 105 and 106 and the dedicated line 111.

Each of the modems 105 and 106 particularly includes such a modem signal transmission section 112 and a modem signal reception section 119 as shown in FIGS. 32 and 33, respectively.

Referring to FIG. 32, the modem signal transmission section 112 in the modem 105 includes an A/D conversion section 113, a demodulation section 114, a carrier generation section 115, a roll-off filter 116, a discrimination section 117 and a modem transmission processing section 118 (while the following description is given of the construction of the modem signal transmission section 112 paying attention to the modem 105, also the modem 106 has a similar construction).

The A/D conversion section 113 receives an analog signal (for example, of the voice band of 0.3 to 3.4 kHz) inputted from a FAX terminal 101 or a telephone terminal 102 via the private branch exchange 103 and the in-band ringer 104 and converts the analog signal into a digital signal at a sample rate of, for example, approximately 12 kHz.

The demodulation section 114 provides, to digital data from the A/D conversion section 113, angle information having a carrier frequency of, for example, approximately 1,700 Hz generated by the carrier generation section 115 for each predetermined angle to demodulate the analog signal into a base band signal.

The roll-off filter 116 performs decimation processing for a demodulation signal from the demodulation section 114 to effect conversion from a sample rate (approximately 12 kHz) into a symbol rate (for example, approximately 3,000 Hz) to decrease the amount of information and has a function as a filter for decimation processing.

It is to be noted that the frequency band of 1,700 Hz generated by the carrier generation section 115 and the frequency band of 3,000 Hz after conversion by the roll-off filter 116 described above can be used, taking the voice and the frequency bands prescribed in the Recommendations V.29, V.22 bis, V32 and so forth into consideration, commonly with them. Particularly, the demodulation frequency band of 1,700 Hz corresponds to the carrier frequency of the G3 FAX in the Recommendations V.29.

The discrimination section 117 receives a signal to which decimation processing has been performed by the roll-off filter 116, and discriminates coordinates on a two-dimensional plane to convert the amount of the signal having been demodulated into a base band signal into an amount of information necessary to transmit the signal on the dedicated line 111.

The modem transmission processing section 118 performs, for digital data as a result of the discrimination from the discrimination section 117, modem processing such as, for example, gray/natural conversion, finite summing, signal point generation, roll-off filter processing, modulation processing and D/A conversion processing. The modem signal (analog signal) obtained by such modem processing is transmitted to the modem 106 via the dedicated line 111.

Referring now to FIG. 33, the modem signal reception section 119 of the modem 106 includes a modem reception processing section 120, a roll-off filter 121, a modulation section 122, a carrier generation section 123, and a D/A conversion section 124 (while the following description is given of the construction of the modem signal reception section 119 paying attention to the modem 106, also the modem 105 has a similar construction).

The modem reception processing section 120 performs, for a signal received via the dedicated line 111 from the modem transmission processing section 118 of the opposing modem 105, reverse modem processing such as A/D conversion processing, demodulation processing, roll-off filter processing, automatic gain control, automatic equalization, carrier phase correction, signal point discrimination, and finite summing.

The roll-off filter 121 has a function as a filter for interpolation processing which performs interpolation processing (processing reverse to the decimation processing of the roll-off filter 116 on the transmission side described above) for a signal to which the reverse modem processing has been performed from the modem reception processing section 120.

By the filter processing by the roll-off filter 121, the original amount of information can be restored through conversion from a symbol rate (for example, approximately 3,000 Hz) to a sample rate (for example, approximately 12 kHz).

The modulation section 122 modulates an output signal of the roll-off filter 121 with a carrier frequency signal of approximately 1,700 Hz generated by the carrier generation section 123 to convert the base band signal back into a signal of the original frequency band (for example, for a voice signal, 0.3 to 3.4 kHz).

The D/A conversion section 124 converts a digital signal modulated by the modulation section 122 into an analog signal. The analog signal obtained by the conversion is outputted as an output of the modem signal reception section 119 to the in-band ringer 107.

In the communication system having the construction described above with reference to FIG. 31. When communication is to be performed, for example, between telephone terminals 102 and 110 or between FAX terminals 101 and 109, dial information for which signal conversion has been performed by the in-band ringers 104 and 107 is communicated between the private branch exchanges 103 and 108, and an analog signal such as a voice signal or a FAX signal is communicated via the modems 105 and 106 and the dedicated line 111.

For example, a voice signal as an analog signal from a telephone terminal 102 (or a FAX signal from a FAX terminal 101) is converted into a digital signal by the A/D conversion section 113 of the modem 105, demodulated by the demodulation section 114 and discriminated in regard to coordinates by the discrimination section 117.

Digital data as a result of the discrimination are transmitted, after they undergo modem processing by the modem transmission processing section 118, to a telephone terminal 110 of the other party via the dedicated line 111, modem 106, in-band ringer 107 and private branch exchange 108.

Further, for example, the discrimination section 117 of the modem signal transmission section 112 in the modem 105 performs discrimination not only of such an analog signal as described above but also of a tone signal (for example, of approximately 3 kHz) from the in-band ringer 104, and transmits the tone signal to the in-band ringer 107 via the dedicated line 111. The in-band ringer 107 recognizes the tone signal from the in-band ringer 104 of the transmission side.

However, since the modems 105 and 106 in such a communication system as shown in FIG. 31 are limited in number of discrimination points which form a discrimination plane in the discrimination section 117, when a tone signal is to be transmitted, if the output of the roll-off filter 116 is used as it is for discrimination, then a discrimination error which does not satisfy an S/N ratio (signal to noise ratio) required for the tone signal sometimes occurs.

In other words, if the roll-off filter output regarding a tone signal from the in-band ringer 104 (107) on the origination side is used as it is for discrimination by the discrimination section 117, then discrimination sometimes results in failure because of a discrimination error which satisfies the required S/N ratio.

The communication system has a subject to be solved in that, in this instance, the in-band ringer 107 (104) on the termination side cannot recognize the tone signal from the origination side and the dial information from the transmission side cannot be notified accurately to the reception side.

SUMMARY OF THE INVENTION

It is an object of the present invention to provide a transmission apparatus, a reception apparatus and a communication apparatus as well as a modem signal transmission and reception method by which a pure tone signal which satisfies a requested S/N ratio is transmitted to allow the tone signal to be recognized with certainty on the termination side.

In order to attain the object described above, according to an aspect of the present invention, there is provided a transmission apparatus wherein coordinates of an analog signal inputted thereto on a two-dimensional coordinate plane are discriminated and the signal with which the coordinates have been discriminated is transmitted as a digital signal, comprising a frequency shifting section for performing frequency shifting for the inputted analog signal so that a tone signal of a single frequency may be a dc signal, and a coordinate discrimination section for discriminating coordinates on the two-dimensional coordinate plane of the analog signal for which the frequency shifting by the frequency shifting section has been performed.

With the transmission apparatus, even when a single tone is to be transmitted using a modem, the tone signal can be transmitted without suffering from deterioration of the S/N ratio thereof. Consequently, also an in-band ringer or a like apparatus can recognize the single tone signal with certainty.

Further, since, when a tone signal is to be sent out, coordinate discrimination on the fixed frequency is performed by the frequency shifting section, the single tone signal is always discriminated as the same coordinates, movement of the discrimination point is eliminated. Consequently, the transmission apparatus is advantageous in that the SIN ratio of a signal can be improved.

The transmission apparatus may further comprise a discrimination point judgment section for receiving a result of the coordinate discrimination from the coordinate discrimination section and discriminating whether or not a same discrimination result is successively obtained, a phase difference detection section for detecting, when the same discrimination result successively appears, a phase difference between a phase of the signal for which the frequency shifting has been performed and a phase of an output signal of the coordinate discrimination section, and a phase correction section for correcting the phase of the signal frequency shifted by the frequency shifting section with the phase difference detected by the phase difference detection section and outputting the signal of the corrected phase to the coordinate discrimination section.

Accordingly, when a tone signal is to be sent out, in order to prevent movement of a discrimination point or a like phenomenon arising from a deviation of the tone signal, the phase difference between the phase of the signal for which the frequency shifting has been performed and the phase of the discriminated signal is detected, and the phase error of the frequency shifted signal can be corrected with the phase difference. Consequently, movement of a discrimination point when a single tone signal is sent out can be prevented.

Particularly, although movement of a discrimination point must be prevented when a single tone signal is sent out, since a countermeasure for preventing movement of a discrimination point need not be taken for a signal whose phase exhibits a variation also when frequency phase shifting is performed such as ordinary voice, the necessity to effect unnecessary phase error correction is eliminated by performing phase error correction only while a single tone signal continues to be sent out.

Here, the discrimination of whether or not a tone signal is a single tone signal can be performed making use of the fact that, while a tone signal converted into a dc signal is disposed at the same point, the same discrimination point does not successively appear with a voice signal and so forth. Thus, whether or not a single tone signal is being sent out can be discriminated by a simple method.

Or, the transmission apparatus may further comprise a demodulation section for demodulating the inputted analog signal with a carrier signal having a fixed frequency, the frequency shifting section shifting the frequency of the inputted analog signal by an amount corresponding to a finite difference between the frequency of the tone signal and the frequency of the carrier signal.

With the transmission apparatus, also when a single tone is transmitted using a modem, it can be transmitted without suffering from a deterioration of the S/N ratio thereof. Consequently, there is an advantage that also an in-band ringer or a like element can recognize a single tone signal with certainty.

Further, since coordinate discrimination on the fixed frequency is performed when a tone signal is to be sent out, a single tone signal is always discriminated as the same coordinates and movement of the discrimination point is eliminated. Consequently, the transmission apparatus is advantageous in that the S/N ratio of a signal can be improved.

The transmission apparatus may be constructed otherwise such that an amount of the phase shifting by the frequency shifting section can be set in response to the single frequency of the tone signal included in the inputted analog signal.

Where the transmission apparatus is constructed in this manner, since the frequency shift amount of the frequency shifting section can be set in response to a single frequency of the tone signal included in the inputted analog signal, the transmission apparatus is advantageous in that, also where tone signals having different frequencies from each other are used with an in-band ringer, the individual tone signals can be converted into dc signals and transmitted via a dedicated line so that they do not suffer from deterioration in S/N ratio, and also on the reception side, the signal received can be reproduced correctly.

According to another aspect of the present invention, there is provided a transmission apparatus, comprising a demodulation section for demodulating a transmission signal with a fixed carrier frequency, a phase finite difference calculation section for calculating phase finite differences of the demodulation signal successively outputted from the demodulation section, a transmission side single tone discrimination section for discriminating whether or not the demodulation signal demodulated by the demodulation section is a single tone signal, a coordinate discrimination section for discriminating coordinates of the demodulation signal from the demodulation section or the phase finite difference signal from the phase finite difference calculation section, and a signal transmission section for transmitting a result of the discrimination of the coordinate discrimination section, the coordinate discrimination section performing, when a result of the discrimination of the transmission side single tone discrimination section proves that the demodulation signal is not a single tone signal, coordinate discrimination of the demodulation signal from the demodulation section, but when the demodulation signal is a single tone signal, the coordinate discrimination section performing coordinate discrimination of the phase finite difference signal from the phase finite difference calculation section.

According to a further aspect of the present invention, there is provided a transmission apparatus, comprising a demodulation section for demodulating a transmission signal with a fixed carrier frequency, a phase finite difference calculation section for calculating phase finite differences of the demodulation signal successively outputted from the demodulation section, a coordinate discrimination section for performing coordinate discrimination of an output of the phase finite difference calculation section, a phase error detection section for detecting a phase error based on a coordinate discrimination result from the coordinate discrimination section and a phase finite difference calculation result from the phase finite difference calculation section, and a transmission side single tone discrimination section for discriminating whether or not the demodulation signal inputted to the phase finite difference calculation section is a single tone signal, the phase error information detected by the phase error detection section being fed back, when the single tone discrimination section discriminates that the demodulation signal is not a single tone signal, to the phase finite difference calculation section, but when the demodulation signal is a single tone signal, the feeding back of the phase error information detected by the phase error detection section to the phase finite difference calculation section being stopped.

With the transmission apparatus, when it is discriminated that a demodulation signal is not a single tone signal, phase error information detected by the phase error detection section can be fed back to the phase finite difference calculation section. On the other hand, when it is discriminated that the demodulation signal is a single tone signal, the feeding back of the phase error information detected by the phase error detection section to the phase finite difference calculation section can be stopped. Consequently, accumulation of phase errors which arise from the fact that a phase finite difference signal regarding transmission data which is not a single tone signal is discriminated can be suppressed by the feedback control.

Each of the transmission apparatus may be constructed such that the transmission side single tone discrimination section discriminates, when the demodulation signal exhibits a fixed level while successively inputted for a fixed number of times, that the demodulation signal while successively inputted by the fixed number of times is a single tone signal.

In this instance, each of the transmission apparatus may further comprise a gain control section provided in a stage preceding to the phase finite difference calculation section for performing gain control of the demodulation signal based on maximum level information of the demodulation signal while successively inputted by the fixed number of times, the transmission side single tone discrimination section discriminating based on gain control information from the gain control section whether or not the demodulation signal has a fixed level while successively inputted by the fixed number of times, the transmission side single tone discrimination section discriminating, when the level is fixed, that the demodulation signal while successively inputted by the fixed number of times is a single tone signal.

Or, the transmission side single tone discrimination section may be constructed such that it discriminates, when the demodulation signal exhibits a fixed phase difference while successively inputted by a fixed number of times, that the demodulation signal is a single tone signal.

Accordingly, with the transmission apparatus of the aspects of the present invention, when it is discriminated that transmission data is a single tone signal, a phase finite difference between successive transmission data is calculated, and coordinate discrimination of a result of the calculation of a phase finite difference is performed to transmit the transmission data. However, when it is discriminated that the transmission data is a signal other than a single tone signal, coordinate discrimination of the transmission data can be performed to transmit the transmission data. Consequently, the transmission apparatus are advantageous in that such a pure tone signal that satisfies a requested S/N ratio can be transmitted and the tone signal can be recognized with certainty on the termination side.

According to a still further aspect of the present invention, there is provided a reception apparatus, comprising a frequency shifting section for performing frequency shifting for a received digital signal so that a tone signal having a fixed frequency is reproduced from a dc signal, and a digital to analog conversion section for converting the digital signal, for which the frequency shifting has been performed by the frequency shifting section, into an analog signal.

The reception apparatus may be constructed such that it further comprises a modulation section for modulating the digital signal outputted from the frequency shifting section with a carrier signal having a fixed frequency, the frequency shifting section performing the frequency shifting for the digital signal by a frequency corresponding to a finite difference between the frequency of the tone signal and the frequency of the carrier signal.

With the reception apparatus, since it comprises the frequency shifting section, it can reproduce, from a dc signal transmitted thereto, a single tone signal without suffering from deterioration of the S/N ratio by effecting, on the reception side, frequency reverse a shifting corresponding to the frequency shifting which has been performed on the transmission side.

According a yet further aspect of the present invention, there is provided a reception apparatus, comprising a signal reception section for receiving a transmission signal from an opposing apparatus via a line, a phase finite sum calculation section for calculating phase finite sums of a reception signal successively outputted from the signal reception section, a reception side single tone discrimination section for discriminating whether or not the reception signal is a single tone signal, and a modulation section for performing modulation processing for the reception signal from the signal reception section or the phase finite sum signal from the phase finite sum calculation section, and wherein, when a result of the discrimination of the reception side single tone discrimination section proves that the reception signal is not a single tone signal, the modulation section modulates the reception signal, but when the reception side single tone discrimination section discriminates that the reception signal is a single tone signal, the modulation section modulates the phase finite sum signal from the phase finite sum calculation section.

The reception side single tone discrimination section may be constructed such that it discriminates, when the reception signal exhibits a fixed phase difference while successively inputted for a fixed number of times, that the reception signal while, successively inputted for the fixed number of times is a single tone signal.

In this instance, the reception side single tone discrimination section may be constructed such that it discriminates based on gain control information from the opposing apparatus whether or not the reception signal exhibits a fixed level while successively inputted for the fixed number of times, and discriminates, when the reception signal exhibits a fixed level, that the reception signal while successively inputted for the fixed number of times is a single tone signal.

The reception side single tone discrimination section may be constructed otherwise such that it discriminates, when the reception signal exhibits a fixed phase difference while successively inputted for a fixed number of times, that the reception signal is a single tone.

With the reception apparatus described above, since it comprises the reception side single tone discrimination section, when it is discriminated that reception data is a single tone signal, a phase finite sum of successively received data is calculated, and a result of the calculation of a phase finite sum can be modulated. However, when it is discriminated that the reception data is a signal other than a single tone signal, the reception data can be modulated. Consequently, the reception apparatus is advantageous in that such a pure tone signal that can satisfy a requested S/N ratio can be received and the tone signal can be recognized with certainty on the termination side.

According to a yet further aspect of the present invention, there is provided a reception apparatus, comprising a signal reception section for receiving transmission data including a transmission signal whose phase error has been corrected from an opposing apparatus via a line, a phase finite sum calculation section for calculating phase finite sums of the reception signal successively outputted from the signal reception section, and a modulation section for performing modulation processing for the phase finite sums calculated by the phase finite sum calculation section.

With the reception apparatus, since the signal reception section can omit discrimination of a single tone signal, there is an advantage in that a single tone signal, a voice signal or a FAX signal can be communicated in a low noise state while simplifying the construction of the signal reception section.

According to a yet further aspect of the present invention, there is provided a communication apparatus which includes a transmission section for converting an analog signal into digital signal and sending out the digital signal and a reception section for converting a received digital signal into an analog signal, comprising a first frequency shifting section provided in the transmission section for performing frequency shifting for an analog signal inputted thereto so that a tone signal having a fixed frequency is converted into a dc signal, a coordinate discrimination section provided in the transmission section for discriminating coordinates of a signal outputted from the first frequency shifting section on a two-dimensional coordinate plane, and a second frequency shifting section provided in the reception section for performing frequency shifting for a digital signal received so that a dc signal is converted into a tone signal having a fixed frequency.

With the communication apparatus, since the transmission section includes the first frequency shifting section and the coordinate discrimination section, also when a single tone signal is to be transmitted using a modem, the tone signal can be transmitted without suffering from deterioration of the S/N ratio thereof. Consequently, there is an advantage in that also an in-band ringer or a like element can recognize a single tone signal with certainty.

Further, since, when a tone signal is to be sent out, coordinate discrimination on the fixed frequency is performed by the first frequency shifting section, the single tone signal is always discriminated as the same coordinates, and movement of the discrimination point is eliminated. Consequently, the communication apparatus is advantageous in that the S/N ratio of a signal can be improved.

The frequency shifting by the second frequency shifting section may correspond to reverse frequency shifting to the frequency shifting by the first frequency shifting section.

The communication apparatus may be constructed such that it further comprises a demodulation section for demodulating an analog signal inputted thereto with a first carrier signal having a fixed frequency and outputting the demodulated signal to the first frequency shifting section, and a modulation section for modulating a signal outputted from the second frequency shifting section with a second carrier signal having another particular frequency and outputting the modulated signal, the first frequency shifting section performing the frequency shifting for the signal inputted thereto by a frequency corresponding to a finite difference between the frequency of the tone signal and the frequency of the first carrier signal, the second frequency shifting section performing the frequency shifting for the signal inputted thereto by a frequency corresponding to a finite difference between the frequency of the tone signal and the frequency of the second carrier signal.

With the communication apparatus, since it comprises the second frequency shifting section in the reception apparatus, it can reproduce, from a dc signal transmitted thereto, a single tone signal without suffering from deterioration of the S/N ratio by effecting, on the reception side, reverse frequency shifting corresponding to the frequency shifting which has been performed on the transmission side.

The communication apparatus may further comprise a discrimination point judgment section for receiving a discrimination signal outputted from the coordinate discrimination section and discriminating whether or not the discrimination signal successively inputted thereto exhibits a same discrimination result, a phase difference detection section for detecting, when the discrimination point judgment section discriminates that the same discrimination result successively appears, a phase difference between a phase of the signal outputted, from the frequency shifting section and a phase of the signal outputted from the coordinate discrimination section, and a phase correction section for correcting the phase of the signal outputted from the frequency shifting section based on the phase difference detected by the phase difference detection section.

With the communication apparatus, when a tone signal is to be sent out, in order to prevent movement of a discrimination point or a like phenomenon arising from a deviation of the tone signal, the phase difference between the phase of the signal for which the frequency shifting has been performed and the phase of the discriminated signal is detected, and the phase error of the frequency shifted signal can be corrected with the phase difference. Consequently, movement of a discrimination point when a single tone signal is sent out can be prevented.

Particularly, although movement of a discrimination point must be prevented when a single tone signal is sent out, since a countermeasure for preventing movement of a discrimination point need not be taken for a signal whose phase exhibits a variation also when frequency phase shifting is performed such as ordinary voice, the necessity to effect unnecessary phase error correction is eliminated by performing phase error correction only while a single tone signal continues to be sent out.

Here, the discrimination of whether or not a tone signal is a single tone signal can be performed making use of the fact that, while a tone signal converted into a dc signal is disposed at the same point, the same discrimination point does not successively appear with a voice signal and so forth. Thus, whether or not a single tone signal is being sent out can be discriminated by a simple method.

According to a yet further aspect of the present invention, there is provided a communication apparatus, comprising a transmission section including a demodulation section for demodulating a transmission signal with a fixed carrier frequency, a phase finite difference calculation section for calculating phase finite differences of the demodulation signal successively outputted from the demodulation section, a transmission side single tone discrimination section for discriminating whether or not the demodulation signal demodulated by the demodulation section is a single tone signal, a coordinate discrimination section for discriminating coordinates of the demodulation signal from the demodulation section or the phase finite difference signal from the phase finite difference calculation section, and a signal transmission section for transmitting a result of the discrimination of the coordinate discrimination section, the coordinate discrimination section performing, when a result of the discrimination of the transmission side single tone discrimination section proves that the demodulation signal is not a single tone signal, coordinate discrimination of the demodulation signal from the demodulation section, but when the demodulation signal is a single tone signal, the coordinate discrimination section performing coordinate discrimination of the phase finite difference signal from the phase finite difference calculation section, and a reception section including a signal reception section for receiving a transmission signal from an opposing apparatus via a line, a phase finite sum calculation section for calculating phase finite sums of a reception signal successively outputted from the signal reception section, a reception side single tone discrimination section for discriminating whether or not the reception signal is a single tone signal, and a modulation section for performing modulation processing for the reception signal from the signal reception section or the phase finite sum signal from the phase finite sun calculation section, the modulation section modulating, when a result of the discrimination of the reception side single tone discrimination section proves that the reception signal is not a single tone signal, the reception signal, but when the reception side single tone discrimination section discriminates that the reception signal is a single tone signal, the modulation section modulating the phase finite sum signal from the phase finite sum calculation section.

According to a yet further aspect of the present invention, there is provided a communication apparatus, comprising a transmission section including a demodulation section for demodulating a transmission signal with a fixed carrier frequency, a phase finite difference calculation section for calculating phase finite differences of the demodulation signal successively outputted from the demodulation section, a coordinate discrimination section for performing coordinate discrimination of an output of the phase finite difference calculation section, a signal transmission section for transmitting a result of the discrimination from the coordinate discrimination section, a phase error detection section for detecting a phase error based on a coordinate discrimination result from the coordinate discrimination section and a phase finite difference calculation result from the phase finite difference calculation section, and a transmission side single tone discrimination section for discriminating whether or not the demodulation signal inputted to the phase finite difference calculation section is a single tone signal, the phase error information detected by the phase error detection section being fed back, when the single tone discrimination section discriminates that the demodulation signal is not a single tone signal, to the phase finite difference calculation section, but when the demodulation signal is a single tone signal, the feeding back of the phase error information detected by the phase error detection section to the phase finite difference calculation section being stopped, and a reception section including a signal reception section for receiving transmission data including a transmission signal whose phase error has been corrected from an opposing apparatus via a line, a phase finite sum calculation section for calculating phase finite sums of the reception signal successively outputted from the signal reception section, and a modulation section for performing modulation processing for the phase finite sums calculated by the phase finite sum calculation section.

According to a yet further aspect of the present invention, there is provided a modem signal transmission and reception method, comprising the steps of discriminating, when coordinate discrimination is to be performed for transmission data to transmit the transmission data, whether or not the transmission data is a single tone signal, calculating, when it is discriminated that the transmission data is a single tone signal, phase finite differences of the successive transmission data and performing the coordinate discrimination for a result of the calculation of phase finite differences to transmit the transmission data, but performing, when it is discriminated that the transmission data is a signal other than a single tone signal, the coordinate discrimination for the transmission data to transmit the transmission data, discriminating, when the transmission data is received as reception data, whether or not the reception data is a single tone signal, and calculating, when it is discriminated that the reception data is a single tone signal, phase finite sums of the successive reception data and modulating a result of the calculation of phase finite sums, but modulating, when it is discriminated that the reception data is a signal other than a single tone signal, the reception data.

According to a yet further aspect of the present invention, there is provided a modem signal transmission and reception method, comprising the steps of discriminating, when coordinate discrimination is to be performed for transmission data to transmit the transmission data, whether or not the transmission data is a single tone signal, calculating, when it is discriminated that the transmission data is a single tone signal, phase finite differences of the successive transmission data and performing the coordinate discrimination for a result of the calculation of phase finite differences to transmit the transmission data, but calculating, when it is discriminated that the transmission data is a signal other than a single tone signal, phase finite differences of the successive reception data and performing the coordinate discrimination for a result of the calculation of phase finite differences to transmit the transmission data while an error between the result of the calculation of phase finite differences and a result of the coordinate discrimination is extracted and correction of the error is performed upon next calculation of phase finite differences from the transmission data, and modulating, when the transmission data is received as reception data, the reception data after phase finite sums of the successive reception data are calculated.

According to a yet further aspect of the present invention, there is provided a modem signal transmission and reception method, comprising the steps of calculating phase finite differences of successive transmission data formed from a single tone signal and performing coordinate discrimination for a result of the calculation of phase finite differences to transmit the transmission data, and calculating, when the transmission data is received as reception data, phase finite sums of the successive reception data and modulating a result of the calculation of phase finite sums.

With the communication apparatus and the modem signal transmission and reception methods described above, when it is discriminated that transmission data is a single tone signal, a phase finite difference between successive transmission data is calculated, and the coordinate discrimination of a result of the calculation of a phase finite difference is performed to transmit the transmission data. However, when it is discriminated that the transmission data is a signal other than a single tone signal, coordinate discrimination of the transmission data can be performed to transmit the transmission data. On the other hand, since the reception section (reception apparatus) includes the reception side single tone discrimination section, when it is discriminated that reception data is a single tone signal, a phase finite sum of successively received data is calculated, and a result of the calculation of a phase finite sum can be modulated. However, when it is discriminated that the reception data is a signal other than a single tone signal, the reception data can be modulated. Consequently, there is an advantage in that such a pure tone signal that can satisfy a requested S/N ratio can be transmitted and the tone signal can be recognized with certainty on the termination side.

Further, when it is discriminated that a demodulation signal is not a single tone signal, phase error information detected by the phase error detection section can be fed back to the phase finite difference calculation section. On the other hand, when it is discriminated that the demodulation signal is a single tone signal, the feeding back of the phase error information detected by the phase error detection section to the phase finite difference calculation section can be stopped. Consequently, accumulation of phase errors which arise from the fact that a phase finite difference signal regarding transmission data which is not a single tone signal is discriminated can be suppressed by the feedback control.

Furthermore, since the signal reception section can omit discrimination of a single tone signal, there is an advantage in that a single tone signal, a voice signal or a FAX signal can be communicated in a low noise state while simplifying the construction of the signal reception section.

Further objects, features and advantages of the present invention will become apparent from the following detailed description when read in conjunction with the accompanying drawings in which like parts or elements are denoted by like reference characters.

BRIEF DESCRIPTION OF THE DRAWINGS

FIG. 13 is a block diagram showing an equivalent circuit of a second normalization section shown in FIG. 11;

FIG. 14 is a view illustrating a table for storing a frequency shift carrier corresponding to a frequency shift amount in the modem of FIG. 11;

FIG. 17 is a block diagram showing part of a modem signal transmission section of the modem of FIGS. 15 and 16;

FIG. 18 is a diagrammatic view illustrating a detailed construction of the modem signal transmission section of FIG. 17;

FIGS. 20 to 22 are diagrammatic views illustrating operation of the modem signal transmission section shown in FIG. 15;

DESCRIPTION OF THE PREFERRED EMBODIMENTS a. Aspects of the Invention

Figure 1:
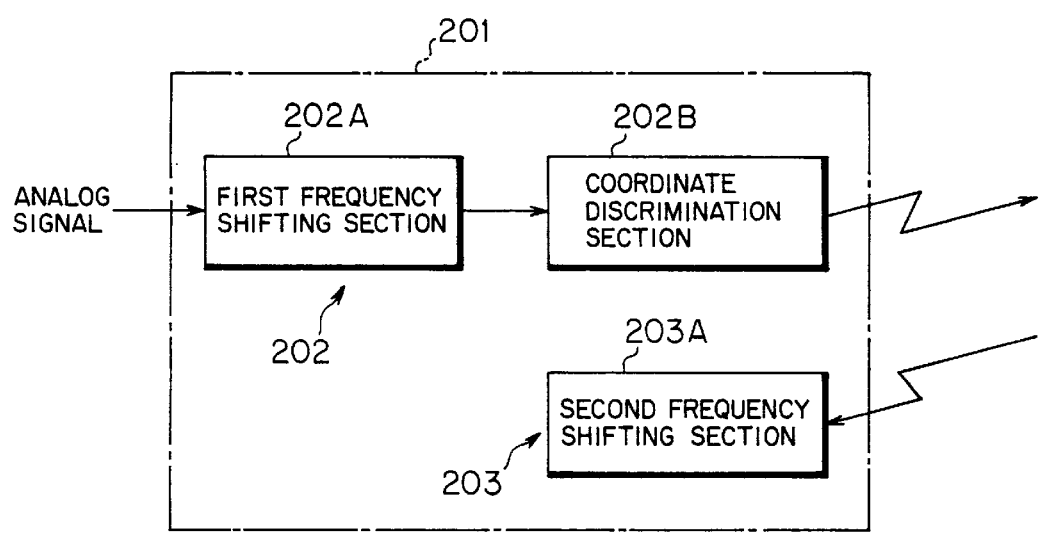
FIGS. 1 to 3 are block diagrams illustrating different aspects of the present invention.

FIG. 1 is a block diagram illustrating an aspect of the present invention. Referring to FIG. 1, a communication apparatus 201 includes a transmission section 202 for converting an analog signal into digital signal and sending out the digital signal and a reception section 203 for converting a received digital signal into an analog signal.

The transmission section 202 includes a first frequency shifting section 202A for performing frequency shifting for an analog signal inputted thereto so that a tone signal having a fixed frequency is converted into a dc signal, and a coordinate discrimination section 202B for discriminating coordinates of a signal outputted from the first frequency shifting section 202A on a two-dimensional coordinate plane.

Meanwhile, the reception section 203 includes a second frequency shifting section 203A for performing frequency shifting for a digital signal received so that a dc signal is converted into a tone signal having a fixed frequency.

If attention is paid to the functions of the transmission section 202 and the reception section 203 which forms the communication apparatus 201 described above, then the transmission section 202 may be formed merely as a transmission apparatus or the reception section 203 may be formed merely as a reception apparatus.

In other words, the transmission section 202 as a transmission apparatus discriminates coordinates of an analog signal inputted thereto on a two-dimensional coordinate plane and transmits the signal, with which the coordinates have been discriminated, as a digital signal. To this end, the transmission section 202 includes a frequency shifting section 202A for performing frequency shifting for the inputted analog signal so that a tone signal of a single frequency may be a dc signal, and a coordinate discrimination section 202B for discriminating coordinates on the two-dimensional coordinate plane of the analog signal for which the frequency shifting by the frequency shifting section (first frequency shifting section) 202A has been performed.

The transmission apparatus as a transmission apparatus described above may include a discrimination point judgment section for receiving a result of the coordinate discrimination from the coordinate discrimination section 202B and discriminating whether or not a same discrimination result is successively obtained, a phase difference detection section for detecting, when the same discrimination result successively appears, a phase difference between a phase of the signal for which the frequency shifting has been performed and a phase of an output signal of the coordinate discrimination section 202B, and a phase correction section for correcting the phase of the signal frequency shifted by the frequency shifting section 202A with the phase difference detected by the phase difference detection section and outputting the signal of the corrected phase to the coordinate discrimination section 202B.

Or, the transmission section 202 as a transmission apparatus may further include a demodulation section for demodulating the inputted analog signal with a carrier signal having a fixed frequency, and the frequency shifting section 202A may shift the frequency of the inputted analog signal by an amount corresponding to a finite difference between the frequency of the tone signal and the frequency of the carrier signal.

Otherwise, the transmission section 202 as a transmission apparatus may be constructed such that an amount of the phase shifting by the frequency shifting section 202A can be set in response to the single frequency of the tone signal included in the inputted analog signal.

Meanwhile, the reception section 203 as a reception apparatus may include a frequency shifting section (second frequency shifting section) 203A for performing frequency shifting for a received digital signal so that a tone signal having a fixed frequency is reproduced from a dc signal, and a digital to analog conversion section for converting the digital signal, for which the frequency shifting has been performed by the frequency shifting section 203A, into an analog signal.

The reception section 203 as a reception apparatus may be constructed such that it further includes a modulation section for modulating the digital signal outputted from the frequency shifting section 203A with a carrier signal having a fixed frequency, and the frequency shifting section 203A performs the frequency shifting for the digital signal by a frequency corresponding to a finite difference between the frequency of the tone signal and the frequency of the carrier signal.

The frequency shifting by the second frequency shifting section 203A described above may correspond to reverse frequency shifting to the frequency shifting by the first frequency shifting section 202A.

The communication apparatus 201 described above may be constructed such that it further includes a demodulation section for demodulating an analog signal inputted thereto with a first carrier signal having a fixed frequency and outputting the demodulated signal to the first frequency shifting section 202A, and a modulation section for modulating a signal outputted from the second frequency shifting section 203A with a second carrier signal having another particular frequency and outputting the modulated signal, that the first frequency shifting section 202A performs the frequency shifting for the signal inputted thereto by a frequency corresponding to a finite difference between the frequency of the tone signal and the frequency of the first carrier signal, and that the second frequency shifting section 203A performs the frequency shifting for the signal inputted thereto by a frequency corresponding to a finite difference between the frequency of the tone signal and the frequency of the second carrier signal.

Alternatively, the communication apparatus 201 described above may further include a discrimination point judgment section for receiving a discrimination signal outputted from the coordinate discrimination section 202B and discriminating whether or not the discrimination signal successively inputted thereto exhibits a same discrimination result, a phase difference detection section for detecting, when the discrimination point judgment section discriminates that the same discrimination result successively appears, a phase difference between a phase of the signal outputted from the frequency shifting section and a phase of the signal outputted from the coordinate discrimination section 202B, and a phase correction section for correcting the phase of the signal outputted from the frequency shifting section based on the phase difference detected by the phase difference detection section.

Figure 2:
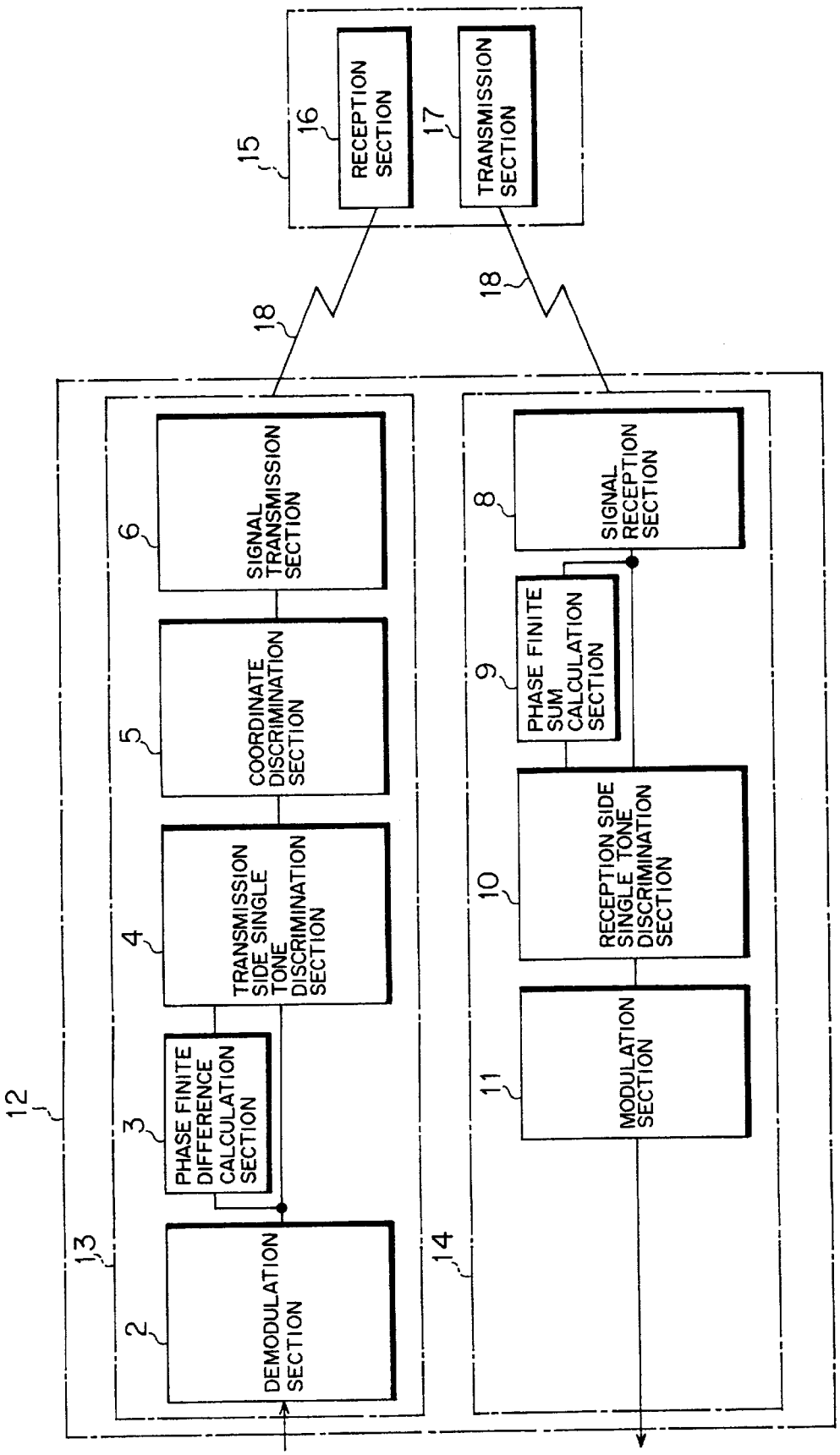

FIG. 2 is a block diagram illustrating another aspect of the present invention. Referring to FIG. 2, a modem signal transmission and reception apparatus 12 includes a modem signal transmission section 13 and a modem signal reception section 14.

The transmission section 13 includes a demodulation section 2, a phase finite difference calculation section 3, a transmission side single tone discrimination section 4, a coordinate discrimination section 5, and a signal transmission section 6.

The demodulation section 2 demodulates a transmission signal with a fixed carrier frequency. The phase finite difference calculation section 3 calculates phase finite differences of the demodulation signal successively outputted from the demodulation section 2. The transmission side single tone discrimination section 4 discriminates whether or not the demodulation signal demodulated by the demodulation section 2 is a single tone signal.

The coordinate discrimination section 5 discriminates coordinates of the demodulation signal from the demodulation section 2 or the phase finite difference signal from the phase finite difference calculation section 3 described above. More particularly, the coordinate discrimination section 5 performs, when a result of the discrimination of the transmission side single tone discrimination section 4 proves that the demodulation signal is not a single tone signal, coordinate discrimination of the demodulation signal from the demodulation section 2, but when the demodulation signal is a single tone signal, the coordinate discrimination section 5 performs coordinate discrimination of the phase finite difference signal from the phase finite difference calculation section 3.

The signal transmission section 6 transmits a result of the discrimination of the coordinate discrimination section 5.

Meanwhile, the reception section 14 includes a signal reception section 8, a phase finite sum calculation section 9, a reception side single tone discrimination section 10, and a modulation section 11.

The signal reception section 8 receives a transmission signal from an opposing apparatus 15 (for example, a modem signal transmission section 17 of a modem signal transmission and reception apparatus 15 similar to the modem signal transmission and reception apparatus 12) via a line 18. The phase finite sum calculation section 9 calculates phase finite sums of a reception signal successively outputted from the signal reception section 8. The reception side single tone discrimination section 10 discriminates whether or not the reception signal is a single tone signal.

The modulation section 11 performs modulation processing for the reception signal from the signal reception section 8 or the phase finite sum signal from the phase finite sum calculation section 9. More particularly, the modulation section 11 modulates, when a result of the discrimination of the reception side single tone discrimination section 10 proves that the reception signal is not a single tone signal, the reception signal, but when the reception side single tone discrimination section 10 discriminates that the reception signal is a single tone signal, the modulation section 11 modulates the phase finite sum signal from the phase finite sum calculation section 9.

If attention is paid only to the modem signal transmission section 13 and the modem signal reception section 14, then they can be formed merely as a modem signal transmission apparatus and a modem signal reception apparatus, respectively.

In the modem signal transmission and reception apparatus 12 described above, when coordinate discrimination is to be performed for transmission data to transmit the transmission data using the modem signal transmission apparatus 13, it is discriminated by the transmission side single tone discrimination section 4 whether or not the transmission data is a single tone signal.

When it is discriminated that the transmission data is a single tone signal, phase finite differences of the successive transmission data are calculated by the phase finite difference calculation section 3 and the coordinate discrimination is performed for a result of the calculation of phase finite differences by the coordinate discrimination section 5 to transmit the transmission data. However, when it is discriminated that the transmission data is a signal other than a single tone signal, the coordinate discrimination is performed for the transmission data by the coordinate discrimination section 5 and the transmission data is transmitted by the signal transmission section 6.

On the other hand, where the opposing apparatus 15 has a similar construction to that of the modem signal transmission and reception apparatus 12 described above, when the transmission data from the signal transmission section 6 is received as reception data, it is discriminated by the reception side single tone discrimination section not shown of the modem signal reception section 16 whether or not the reception data is a single tone signal.

When it is discriminated that the reception data is a single tone signal, phase finite sums of the successive reception data are calculated by the phase finite sum calculation section and a result of the calculation of phase finite sums is modulated by the modulation section. However, when it is discriminated that the reception data is a signal other than a single tone signal, the reception data is modulated by the modulation section.

The transmission side single tone discrimination section 4 may be constructed such that it discriminates, when the demodulation signal exhibits a fixed level while successively inputted for a fixed number of times, that the demodulation signal while successively inputted by the fixed number of times is a single tone signal.

More particularly, the modem signal transmission section 13 may be constructed such that it further includes a gain control section provided in a stage preceding to the phase finite difference calculation section 3 for performing gain control of the demodulation signal based on maximum level information of the demodulation signal while successively inputted by the fixed number of times, and the transmission side single tone discrimination section 4 discriminates based on gain control information from the gain control section whether or not the demodulation signal has a fixed level while successively inputted by the fixed number of times and discriminates, when the level is fixed, that the demodulation signal while successively inputted by the fixed number of times is a single tone signal.

Otherwise, the transmission side single tone discrimination section 4 may be constructed such that it discriminates, when the demodulation signal exhibits a fixed phase difference while successively inputted by a fixed number of times, that the demodulation signal is a single tone signal.

Meanwhile, the modem signal reception section 14 may be constructed such that the reception side single tone discrimination section 10 discriminates, when the reception signal exhibits a fixed phase difference while successively inputted for a fixed number of times, that the reception signal while successively inputted for the fixed number of times is a single tone signal.

More particularly, the reception side single tone discrimination section 10 may be constructed such that it discriminates based on gain control information from the opposing apparatus 15 (for example, a modem signal transmission and reception apparatus having a similar construction to that of the modem signal transmission and reception apparatus 12) whether or not the reception signal exhibits a fixed level while successively inputted for the fixed number of times, and discriminates, when the reception signal exhibits a fixed level, that the reception signal while successively inputted for the fixed number of times is a single tone signal.

Otherwise, the reception side single tone discrimination section 10 may be constructed such that it discriminates, when the reception signal exhibits a fixed phase difference while successively inputted for a fixed number of times, that the reception signal is a single tone.

Figure 3:
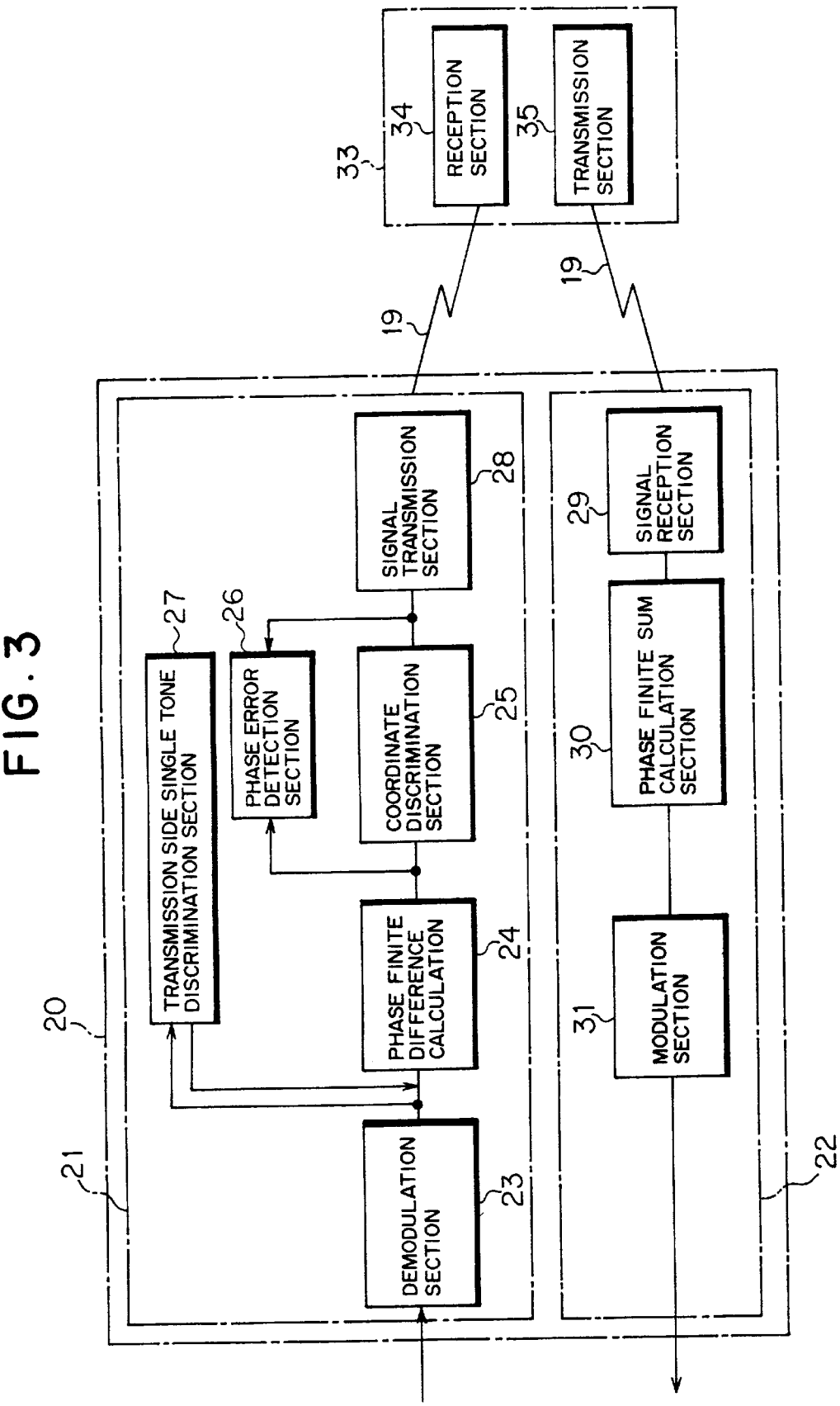

FIG. 3 is a block diagram illustrating a further aspect of the present invention. Referring to FIG. 3, a modem signal transmission and reception apparatus 20 includes a modem signal transmission section 21 and a modem signal reception section 22.

The modem signal transmission section 21 includes a demodulation section 23, a phase finite difference calculation section 24, a coordinate discrimination section 25, a phase error detection section 26, a transmission side single tone discrimination section 27, and a signal transmission section 28.

The demodulation section 23 demodulates a transmission signal with a fixed carrier frequency. The phase finite difference calculation section 24 calculates phase finite differences of the demodulation signal successively outputted from the demodulation section 23. The coordinate discrimination section 25 performs coordinate discrimination of an output of the phase finite difference calculation section 24. The signal transmission section 28 transmits a result of the discrimination from the coordinate discrimination section 25.

The phase error detection section 26 detects a phase error based on a coordinate discrimination result from the coordinate discrimination section 25 and a phase finite difference calculation result from the phase finite difference calculation section 24. The transmission side single tone discrimination section 27 for discriminating whether or not the demodulation signal inputted to the phase finite difference calculation section 24 is a single tone signal.

Thus, when the single tone discrimination section 27 discriminates that the demodulation signal is not a single tone signal, the phase error information detected by the phase error detection section 26 is fed back to the phase finite difference calculation section 24. However, when it is discriminated that the demodulation signal is a single tone signal, the feeding back of the phase error information detected by the phase error detection section 26 to the phase finite difference calculation section 24 is stopped.

Meanwhile, the modem signal reception section 22 includes a signal reception section 29 for receiving transmission data including a transmission signal whose phase error has been corrected from an opposing apparatus (for example, a modem signal transmission section 35 of a modem signal transmission and reception apparatus 33 having a similar construction to that of the modem signal transmission and reception apparatus 20 described above) via a line 19, a phase finite sum calculation section 30 for calculating phase finite sums of the reception signal successively outputted from the signal reception section 29, and a modulation section 31 for performing modulation processing for the phase finite sums calculated by the phase finite sum calculation section 30.

The modem signal transmission and reception apparatus 12 described hereinabove may be formed merely as a modem signal transmission apparatus having a similar function to that of the modem signal transmission section 21 or as a modem signal reception apparatus having a similar function to that of the modem signal reception section 22.

In the modem signal transmission and reception apparatus 20 described above, when coordinate discrimination is to be performed for transmission data by the coordinate discrimination section 25 of the modem signal transmission apparatus 21 to transmit the transmission data from the signal transmission section 28, it is discriminated by the transmission side single tone discrimination section 27 whether or not the transmission data is a single tone signal.

When it is discriminated that the transmission data is a single tone signal, phase finite differences of the successive transmission data are calculated and the coordinate discrimination is performed for a result of the calculation of phase finite differences to transmit the transmission data, but when it is discriminated that the transmission data is a signal other than a single tone signal, phase finite differences of the successive reception data are calculated and the coordinate discrimination Is performed for a result of the calculation of phase finite differences to transmit the transmission data while an error between the result of the calculation of phase finite differences and a result of the coordinate discrimination is extracted by the phase error detection section 26 and correction of the error is performed upon next calculation of phase finite differences from the transmission data.

Where a modem signal reception section 34 of an apparatus 33 opposing to the modem signal transmission and reception apparatus 20 described above has a similar construction to that of the modem signal reception section 22 described above, when the transmission data is received as reception data, the reception data is modulated by the modulation section after phase finite sums of the successive reception data are calculated by the phase finite sum calculation section.

The transmission side single tone discrimination section 27 described above may be constructed such that it discriminates, when the demodulation signal exhibits a fixed level while successively inputted for a fixed number of times, that the demodulation signal while successively inputted by the fixed number of times is a single tone signal.

More particularly, the modem signal transmission apparatus 21 may be constructed such that it further includes a gain control section provided in a stage preceding to the phase finite difference calculation section 24 for performing gain control of the demodulation signal based on maximum level information of the demodulation signal while successively inputted by the fixed number of times, and the transmission side single tone discrimination section 27 discriminates based on gain control information from the gain control section whether or not the demodulation signal has a fixed level while successively inputted by the fixed number of times and discriminates, when the level is fixed, that the demodulation signal while successively inputted by the fixed number of times is a single tone signal.

Otherwise, the transmission side single tone discrimination section 27 may be constructed such that it discriminates, when the demodulation signal exhibits a fixed phase difference while successively inputted by a fixed number of times, that the demodulation signal is a single tone signal.

Further, according to an additional aspect of the present invention, a modem signal transmission and reception method may be constructed such that phase finite differences of successive transmission data formed from a single tone signal are calculated and coordinate discrimination is performed for a result of the calculation of phase finite differences to transmit the transmission data, and, when the transmission data is received as reception data, phase finite sums of the successive reception data are calculated and a result of the calculation of phase finite sums is modulated.

b. First Embodiment

In the following, several embodiments of the present invention are described with reference to the accompanying drawings.

Figure 4:
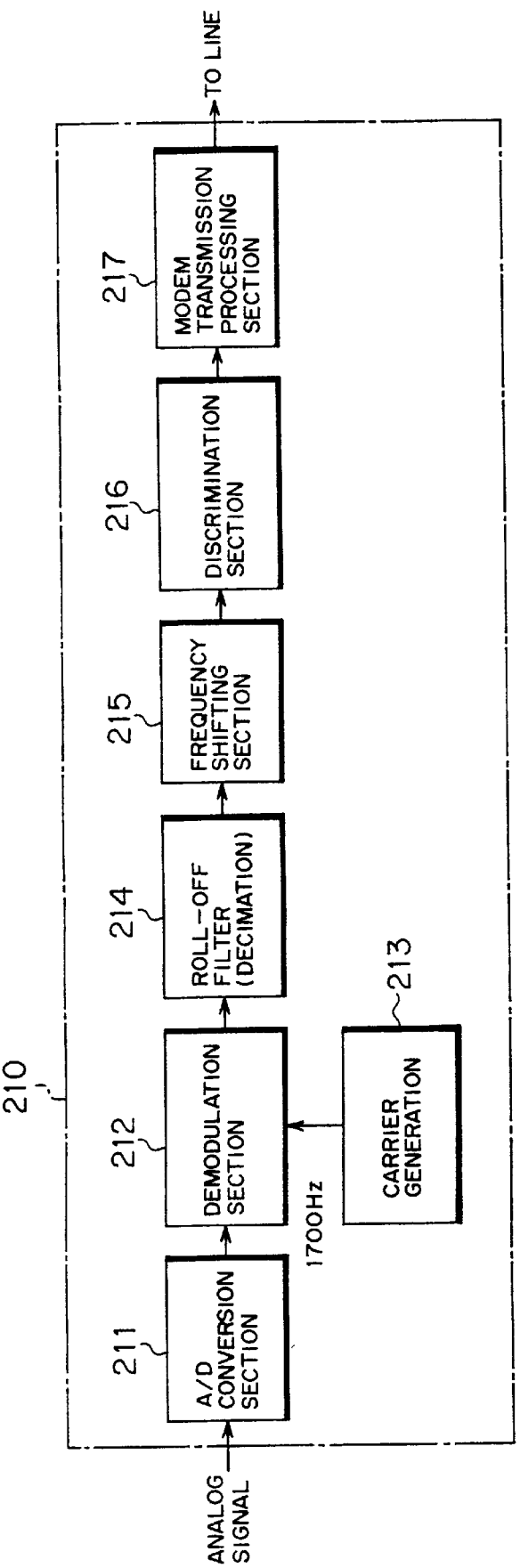
FIGS. 4 and 5 are block diagrams showing a transmission section and a reception section, respectively, of a modem according to a first embodiment of the present invention.
Figure 5:
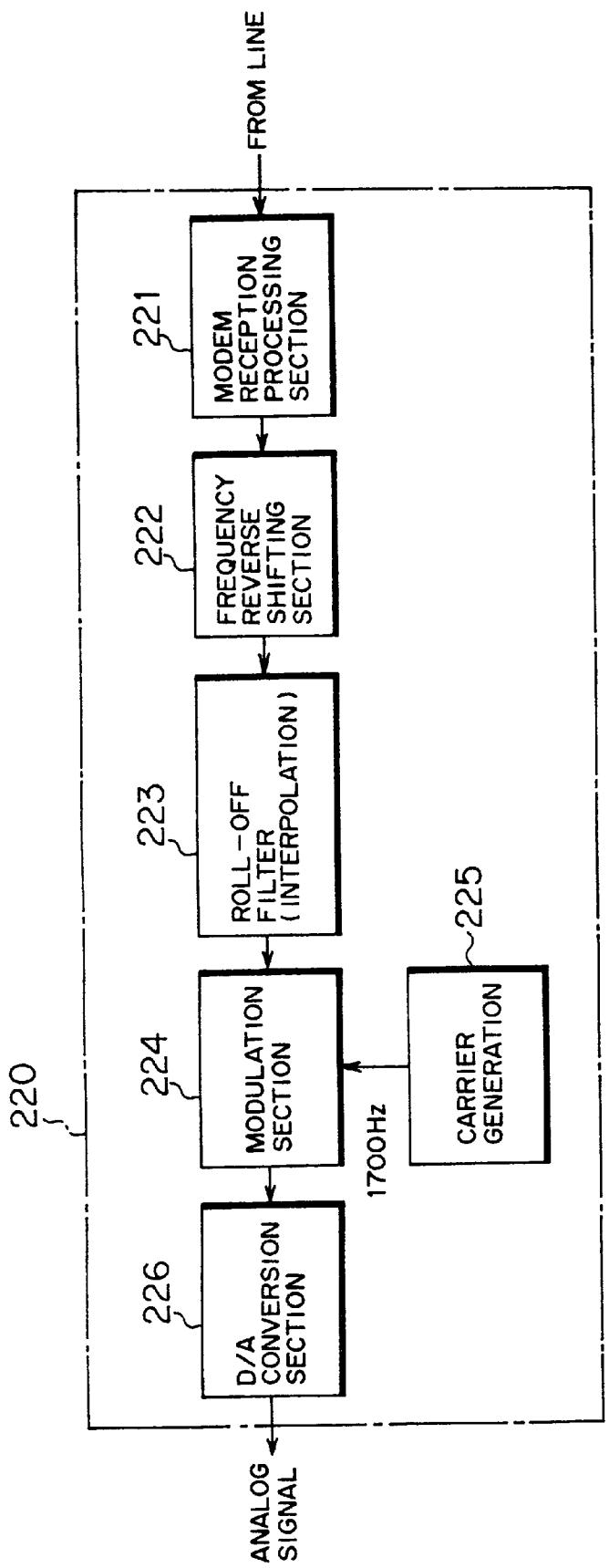

FIG. 4 shows in block diagram a transmission section 210 which forms a modem according to a first embodiment of the present invention, and FIG. 5 shows in block diagram a reception section 220 which forms the modem according to the first embodiment of the present invention.

Also the modem according to the first embodiment can be used as the modem 105 or 106 in such a communication system as described hereinabove with reference to FIG. 31.

In particular, if the modem as a communication apparatus according to the first embodiment is applied, for example, as the modem 105, that is, disposed at the position of the modem 105, then it can transmit, on one hand by means of the transmission section 210 shown in FIG. 4, a transmission signal from a terminal 101 or 102 accommodated in the private branch exchange 103 to the modem 106 via the dedicated line 111 and receive, on the other hand by means of the reception section 220 shown in FIG. 5, an analog signal from a terminal 109 or 110 on the opposing private branch exchange 108 side.

The transmission section 210 can perform demodulation, discrimination processing and so forth of and transmit a single tone signal from the in-band ringer 104. Meanwhile, the reception section 220 can perform decoding, modulation processing and so forth of a single tone signal (discrimination data) from the in-band ringer 107 and output a resulting signal to the in-band ringer 104.

Figure 31:
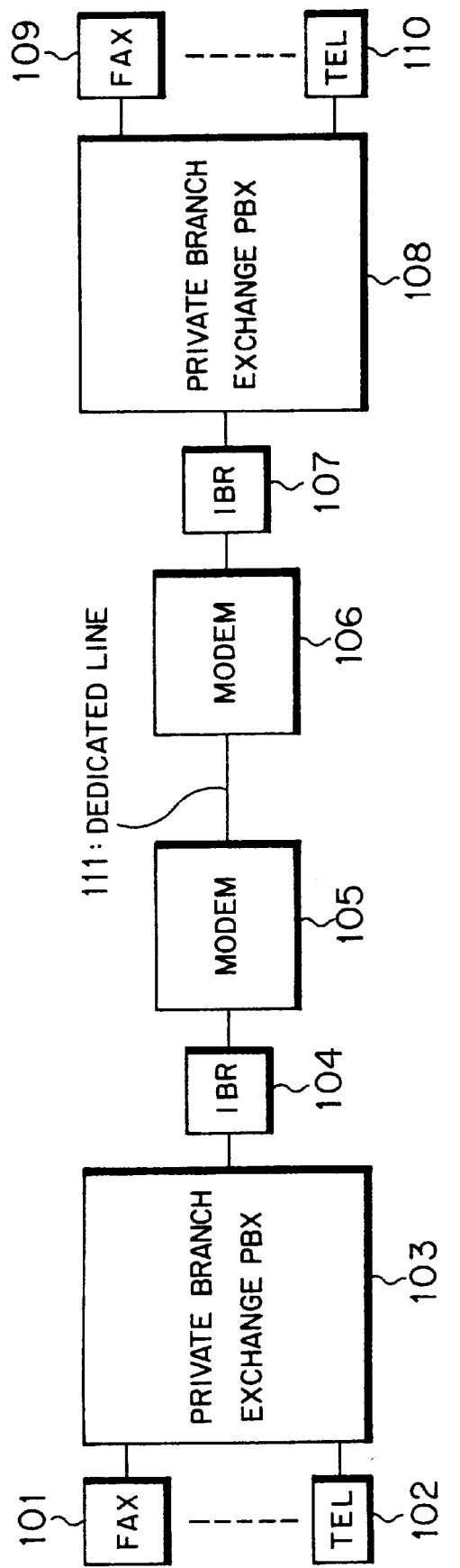
FIG. 31 is a block diagram showing a communication system which communicates via a dedicated line.
Figure 32:
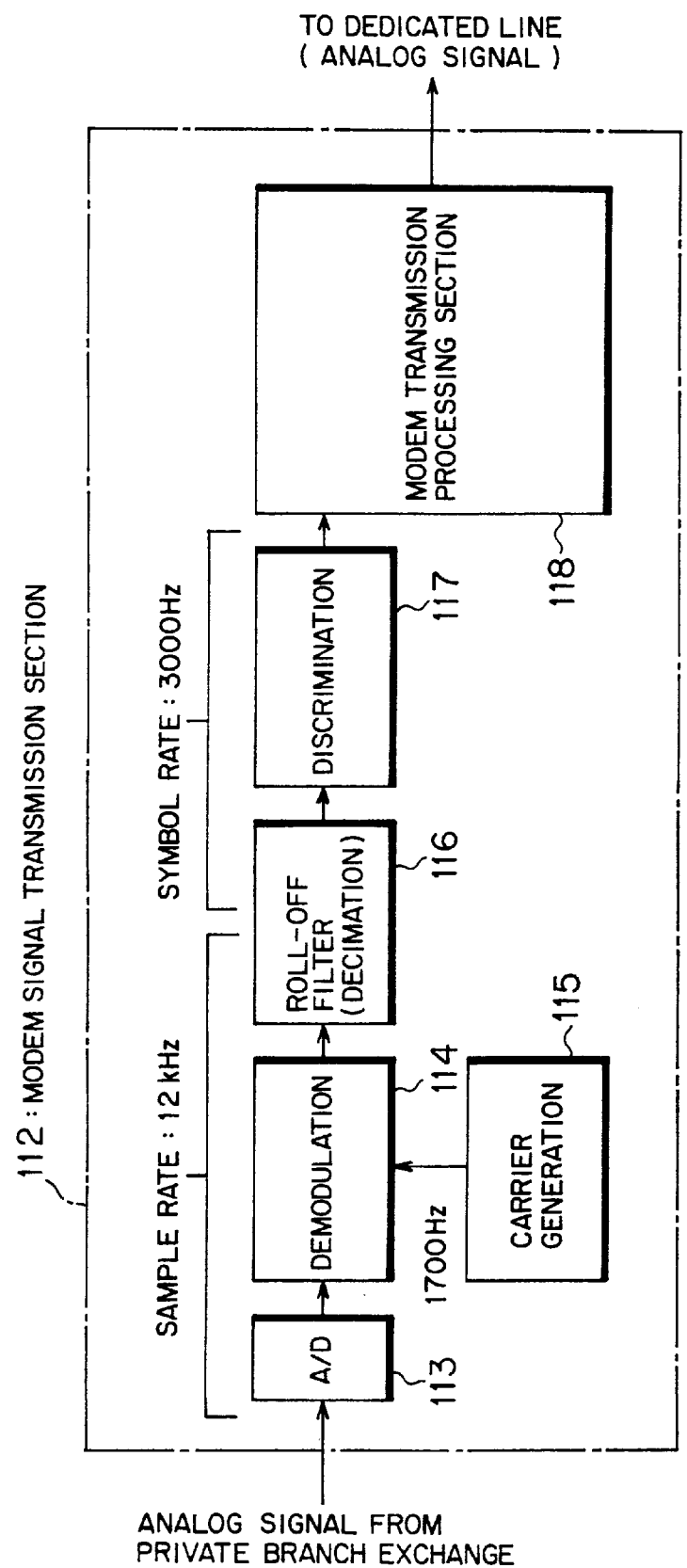
FIG. 32 is a block diagram showing a modem signal transmission section.
Figure 33:
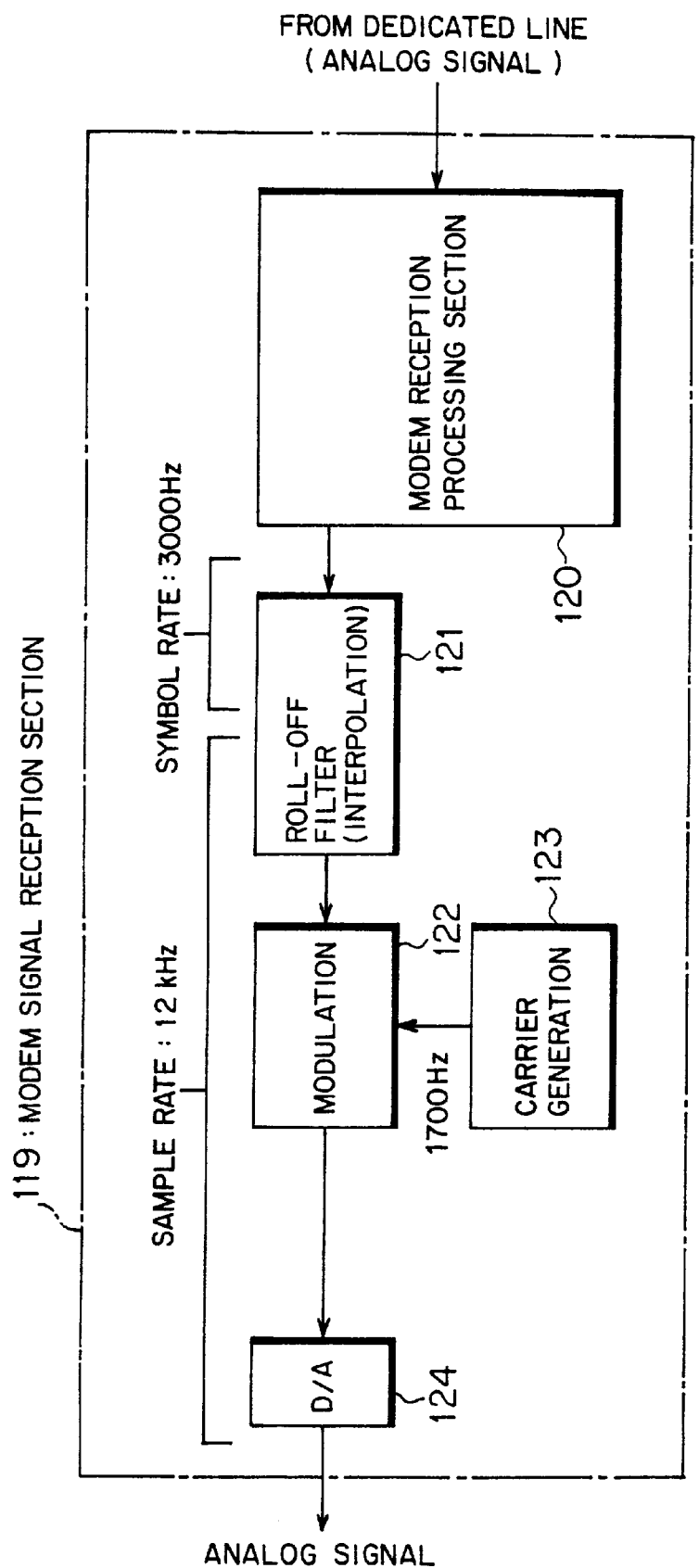
FIG. 33 is a block diagram showing a modem signal reception section.

As described above, the modem as a communication apparatus according to the first embodiment particularly includes such a transmission section 210 as shown in FIG. 4 and such a reception section 220 as shown in FIG. 5, and while the construction of the modem as a communication apparatus according to the first embodiment is described in detail paying attention to the case wherein it is disposed at the position of the modem 105 shown in FIG. 31, also the opposing modem 106 has a similar construction to the modem 105.

The transmission section 210 includes an A/D conversion section 211, a demodulation section 212, a carrier generation section 213, a roll-off filter 214, a frequency shifting section (first frequency shifting section) 215, a coordinate discrimination section 216 and a modem transmission processing section (signal transmission section) 217. An analog signal inputted to the transmission section 210 successively passes the A/D conversion section 211, demodulation section 212, roll-off filter 214, frequency shifting section 215, coordinate discrimination section 216 and modem transmission processing section 217 and is sent out to the line 111.

The A/D conversion section 211 receives an analog signal (of a band of, for example, 0.3 to 3.4 kHz) inputted from a telephone terminal, a FAX terminal or the in-band ringer 104, and converts the analog signal into a digital signal at a sample rate of, for example, approximately 12 kHz.

The demodulation section 212 demodulates the digital data outputted from the A/D conversion section 211 with a carrier signal having a frequency of approximately 1,700 Hz to convert the pass band signal into a base band signal. The carrier signal is generated by the carrier generation section 213.

The roll-off filter 214 performs decimation processing of the demodulation signal outputted from the demodulation section 212. Here, the roll-off filter 214 effects conversion from a sample rate (12 kHz, 4 samples/symbol) into a symbol rate (3,000 Hz, 1 sample/symbol) to decrease the amount of information of the demodulation signal. The roll-off filter 214 thus functions as a filter for decimation processing.

A signal outputted from the roll-off filter 214 is inputted to the frequency shifting section 215. The frequency shifting section 215 performs frequency shifting for the signal inputted from the roll-off filter 214 so that a tone signal having a single frequency may make a dc signal.

For example, where a single tone signal of 3,000 Hz is used for an in-band ringer, the signal inputted to the frequency shifting section 215 is frequency shifted by a frequency shift amount equal to a finite difference (−1,300 Hz) between 3,000 Hz of the frequency of a tone signal and 1,700 Hz of the frequency of the carrier signal.

By this processing, a tone signal of 3,000 Hz outputted from the frequency shifting section 215 is converted into a dc signal.

Figure 6:
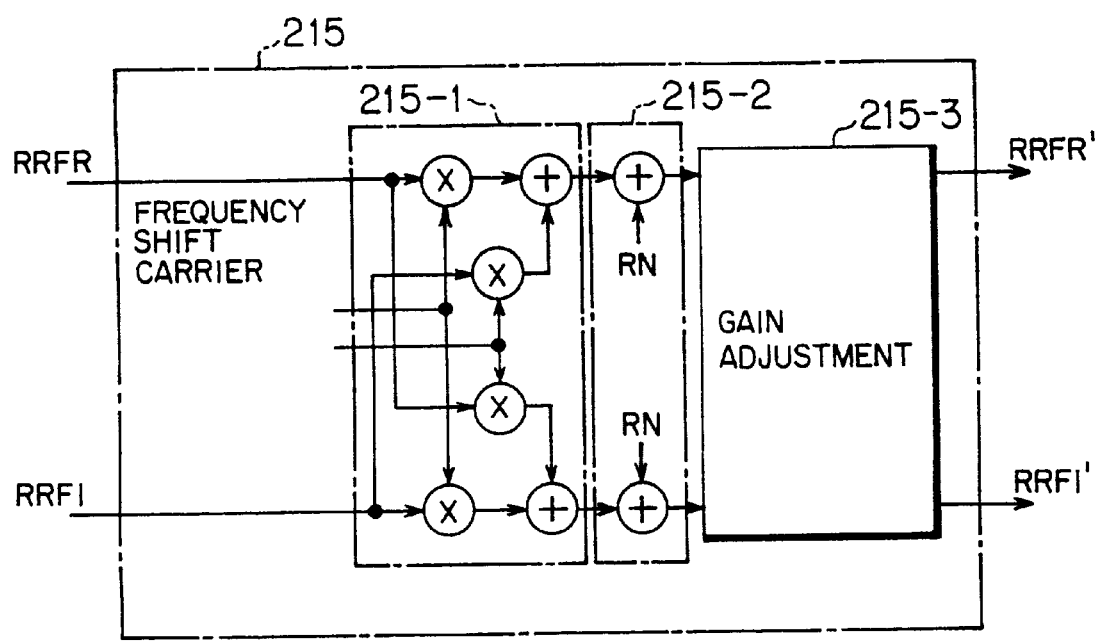
FIG. 6 is a circuit diagram showing an equivalent circuit of a frequency shifting section of the modem shown in FIGS. 4 and 5.

FIG. 6 is a circuit diagram showing an equivalent circuit of the frequency shifting section 215. Referring to FIG. 6, the frequency shifting section 215 shown includes a frequency shift calculation section 215-1, a rounding processing section 215-2 and a gain adjustment section 215-3. In FIG. 6, reference symbol RRFR denotes a real part component of a signal inputted to the frequency shifting section 215, and RRFI similarly denotes an imaginary part component of the signal inputted to the frequency shifting section 215.

Where the real part component RRFR of a signal inputted from the roll-off filter 214 to the frequency shifting section 215 is represented by $\cos\theta_0$ and the imaginary part component RRFI of the signal is represented by $\sin\theta_0$, the frequency shift calculation section 215-1 effects operation of trigonometric functions substantially given by the following expressions (1) and (2) regarding the components $\cos\theta 0$ and $\sin\theta_0$:

$$\cos(\theta_0-\omega)=\cos\theta_0\cdot\cos\omega+\sin\theta_0\cdot\sin\omega \quad (1)$$

$$\sin(\theta_0-\omega)=\sin\theta_0\cdot\cos\omega-\cos\theta_0\cdot\sin\omega \quad (2)$$

where $\omega$ is an angular velocity which includes information of a frequency f by which shifting should be performed ($\omega=f/2\pi$).

In particular, the real and imaginary part components of a signal inputted to the frequency shifting section 215 are individually multiplied by carrier signals $\cos\omega$ and $-\sin\omega$ for frequency shifting should be performed. It is to be noted that the carrier signals in the first embodiment have a frequency of 1,300 Hz which is equal to the frequency shift amount mentioned above. The frequencies of the carrier signals can be suitably varied in accordance with a desired frequency shift amount.

The real part component and the imaginary part component of the input signal multiplied by the carrier signals $\cos\omega$ and $-\sin\omega$, respectively, are subsequently added by adders. The real part component multiplied by $\cos\omega$ is subtracted from the imaginary part component multiplied by $-\sin\omega$ to calculate a finite difference. Meanwhile, the real part component multiplied by $-\sin\omega$ is added to the imaginary part component multiplied by $\cos\omega$.

The rounding processing section 215-2 performs rounding processing of results of the calculation from the frequency shift calculation section 215-1. More particularly, the rounding processing section 215-2 adds a coefficient RN for rounding to results of addition of the real part component and the imaginary part component. Frequency shifting of the input signal by −1,300 Hz is completed thereby.

The frequency shifted signals are adjusted in amplitude by the gain adjustment section 215-3 (GAIN ADJUSTMENT in FIG. 6) and outputted as a real part component RRFR' and an imaginary part component RRFI' from the frequency shifting section 215.

Figure 7:
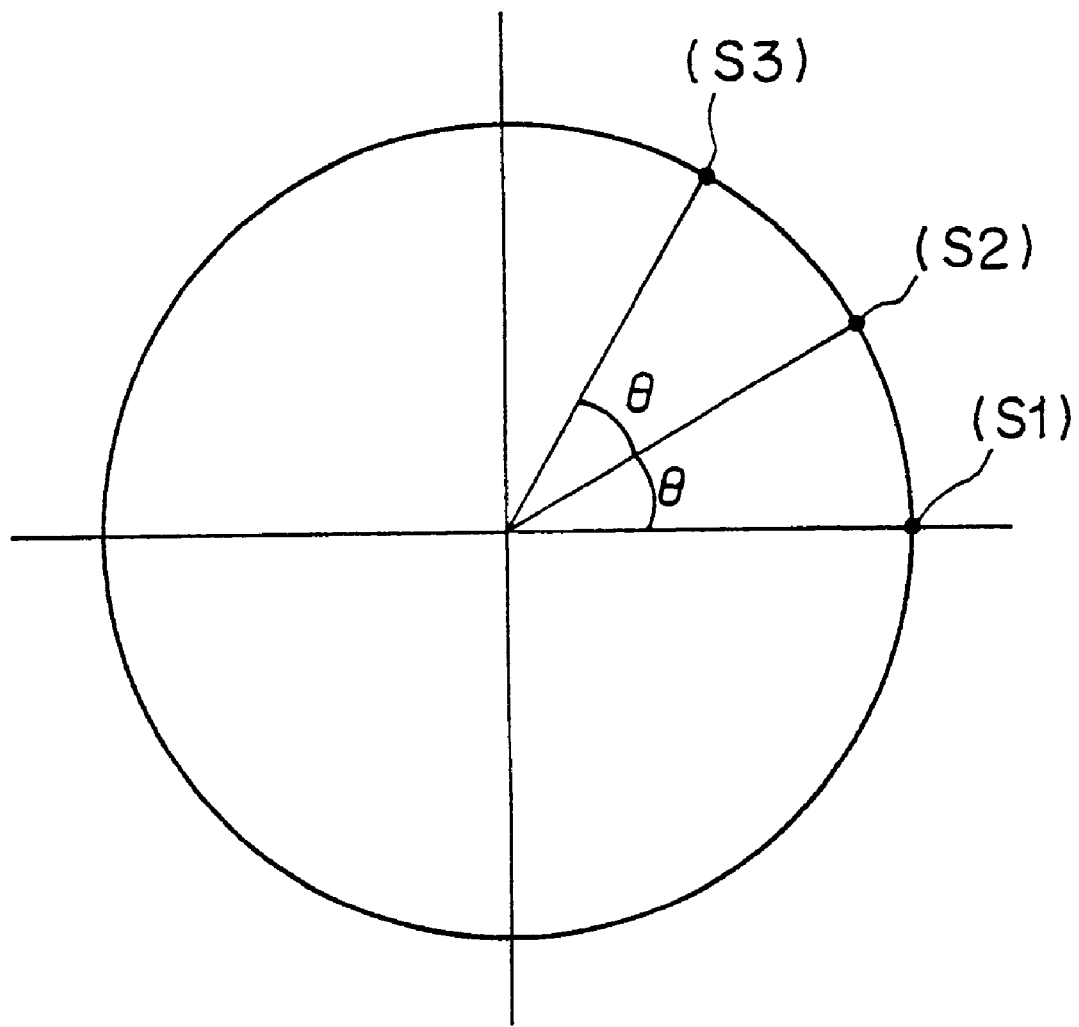
FIG. 7 is a diagram illustrating a single tone signal outputted from a roll-off filter of the modem shown in FIGS. 4 and 5.
Figure 8:
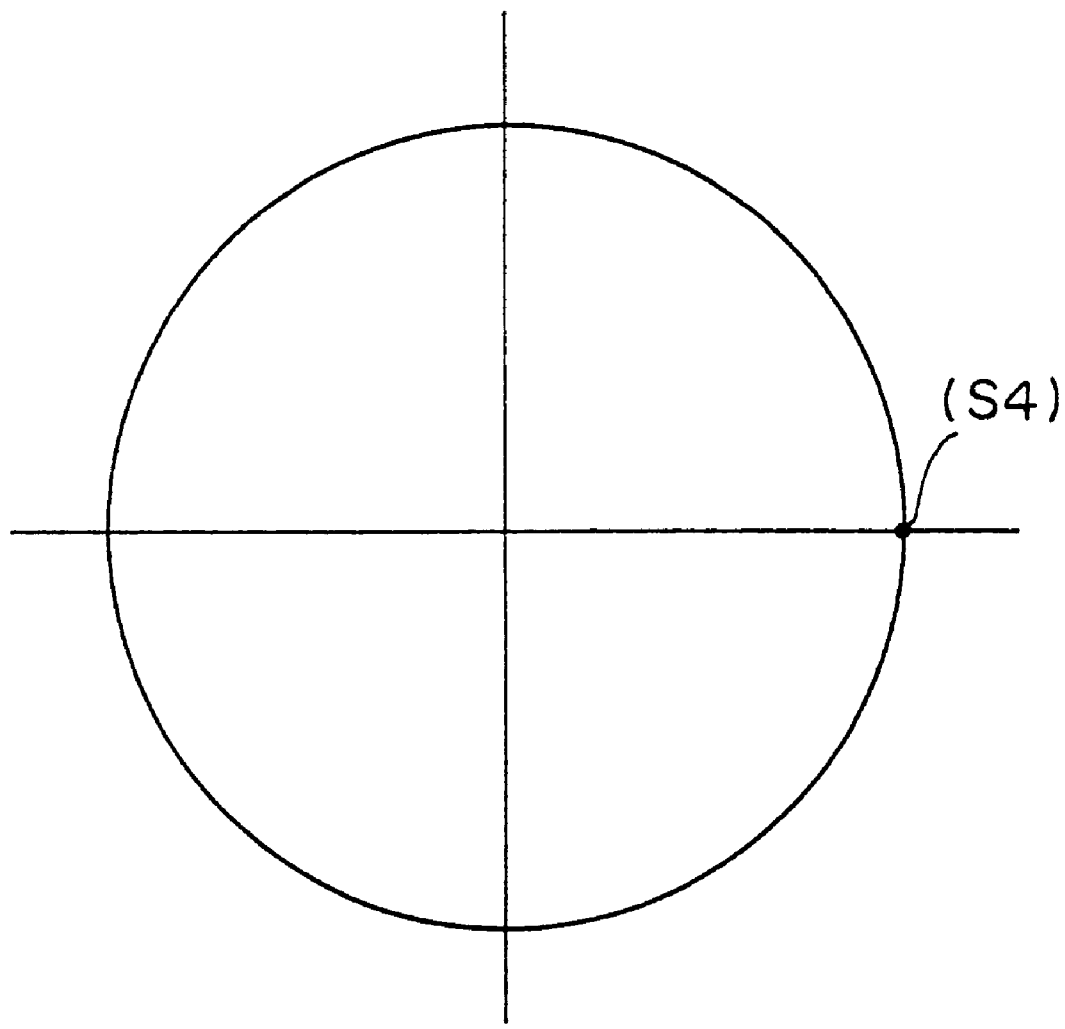
FIG. 8 is a similar view but illustrating a single tone signal after frequency shifted by the modem of FIGS. 4 and 5.
Figure 9:
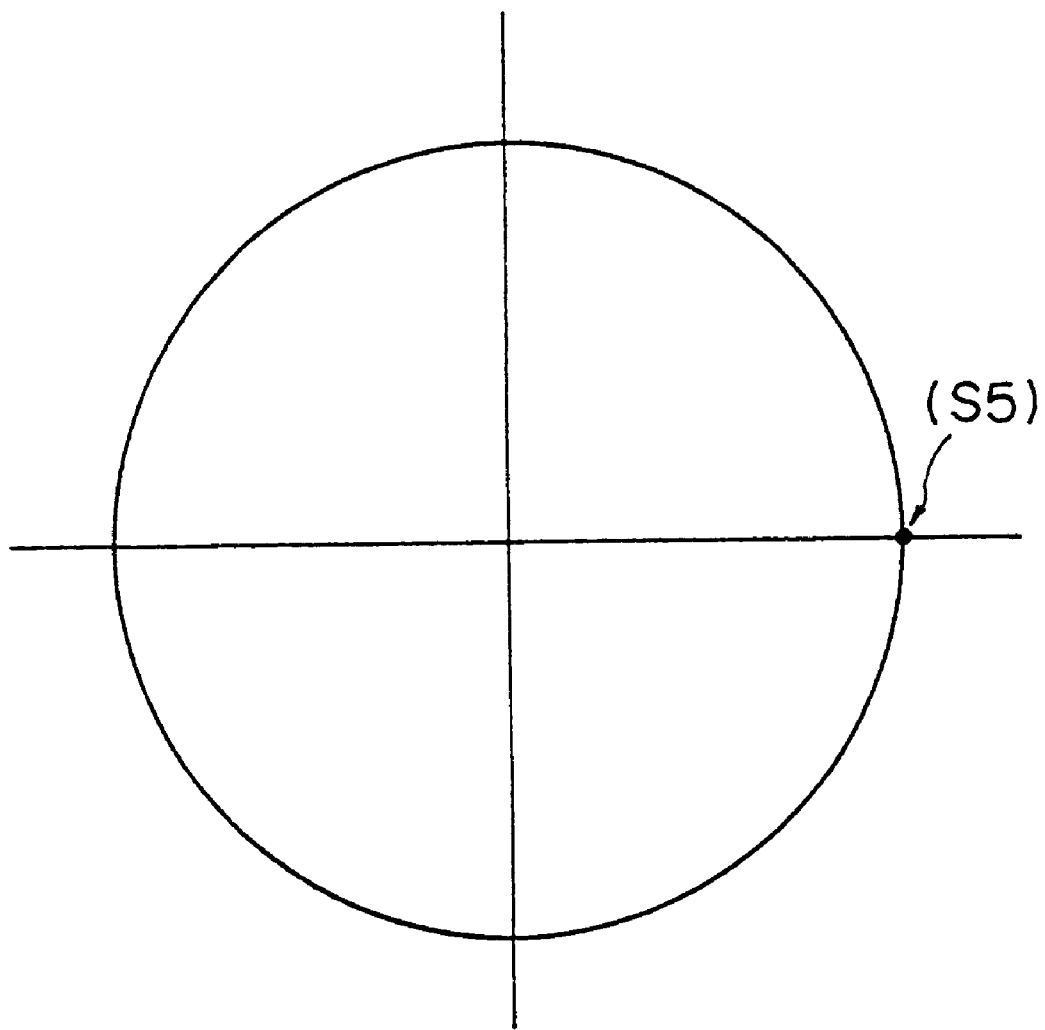
FIG. 9 is a similar view but illustrating a single tone signal after coordinate discrimination by the modem of FIGS. 4 and 5.

FIGS. 7 to 9 illustrate operation of the frequency shifting section 215.

FIG. 7 illustrates an analog signal outputted from the roll-off filter 214. In this instance, FIG. 7 illustrates an analog signal where it is a tone signal of 3,000 Hz. Further, points (S1) to (S3) shown in FIG. 7 denote symbols (sample values) obtained by sampling a single tone signal.

As described hereinabove, the signal outputted from the roll-off filter 214 has a symbol rate of 3,000 Hz. This symbol rate is equal to the frequency of the tone signal. Consequently, the signal outputted from the roll-off filter 214 (sample values of the tone signal) is inputted with a fixed phase difference θ to the frequency shifting section 215. Further, since the symbol rate and the frequency of the tone signal are fixed, symbols of the tone signal outputted from the roll-off filter 214 have an equal amplitude. Accordingly, the signal of the output of the roll-off filter 214 appears to trace a circle shown in FIG. 7.

FIG. 8 illustrates a tone signal after frequency shifting has been performed therefor. As described hereinabove, since a single tone signal having the frequency of 3,000 Hz is converted into a dc signal by effecting frequency shifting therefor, the output signal of the frequency shifting section 215 exhibits a phase difference of zero, and the output signal is always outputted as same point data. In FIG. 8, it is shown that a signal corresponding to the single tone signal is disposed on the X-axis.

In particular, while signal points from the roll-off filter 214 are inputted with the fixed phase difference θ as seen from the paints (S1) to (S3) shown in FIG. 7, by effecting frequency shifting by the frequency shifting section 215, the signal points are outputted as data (S4) of one point as seen in FIG. 8.

FIG. 9 illustrates a state after coordinates of the output signal of the frequency shifting section 215 are discriminated on a two-dimensional coordinate plane. Since the tone signal has been converted into a dc signal as seen in FIG. 8 and is always equal in amplitude and phase, also coordinates of a discrimination point discriminated on the two-dimensional plane always indicate a fixed point (S5). In FIG. 9, a discrimination point is disposed at a position same as the position at which the dc signal is disposed in FIG. 7.

Figure 10:
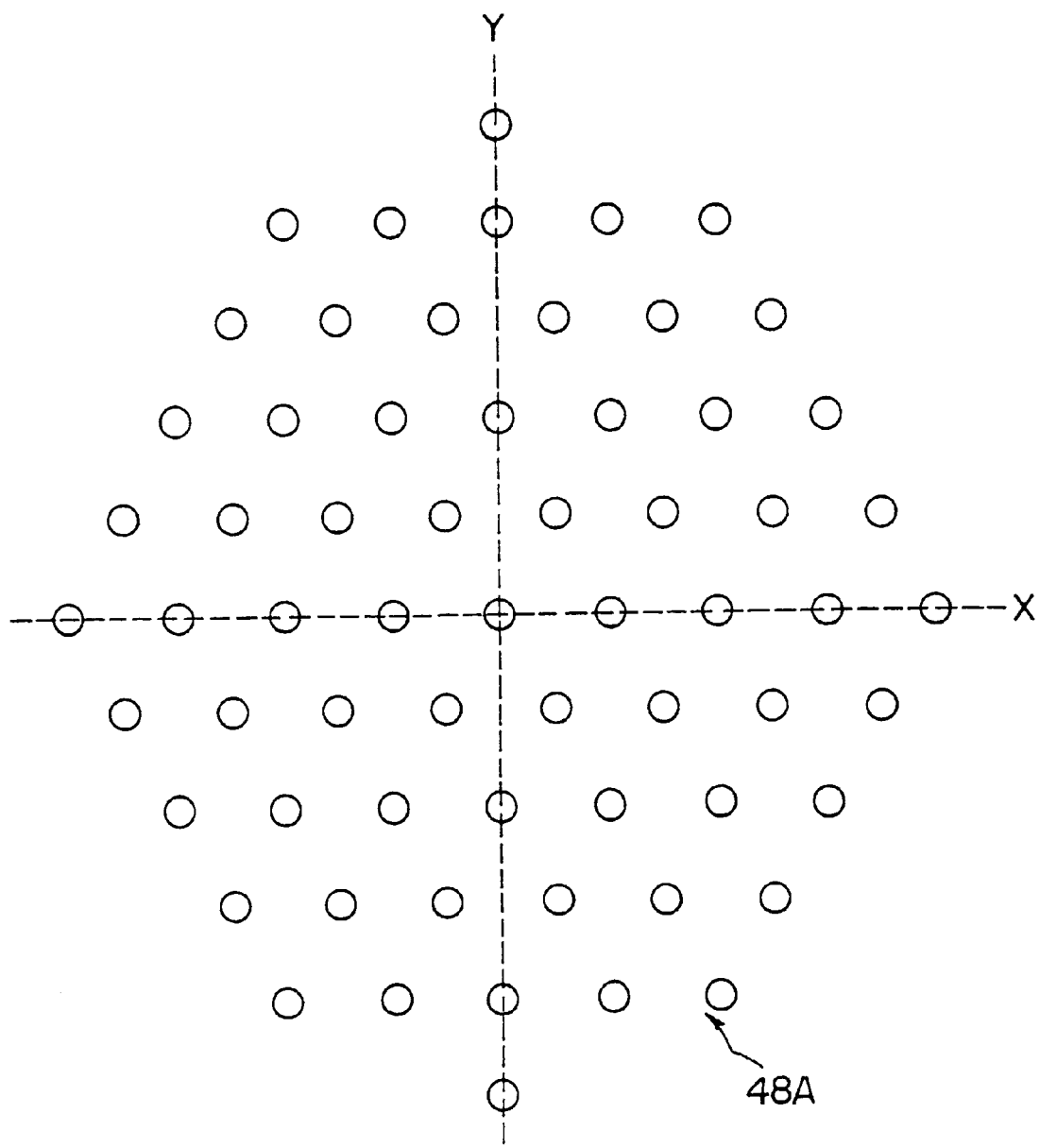
FIG. 10 is a diagrammatic view illustrating a discrimination plane of the discrimination section in the modem of FIGS. 4 and 5.

FIG. 10 illustrates an example of an arrangement of discrimination points by the modem of the present embodiment. A discrimination plane 48A shown in FIG. 10 has totaling 63 discrimination points arranged thereon. On this discrimination plane 48A, one discrimination point is disposed at the center of an equilateral hexagonal region. Here, in order to eliminate a discrimination error, it is most preferable to determine the signal point arrangement and so forth so that the dc signal discriminated in FIG. 9 may correspond to the position of one of the discrimination points of FIG. 10.

Referring back to FIG. 4, a signal outputted from the coordinate discrimination section 216 is subject to known gray/natural conversion and modulation processing by the modem transmission processing section 217, and the modulation signal is transmitted to an opposing modem via a dedicated line.

Referring now to FIG. 5, the reception section 220 includes a modem reception processing section (signal reception section) 221, a frequency reverse shifting section (frequency shifting section, second frequency shifting section) 222, a roll-off filter 223, a modulation section 224, a carrier generation section 225 and a D/A conversion section 226. A signal inputted to the reception section 220 via a line successively passes the modem reception processing section 221, frequency reverse shifting section 222, roll-off filter 223, modulation section 224 and D/A conversion section 226 and is outputted as an analog signal.

A signal received via the line first undergoes demodulation processing and so forth by the modem reception processing section 221 and is then inputted to the frequency reverse shifting section 222. It is to be noted that, for the demodulation processing, any conventional technique which has been employed in conventional modems can be used as it is.

The frequency reverse shifting section 222 effects frequency shifting for a digital signal received so that a tone signal having a particular frequency may be reproduced from the dc signal.

More particularly, the frequency reverse shifting section 222 performs processing quite reverse to that of the frequency shifting by the transmission section. Since a tone signal having the frequency of 3,000 Hz has been converted into a dc signal by the frequency shifting section of the transmission section, it is necessary to perform frequency reverse shifting for the dc signal received via the line to reproduce a tone signal of 3,000 Hz.

Since frequency shifting by −1,300 Hz has been performed by the transmission section, frequency shifting by +1,300 Hz is performed on the reception section 220 side In short, the state of the signal inputted to the frequency reverse shifting section 222 of the reception section 220 is such as illustrated in FIG. 8, and the signal after frequency reverse shifting has been performed, that is, the output signal of the frequency reverse shifting section 222, has such a state as seen in FIG. 7.

In other words, the frequency reverse shifting section 222 is constructed such that it performs frequency shifting for a received digital signal by a frequency corresponding to the finite difference between the frequency of the tone signal and the frequency of the carrier signal.

The signal outputted from the frequency reverse shifting section 222 is inputted to the roll-off filter 223. The roll-off filter 223 of the reception section 220 performs interpolation processing for the signal inputted thereto. This interpolation processing corresponds to the decimation processing which has been performed by the transmission section.

By the interpolation filter processing by the roll-off filter 223, processing for conversion from the symbol rate of 3,000 Hz to the sample rate of 12 kHz is performed, by which the original information amount is restored.

The output of the roll-off filter 223 is inputted to the modulation section 224. The modulation section 224 modulates the signal inputted thereto with a carrier signal of 1,700 Hz generated by the carrier generation section 225 to convert the base band signal into a pass band signal (for a voice signal, of 0.3 to 3.4 kHz).

The output of the modulation section 224 is inputted to the D/A conversion section 226, by and from which the digital signal is converted into and outputted as an original analog signal. The output of the D/A conversion section 226 is inputted to an in-band ringer not shown in FIG. 5.

In the modem having such a construction as described above, since a single tone signal of a particular frequency (in this instance, 3,000 Hz) is converted into a dc signal by frequency shifting and coordinate discrimination is performed whereas a received dc signal is frequency reversed shifted to reproduce an original tone signal, possible discrimination errors upon coordinate discrimination can be minimized, and a dc signal can be transmitted without deterioration of the S/N ratio so that such a tone signal as is sent out via a dedicated line and used by an in-band ringer may not be distorted. Consequently, the tone signal can be recognized with certainty by a reception side apparatus.

In this manner, with the modem of the first embodiment of the present invention, since the frequency shifting section 215 and the coordinate discrimination section 216 are provided in the transmission section 210, where the modem is used as the modem 105 shown in FIG. 31, even if a single tone signal is to be transmitted, it can be transmitted without suffering from deterioration of the S/N ratio thereof. Consequently, the modem is advantageous in that a single tone signal can be recognized with certainty also by an in-band ringer and so forth.

Further, when a tone signal is to be sent out, since coordinate discrimination on a particular frequency plane is performed by the frequency shifting section 215 of the transmission section 210, a single tone signal is always discriminated as same coordinates, and consequently, the discrimination point does not exhibit any movement. As a result, the modem is advantageous in that the S/N ratio of a signal can be improved.

Furthermore, since the modem includes the frequency reverse shifting section (frequency shifting section, second frequency shifting section) 222 in the reception section 220, it is possible, on the reception side, to reproduce a single tone signal from a dc signal transmitted thereto without deterioration of the S/N ratio by performing frequency reverse shifting corresponding to the frequency shifting which has been performed by the transmission side as an opposing apparatus.

c. Second Embodiment

Figure 11:
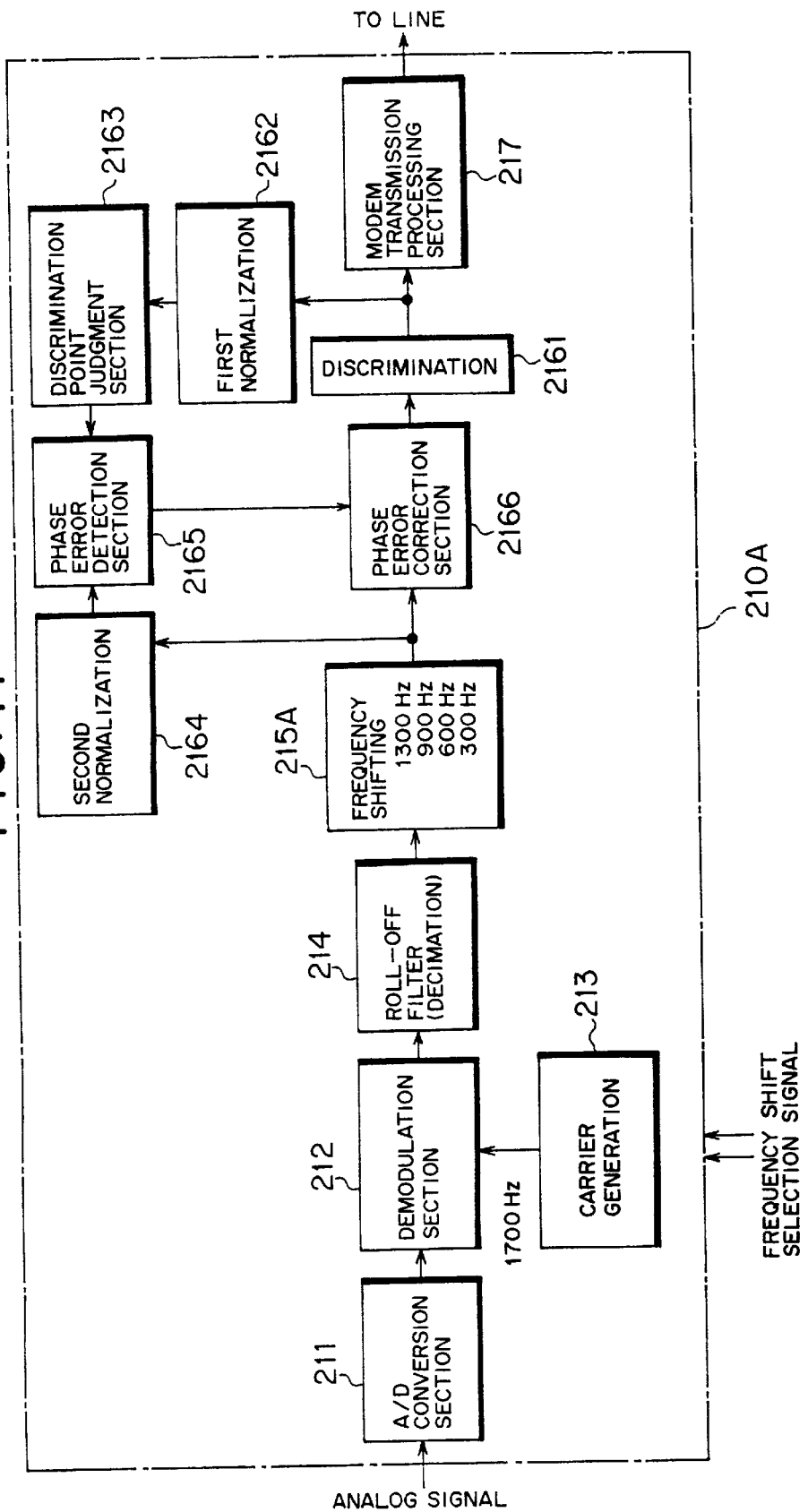
FIG. 11 is a block diagram showing a transmission section of a modem according to a second embodiment of the present invention.

FIG. 11 shows a transmission section 210A of a modem according to a second embodiment of the present invention. Also the modem as a communication apparatus according to the second embodiment can be applied, similarly to the modem of the first embodiment described above, as the modem 105 or 106 in such a communication system as shown in FIG. 31.

Further, the modem of the second embodiment may employ a reception section basically same as the reception section 220 of the modem of the first embodiment described hereinabove with reference to FIG. 5. Accordingly, overlapping description of the reception section 220 is omitted here to avoid redundancy.

The transmission section 210A shown in FIG. 11 is different in the following points from the transmission section 210 of the modem of the first embodiment:

(1) that frequency shifting can be varied in accordance with the frequency of the tone signal to be used by an in-band ringer:

(2) that it is discriminated whether or not a tone signal is being sent out: and (3) that a phase difference between the output of a frequency shifting section 215A and the output of a coordinate discrimination section 2161 is detected, and phase error correction is performed based on the phase difference.

The frequency shifting section 215A shown in FIG. 11 can perform four different kinds of frequency shifting by −1,300 Hz, −900 Hz, −600 Hz and −300 Hz. Also in this instance, the carrier signal for the demodulation section 212 has a frequency of 1,700 Hz.

The frequency of a tone signal to be used by an in-band ringer is not limited to 3,000 Hz as in the modem of the first embodiment, but also the frequencies of 2,600 Hz, 2,300 Hz, 2,000 Hz and so forth can be used for the tone signal. Where the in-band ringer can handle the four kinds of tone signals, in order to convert a tone signal into a dc signal, employment of mere −1,300 Hz is not sufficient for the frequency shift amount, and also such frequency shift amounts as −900 Hz, −600 Hz and −300 Hz must be settable.

In this instance, as the frequency shift carrier to be used by the frequency shifting section 215A shown in FIG. 11, frequency shift carriers having frequencies equal to the four kinds of frequencies mentioned above can be selectively used (equivalent circuits for them are almost same as that shown in FIG. 6). Here, if a tone signal to be used by an in-band ringer is required to have a particular frequency for each system, then the frequency shift carrier to be used by the frequency shifting section 215A may be set fixedly. On the other hand, where it is estimated that the frequency of a tone signal to be used may possibly be varied in some cases, also the frequency of the frequency shift carrier may be suitably elected in accordance with a tone signal to be transmitted.

The frequency shift carrier to be used by the frequency shifting section 215A described above can be set in accordance with a single frequency of a tone signal included in an analog signal inputted.

In particular, the frequency shifting section 215A includes, for example, such a table 215A-1 as shown in FIG. 14 which stores carrier information ($\cos\theta_1$ to $\cos\theta_4$, $\sin\theta_1$ to $\sin\theta_4$) of the real part component and the imaginary part component corresponding to the frequency shift carriers. When one of the four different frequency shift carriers is to be selected, digital information of 2 bits as selection information is inputted from the outside, and the table 215A-1 described above can be referred to in response to the selection information to extract carrier information from the table 215A-1.

Where the frequency shifting section 215A can handle a plurality of kinds of frequency shifting in this manner, also when tone signals having different frequencies are used by in-band ringers, each of the tone signals can be converted into a dc signal and can be transmitted via a dedicated line without suffering from deterioration of the S/N ratio.

It is to be noted that, if the frequency reverse shift amounts of the reception section 220 are not set to amounts corresponding to the frequency shift amounts of the transmission section 210A, naturally a reception signal cannot be reproduced correctly.

Where the frequency shift amount by the transmission section 210A is set to a fixed value, also the frequency reverse shift amount by the reception section 220 may be set to a fixed value in advance.

It sometimes occurs that a frequency deviation is produced with a single tone signal to be inputted to the transmission section 210A or a deviation appears with a clock signal which makes a reference to signal processing in the modem. When such variable deviations are involved, there is the possibility that a single tone signal for which frequency shifting has been performed by the frequency shifting section 215A may not make a complete dc signal. If a frequency shifted signal does not make a complete dc signal, then a discrimination error appears in a result of discrimination on a two-dimensional plane. Since such discrimination error cumulatively increases as time passes, there is the possibility that a signal point corresponding to a single tone signal which should originally be fixed to a single discrimination point may be displaced to another discrimination point.

In the modem of the second embodiment, since it is presumed that, when a single tone signal is transmitted or received, a single discrimination point is transmitted or received, if such displacement of the discrimination point occurs, then there is the possibility that, on the reception side, a received signal may not be recognized as a tone signal.

The features (2) and (3) described hereinabove are used to solve such problems as described above.

Figure 12:
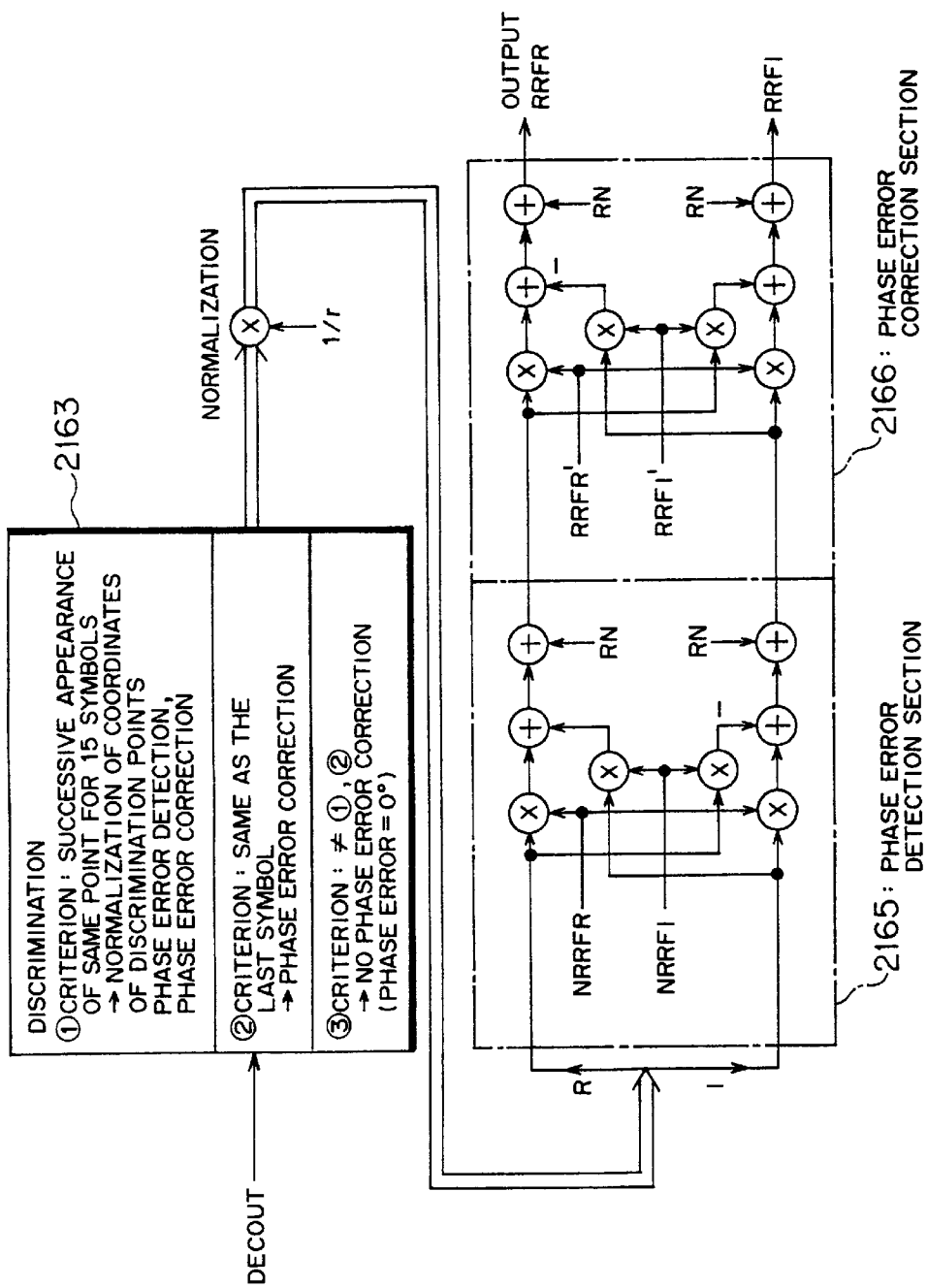
FIG. 12 is a detailed block diagram of part of the transmission section shown in FIG. 11.

As a countermeasure for solving the problems, the transmission section 210A in the modem of the second embodiment includes, in addition to the components of the transmission section 210 in the first embodiment, a discrimination point judgment section 2163, a phase error detection section 2165 and a phase error correction section 2166. The transmission section 210A of the modem of the second embodiment additionally includes first and second normalization sections 2162 and 2164. FIG. 12 shows an equivalent circuit of the discrimination point judgment section 2163 (DISCRIMINATION 1 in FIG. 12), first normalization section 2162 (NORMALIZATION in FIG. 12), phase error detection section 2165 and phase error correction section 2166.

It is to be noted that the coordinate discrimination section 2161 has a similar construction to the coordinate discrimination section (refer to reference numeral 216) in the modem of the first embodiment described hereinabove.

The discrimination point judgment section 2163 discriminates whether or not a signal inputted is a single tone signal. The phase error detection section 2165 detects a phase difference (phase error) between the phase of a signal outputted from the frequency shifting section 215A and the phase of another signal outputted from the coordinate discrimination section 2161. The phase error correction section 2166 corrects the phase error of the signal outputted from the frequency shifting section 215A in accordance with the phase error detected by the phase error detection section 2165.

As described hereinabove, when coordinate discrimination of a single tone signal is performed, a result of the discrimination exhibits the same discrimination point. On the other hand, when coordinate discrimination of a voice or FAX signal other than a single tone signal is performed, since it includes various frequency components, it is considered that, even if frequency shifting is performed for the signal, the possibility that the same discrimination point may be successively outputted from the coordinate discrimination section 2161 is very low.

In particular, the discrimination point judgment section 2163 receives a coordinate discrimination result from the coordinate discrimination section 2161 and discriminates, based on whether or not the same discrimination results are inputted, whether or not the signal inputted is a single tone signal.

More particularly, the discrimination point judgment section 2163 confirms discrimination points of a signal (DECOUT) outputted from the coordinate discrimination section 2161. If a predetermined number of (15 symbols in the second embodiment) same description points appear successively, then the discrimination point judgment section 2163 determines that the signal inputted corresponds to a single tone signal (① in FIG. 12). On the other hand, when the successive discrimination points are not the same discrimination point, the discrimination point judgment section 2163 determines that this signal is not a single tone signal (③ in FIG. 12).

When the input signal corresponds to a single tone signal, normalization of discrimination point coordinates, detection of a phase error between the output of the frequency shifting section 215A and the output of the coordinate discrimination section 2161 and correction of the phase error of the output of the frequency shifting section 215A are performed. It is to be noted that, in the second embodiment, phase error detection is performed once when the same discrimination point appears successively for 15 symbols.

When the same discrimination point is discriminated for 15 symbols, the output of the discrimination point judgment section 2163 (same as the output of the coordinate discrimination section 2161) is multiplexed by a coefficient $1/r$ by the first normalization section 2162 to effect normalization of the coordinates. Then, the signal normalized by the first normalization section 2162 is outputted to the phase error detection section 2165. It is to be noted that the input to the phase error detection section 2165 shown in FIG. 12 is in a form divided into a real part and an imaginary part. Further, a signal before inputted to the phase error detection section 2165 is a vector signal (indicated by a double line in FIG. 12).

On the other hand, the signal outputted from the frequency shifting section 215A is inputted to the second normalization section 2164, by which normalization of the signal is performed. FIG. 13 shows an equivalent circuit of the second normalization section 2164. Referring to FIG. 13, the second normalization section 2164 includes an inverse number calculation section 21641, a multiplication section 21642 and a rounding processing section 21643.

It is to be noted that, also in FIG. 13, a signal is indicated in a form divided into a real part and an imaginary part. The signal inputted to the second normalization section 2164 is inputted to the inverse number calculation section 21641, by which it is multiplied by an inverse number to it. Then, the signal inputted to the second normalization section 2164 and an output of the inverse number calculation section 21641 are multiplied by the multiplication section 21642 and then rounded by the rounding processing section 21643, thereby to normalize the output of the frequency shifting section 215A.

Referring back to FIG. 12, the phase error detection section 2165 detects, when it is determined by the discrimination point judgment section 2163 that same discrimination results successively appear, a phase difference between the phase of the signal for which frequency shifting has been performed by the frequency shifting section 215A and the phase of the signal from the coordinate discrimination section 2161, and has a function as a phase difference detection section. More particularly, the phase error detection section 2165 receives normalization outputs NRRFR and NRRFI from the second normalization section 2164. Then, a phase error from the output of the first normalization section 2162 is detected by the phase error detection section 2165.

Then, a signal representative of the detected phase error is inputted to the phase error correction section 2166. The phase error correction section 2166 uses the phase difference detected by the phase error detection section 2165 to correct the phase of the signal for which frequency shifting has been performed by the frequency shifting section 215A, and outputs a signal of the corrected phase to the coordinate discrimination section 2161. The phase error correction section 2166 thus has a function as a phase correction section.

More particularly, the phase error correction section 2166 receives the outputs RRFR' and RRFI' of the frequency shifting section 215A, corrects the phase error of them in accordance with the outputs of the phase error detection section 2165 and outputs resulting signals as RRFR and RRFI.

On the other hand, if it is determined by the discrimination point judgment section 2163 that the input signal is not a single tone signal, no phase error correction is performed. In short, where the input signal is such a signal as ordinary voice, it can be considered natural that there is a difference in phase and/or amplitude between successive symbols, and accordingly, no phase error correction need be performed for a signal of the type mentioned. As the processing for restraining phase error correction from being performed, such control is performed as to make the phase error to be outputted from the phase error detection section 2165 equal to zero degree, that is, to eliminate a phase error.

When the same discrimination point does not successively appear for 15 symbols but is same as the discrimination point for the last symbol, coordinate normalization of discrimination points or phase error detection is not performed, but phase error correction is performed (refer to ② in FIG. 12).

Where the construction described above is employed, when a single tone signal is being sent out, movement of a discrimination point or the like arising from a deviation of a tone signal or a clock signal can be prevented, but when the signal being sent out is not a tone signal as yet, it is possible to refrain such phase error correction from being performed.

It is to be noted that, on the reception side, such processing as phase error detection or correction based on the type of a signal received is not required. In short, since a discrimination point received corresponds to the discrimination point transmitted, if movement of a discrimination point does not occur on the transmission side, movement of the discrimination point is not involved in the received signal either.

In this manner, with the modem of the second embodiment of the present invention, since it includes the discrimination point judgment section 2163, phase error detection section 2165 and phase error correction section 2166, when a single tone signal is to be sent out, in order to prevent occurrence of movement of a discrimination point arising from a deviation of a tone signal or the like, a phase difference between the phase of the signal for which frequency shifting has been performed and the discriminated phase of the signal can be calculated and the phase error of the frequency shifted signal can be corrected with the phase difference. Consequently, movement of a discrimination point when a single tone signal is being sent out can be prevented.

Particularly, although it is necessary to prevent movement of a discrimination point when a single tone signal is being sent out, since, for such a signal as ordinary voice whose phase is not varied in whichever manner frequency shifting is performed for it, there is no necessity of taking a countermeasure for preventing movement of a particular point, unnecessary phase error correction need not be performed any more by constructing the modem so that phase error correction is performed only while a single tone signal is sent out.

Here, the discrimination of whether or not the input signal is a single tone signal is performed making use of the fact that, while a tone signal converted into a dc signal is arranged at the same point, the same discrimination point does not appear successively with a voice signal or the like. Thus, whether or not a single tone signal is sent out can be discriminated by a simple method.

Further, since the frequency shift amount by the frequency shifting section 215A can be set in accordance with a single frequency of a tone signal included in an analog signal inputted, the modem is advantageous in that, also where tone signals having different frequencies are used by in-band ringers, each of the tone signals can be converted into a dc signal and transmitted via a dedicated line so that the S/N ratio may not be deteriorated, and also on the reception side, a reception signal can be reproduced correctly.

d1. Third Embodiment

Figure 15:
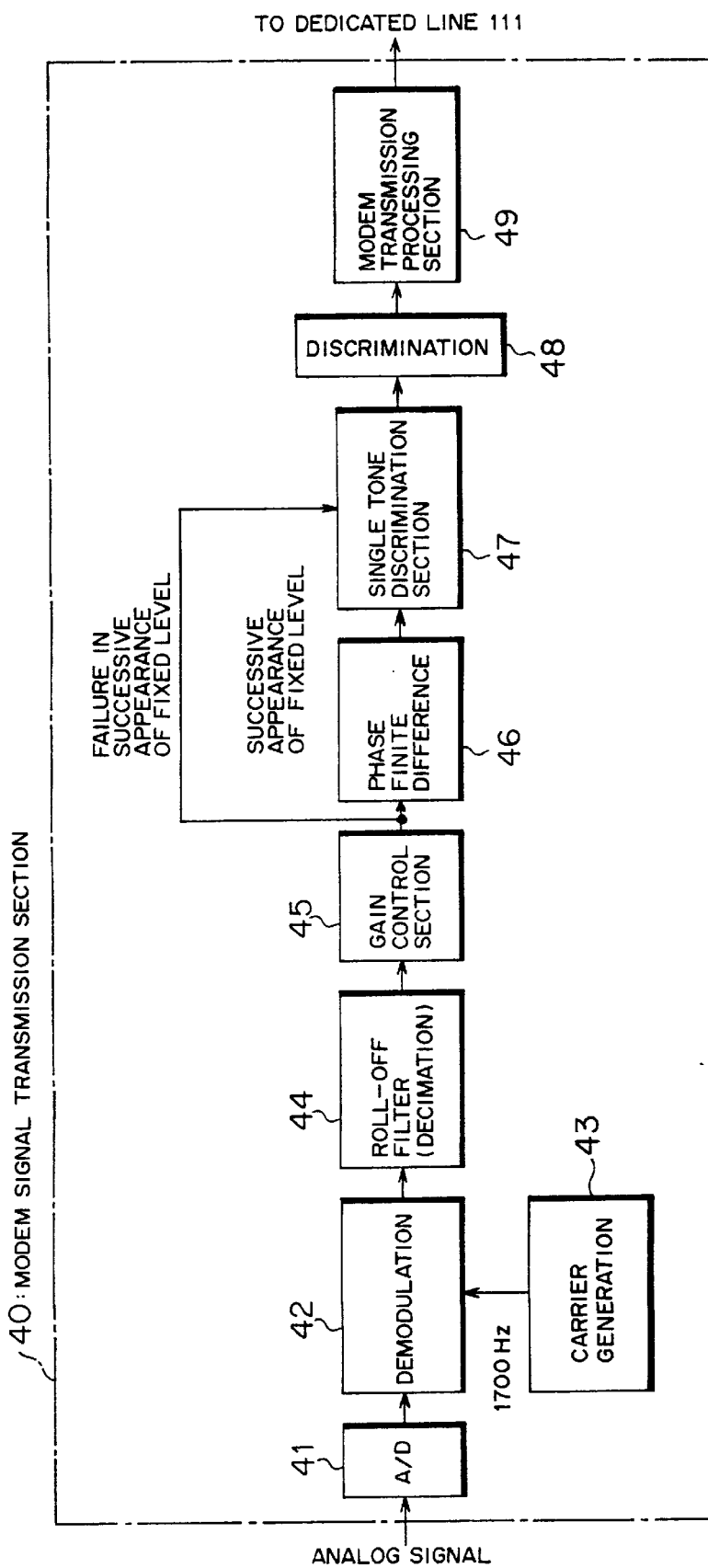
FIGS. 15 and 16 are block diagrams showing a modem signal transmission section and a modem signal reception section of a modem according to a third embodiment of the present invention.
Figure 16:
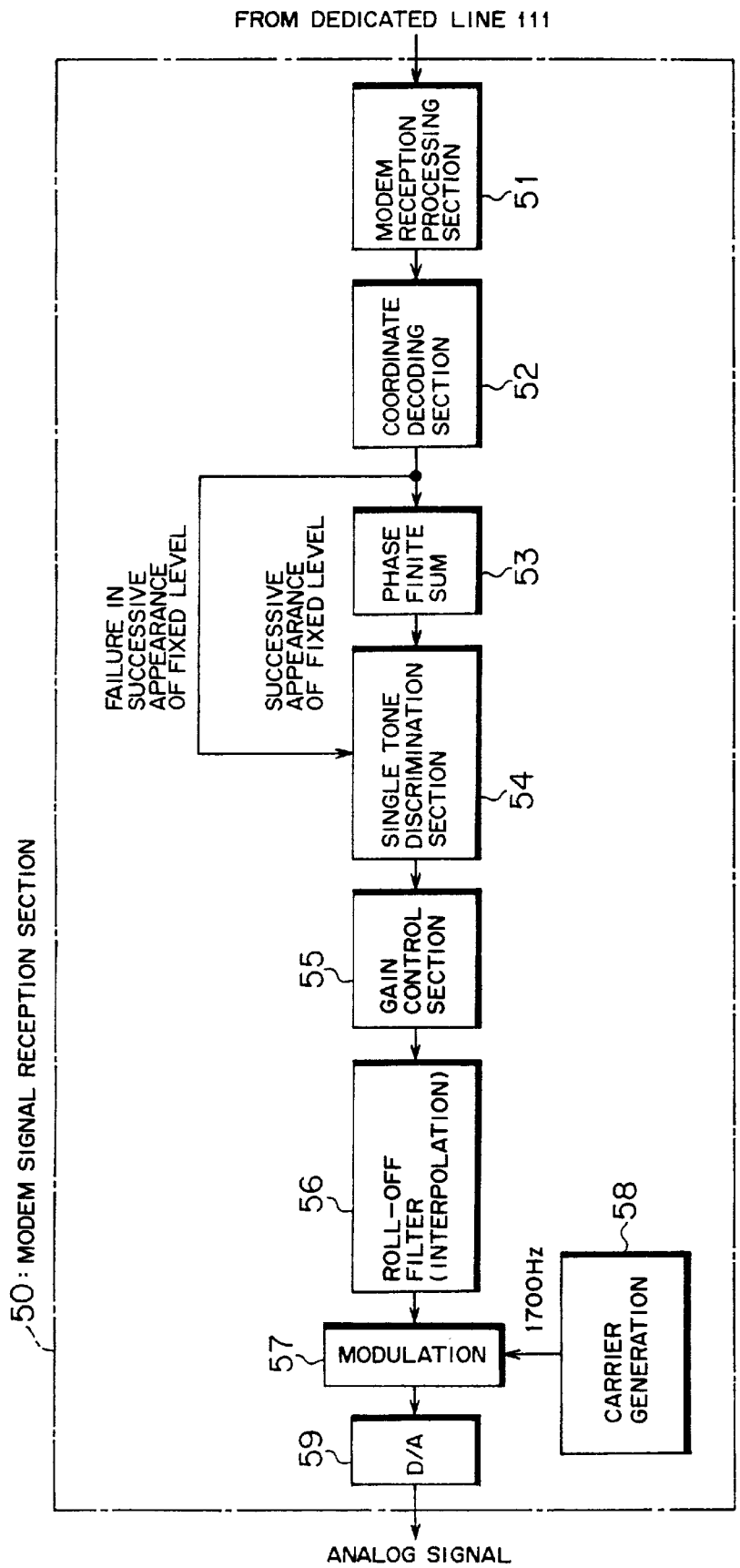

Referring now to FIGS. 15 and 16, there are shown in block diagrams a modem signal transmission section (transmission section, transmission apparatus) and a modem signal reception section (reception section, reception apparatus), respectively, which form a communication apparatus according to a third embodiment of the present invention.

Also the modem as a communication apparatus according to the third embodiment can be used as the modem 105 or 106 in such a communication system as described hereinabove with reference to FIG. 31.

In particular, if the modem according to the third embodiment is applied, for example, as the modem 105, that is, disposed at the position of the modem 105, then it can transmit, on one hand by a modem signal transmission section 40 shown in FIG. 15, a transmission analog signal from a terminal 101 or 102 accommodated in the private branch exchange 103 to the modem 106 via the dedicated line 111, but can receive, on the other hand by a modem signal reception section 50 shown in FIG. 16, an analog signal from a terminal 109 or 110 on the opposing private branch exchange 108 side.

The modem signal transmission section 40 can perform demodulation, discrimination processing and so forth for a single tone signal from the in-band ringer 104 and transmit a resulting signal. On the other hand, the modem signal reception section 50 can perform decoding, modulation processing and so forth for a single tone signal (discrimination data) from the in-band ringer 107 and output a resulting signal to the in-band ringer 104.

As described above, the modem according to the third embodiment particularly includes such a modem signal transmission section 40 as shown in FIG. 15 and such a modem signal reception section 50 as shown in FIG. 16. It is to be noted that, while also the construction of the modem according to the third embodiment is described in detail paying attention to a case wherein it is disposed at the position of the modem 105 shown in FIG. 31, also the opposing modem 106 has a similar construction to the modem 105.

Referring to FIG. 15, the modem signal transmission section 40 includes an A/D conversion section 41, a demodulation section 42, a carrier generation section 43, a roll-off filter 44, a gain control section 45, a phase finite difference calculation section 46, a single tone discrimination section 47, a discrimination section 48 and a modem transmission processing section 49.

The A/D conversion section 41 receives an analog signal (for example, of a voice band of 0.3 to 3.4 kHz) inputted from a telephone terminal 102, a FAX terminal 101 or the in-band ringer 104 and converts the analog signal into a digital signal at a sample rate of, for example, approximately 10 to 11 kHz.

The demodulation section 42 provides, to the digital data from the A/D conversion section 41, angle information having a carrier frequency of, for example, approximately 1,700 Hz generated by the carrier generation section 43 for each predetermined angle to demodulate the digital data into a base band signal.

The roll-off filter 44 performs decimation processing for the demodulation signal from the demodulation section 42 to effect conversion from a sample rate (approximately 10 to 11 kHz, 4 samples/symbol) into a symbol rate (for example, approximately 2,500 to 2,750 Hz, 1 sample/symbol) to decrease the amount of information, and has a function as a filter for decimation processing.

It is to be noted that the frequency band of 1,700 Hz generated by the carrier generation section 43 and the frequency band of the symbol rate of 2,500 to 2,750 Hz after conversion by the roll-off filter 44 described above can be used, taking the voice and the frequency bands prescribed in the Recommendations V.29, V.22 bis, V.32 and so forth into consideration, commonly with them. Particularly, the demodulation frequency band of 1,700 Hz corresponds to the carrier frequency of the G3 FAX in the Recommendations V.29.

The gain control section 45 effects, in the preceding stage to calculation by the phase finite difference calculation section 46, gain control of the demodulation signal (transmission data) outputted from the roll-off filter 44 based on maximum level information of the demodulation signal which is inputted successively by a predetermined number of times in units of a symbol, and particularly has such a construction as seen in FIG. 17.

Referring to FIG. 17, the gain control section 45 includes a vector length calculation section 45*a*, a maximum value discrimination section 45*b*, a gain ratio calculation section 45*c*, a gain control data determination section 45*d*, a table 45*e*, a delay section 45*f* and a multiplication section 45*g*.

The vector length calculation section 45*a* adds square operation values of a real component (R) and an imaginary component (I) of an output signal (vector information) of the roll-off filter 44 to calculate a vector length component. To this end, the vector length calculation section 45*a* includes a pair of multiplication sections 45*a*-1 and 45*a*-2 and an addition section 45*a*-3.

The maximum value discrimination section 45*b* discriminates and selects vector length information having a maximum value from among vector length information successively Inputted for 15 symbols. The gain ratio calculation section 45*c* calculates a ratio of maximum value information (square sum operation value: for example, "1" may be used) of a discrimination plane to be used by the discrimination section 48 in the later stage to the vector length information (square sum operation value) from the maximum value discrimination section 45*b*.

The gain control data determination section 45*d* refers to such a table 45*e* as shown, for example, in FIG. 18 based on the ratio of the vector length information calculated by the gain ratio calculation section 45*c* to extract gain information to be used for automatic gain control. The gain information extracted by the gain control data determination section 45*d* is used for automatic gain control for each 15 symbols by the multiplication section 45*g* and besides is sent out as gain information for each 15 symbols to the reception side together with other transmission data.

The delay section 45*f* delays data of 15 symbols of the output signal of the roll-off filter 44 from which a maximum value of the vector length is selected by the maximum value discrimination section 45*b*, and outputs the delayed data.

The multiplication section 45*g* multiplies the data delayed by 15 symbols by the delay section 45*f* by the gain based on the automatic gain control information from the gain control data determination section 45*d*. Consequently, the gain of the data from the roll-off filter 44 can be controlled with reference to the maximum value of the discrimination plane of the discrimination section 48.

By the way, the phase finite difference calculation section 46 shown in FIG. 15 calculates a phase difference between successive demodulation signals from the demodulation section 42. More particularly, the phase finite difference calculation section 46 successively receives the gain controlled data from the gain control section 45 described above at the symbol rate and calculates phase finite differences between data of adjacent symbols.

Figure 19:
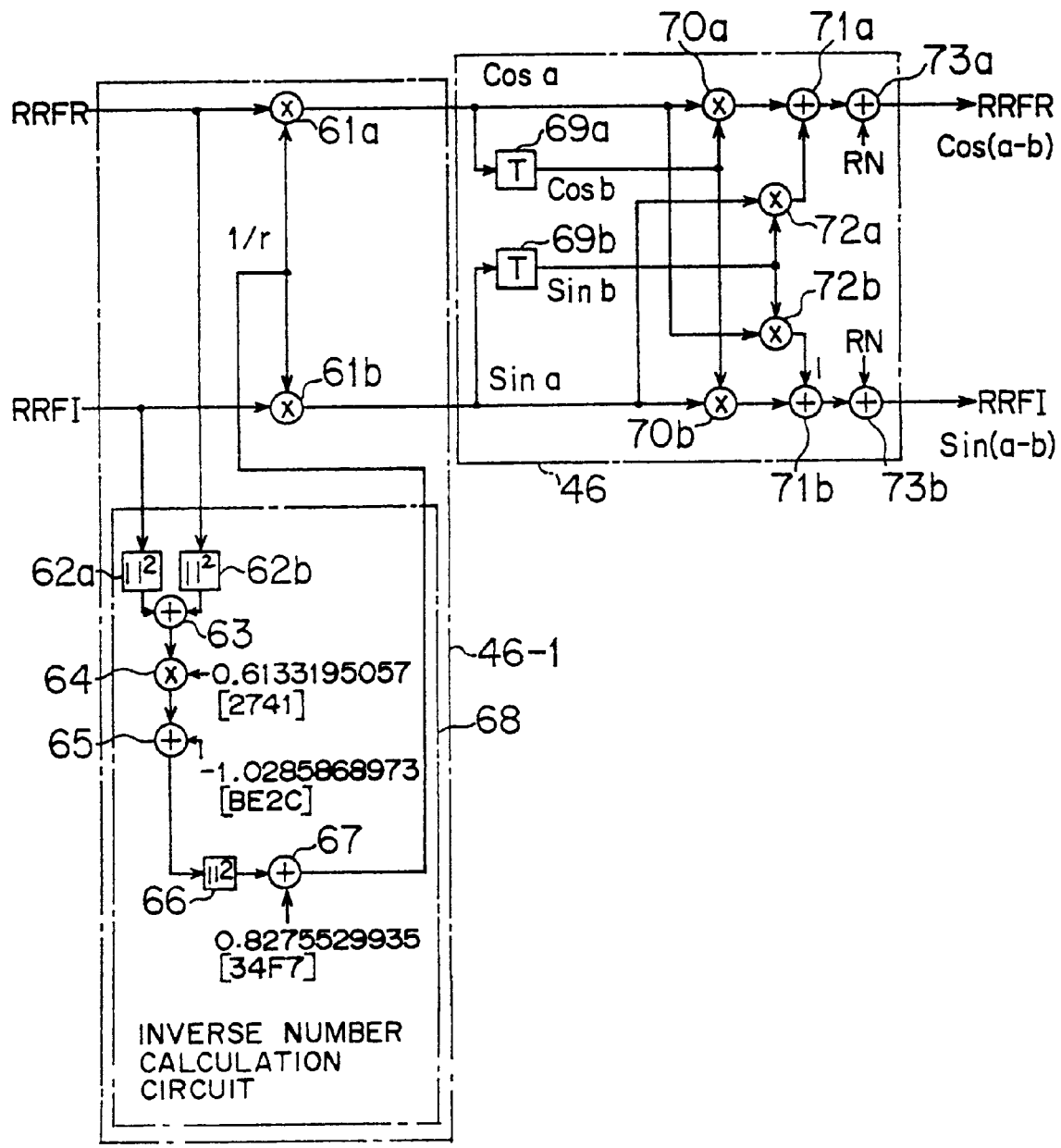
FIG. 19 is a block diagram showing part of the modem signal transmission section of the modem of FIGS. 15 and 16.

It is to be noted that, for example, such a level normalization section 46-1 as shown in FIG. 19 (not shown in FIG. 15) may be provided at the preceding stage to the phase finite difference calculation section 46 so that a phase finite difference may be calculated using data successively inputted to the phase finite difference calculation section 46 after level adjustment has been performed by the level normalization section 46-1.

In particular, the level normalization section 46-1 for normalizing the maximum levels of data of a real component and an imaginary component (RRFR and RRFI) to be inputted to the phase finite difference calculation section 46 to "1" is provided in the preceding stage to the phase finite difference calculation section 46 shown in FIG. 19.

The level normalization section 46-1 includes an inverse number calculation circuit 68 for calculating inverse numbers of the amplitudes r of the real component and the imaginary component, and a pair of multiplication sections 61a and 61b for multiplying the real part component and the imaginary part component by an inverse number 1/r of the amplitude. The inverse number calculation circuit 68 includes a pair of square calculation sections 62a and 62b, an addition section 63, a multiplication section 64, another addition section 65, a further square calculation section 66, and a further addition section 67.

The phase finite difference calculation section 46 calculates and outputs finite differences of a real component (cos a) and an imaginary component (sin a) having maximum levels normalized by the level normalization section 46-1 from data (cos b, sin b) inputted in the preceding cycle. In particular, the phase finite difference calculation section 45 outputs a phase finite difference [cos(a−b) as a real component RRFR and outputs another phase finite difference [sin(a−b] as an imaginary component (RRFI).

The phase finite difference calculation section 46 includes a pair of delay elements 69a and 69b, a pair of multiplication sections 70a and 70b, a pair of, addition sections 71a and 71b, another pair of multiplication sections 72a and 72b, and a pair of rounding processing sections 73a and 73b.

In particular, the phase finite difference calculation section 46 described above performs substantially such calculation as given by the following expressions (2) and (3):

$$\cos(a-b) = \cos a \cdot \cos b + \sin a \cdot \sin b \quad (3)$$

$$\sin(a-b) = \sin a \cdot \cos b - \cos a \cdot \sin b \quad (4)$$

By the way, the phase of the data outputted from the gain control section 45 (or roll-off filter 44) has, for a single tone signal, a fixed phase difference θ for each symbol as seen from signals (A1) to (A3) of FIG. 20. Also the level (amplitude) of the signal inputted for each symbol always has a fixed value.

Accordingly, for a tone signal as demodulation data inputted at the symbol rate from the gain control section 45, the phase finite difference calculation section 46 calculates a phase difference between adjacent symbols. Consequently, the phase finite difference calculation section 46 can always output the signal as data of one point (phase finite difference signal, refer to (A4)) as seen in FIG. 21.

The single tone discrimination section 47 serving as a transmission side single tone discrimination section discriminates whether or not a demodulation signal demodulated by the demodulation section 42 is a single tone signal. If it is discriminated that the demodulation signal is not a single tone signal, then the single tone discrimination section 47 outputs the demodulation signal from the demodulation section 42 to the discrimination section 48 in the following stage. However, if the demodulation signal is a single tone signal, then the phase finite difference signal from the phase finite difference calculation section 46 is outputted to the discrimination section 48 in the following stage.

More particularly, the single tone discrimination section 47 discriminates, when the level of the demodulation signal successively inputted by a predetermined number of times (for example, 15 times) from the gain control section 45 is fixed, that the demodulation signal inputted successively by 15 times is a single tone signal. Based on a result of the discrimination, a signal to be outputted to the discrimination section 48 in the following stage is selected as described above.

The discrimination section (coordinate discrimination section) 48 receives a signal for which decimation processing has been performed by the roll-off filter 44, and discriminates coordinates on a two-dimensional plane. The discrimination section 48 may have, for example, such a discrimination plane 48A having discrimination points of 63 values and having a radius (maximum value) of "1" as described hereinabove with reference to FIG. 10.

More particularly, the discrimination section 48 performs coordinate discrimination either for a demodulation signal from the demodulation section 42 (signal from the gain control section 45) or for a phase finite difference signal from the phase finite difference calculation section 46 thereby to adjust the amount of the signal demodulated into the base band signal to an information amount necessary to transmit the signal over the dedicated line 111.

In particular, the discrimination section 48 performs coordinate discrimination of the demodulation signal from the demodulation section 42 when the result of the discrimination by the single tone discrimination section 47 proves that the demodulation signal is not a single tone signal. However, when the demodulation signal is a single tone signal, the discrimination section 48 performs coordinate discrimination of the phase finite difference signal [refer to (A4) of FIG. 21] from the phase finite difference calculation section 46.

Consequently, since the discrimination section 48 can perform, where the demodulation signal is a single tone signal, coordinate discrimination of the phase finite difference signal [refer to (A4) of FIG. 21] from the phase finite difference calculation section 46, the result of the discrimination can always be stabilized to the value of a fixed point [refer to the point (P1) in FIG. 22]. Consequently, the resolution of a single tone signal is raised to reduce discrimination errors by the discrimination section 48.

The modem transmission processing section 49 performs, for digital data as a result of the discrimination from the discrimination section 48, modem processing such as, for example, gray/natural conversion, finite summing, signal point generation, roll-off filter processing, modulation processing and D/A conversion processing, and transmits a modem signal (analog signal), for which such modem processing has been performed, to the opposing modem 106 (or in-band ringer 107) via the dedicated line 111. Thus, the modem transmission processing section 49 has a function as a signal transmission section for transmitting a result of discrimination of the discrimination section 48.

It is to be noted that the components 42 to 49 of the modem signal transmission section 40 except the A/D conversion section 41 described above are principally formed from a DSP (Digital Signal Processor) and an MPU (Microprocessor Unit).

Referring now to FIG. 16, the modem signal reception section 50 shown includes a modem reception processing section 51, a coordinate decoding section 52, a phase finite sum calculation section 53, a single tone discrimination section 54, a gain control section 55, a roll-off filter 56, a modulation section 57, a carrier generation section 58 and a D/A conversion section 59.

The modem reception processing section 51 performs, for a signal received from the opposing modem 106 (or in-band ringer 107) via the dedicated line 111, reverse modem processing such as A/D conversion processing, demodulation processing, roll-off filter processing, automatic gain control, automatic equalization, carrier phase correction, signal point discrimination and finite difference calculation. Thus, the modem reception processing section 51 has a function as a signal reception section for receiving a transmission signal from the opposing apparatus 106 via the line 111.

The coordinate decoding section 52 performs decoding processing for successively received signals (discrimination data) for which reverse modem processing has been performed by the modem reception processing section 51. In other words, the coordinate decoding section 52 decodes discrimination data discriminated by the modem signal transmission section of the opposing modem 106 into vector information having coordinate information.

The phase finite sum calculation section 53 calculates a finite sum of successively received signals after decoded into vector information by the coordinate decoding section 52. In particular, when a reception signal transmitted from the opposing modem 106 and received by the modem reception processing section 51 and the coordinate decoding section 52 Is discrimination information of phase finite difference information, the phase finite sum calculation section 53 can perform phase finite sum calculation to reproduce the reception signal back into those data prior to the finite difference calculation.

The single tone discrimination section 54 serving as a reception side single tone discrimination section discriminates, based on gain control information from the opposing modem 106 (gain information determined by the gain control data determination section 45*d*), whether or not the level of the reception signal inputted successively by a predetermined number of times is fixed. If the level is fixed, then the single tone discrimination section 54 discriminates that the reception signal inputted successively by the predetermined number of times is a single tone signal.

If it is discriminated based on a result of the discrimination by the single tone discrimination section 54 that the reception signal is not a single tone signal, then the single tone discrimination section 54 outputs the reception signal from the coordinate decoding section 52 to the gain control section 55. However, if it is discriminated that the reception signal is a single tone signal, then the single tone discrimination section 54 outputs the phase finite sum information from the phase finite sum calculation section 53 to the gain control section 55.

The gain control section 55 converts, based on gain control information from the opposing modem 106 (gain information determined by the gain control data determination section 45*d*), the reception signal (vector information) from the single tone discrimination section 54 into a signal of an original amplitude prior to the gain control by the gain control section (refer to reference numeral 45) on the transmission side.

The roll-off filter 56 has a function as a filter for interpolation processing which performs interpolation processing (processing corresponding to the decimation processing by the roll-off filter 44 on the transmission side described hereinabove) for a signal for which gain control has been performed by the gain control section 55.

In particular, by the filter processing by the roll-off filter 56, conversion from a symbol rate (for example, approximately 2,500 to 2,750 Hz) into a sample rate (approximately 10 to 11 kHz) can be performed to restore the original information amount.

The modulation section 57 modulates the output signal of the roll-off filter 56 with a carrier frequency signal of approximately 1,700 Hz generated by the carrier generation section 58 to convert the base band signal back into a signal of the original frequency band (for example, for a voice signal, 0.3 to 3.4 kHz).

Accordingly, if it is discriminated based on a result of the discrimination by the single tone discrimination section 54 that the reception signal is not a single tone signal, the modulation section 57 modulates the reception signal. But if it is discriminated that the reception signal is a single tone signal, the modulation section 57 modulates the phase finite sum signal from the phase finite sum calculation section 53.

The D/A conversion section 59 converts the digital signal modulated by the modulation section 57 into an analog signal. The analog signal obtained by the conversion is outputted as an output of the modem signal reception section 50 to the in-band ringer 104.

It is to be noted that also the components 51 to 58 of the modem signal reception section 50 except the D/A conversion section 59 described above are principally formed from a DSP (Digital Signal Processor) and an MPU (Microprocessor Unit).

Where the modem according to the third embodiment of the present invention having the construction described above is applied to the modems 105 and 106 shown in FIG. 31, when communication is to be performed between telephone terminals 102 and 110 or between FAX terminals 101 and 109, dial information for which signal conversion has been performed by the in-band ringers 104 and 107 is communicated between the private branch exchanges 103 and 108, and an analog signal such as a voice signal or a FAX signal is communicated via the modems 105 and 106 and the dedicated line 111.

For example, when the modem signal transmission section 40 which forms the modem 105 tries to send out transmission data as a FAX signal from a FAX terminal 101 or an analog signal from a telephone terminal 102 or the in-band ringer 104 to the dedicated line 111, individual signal processing is performed for the transmission data by the A/D conversion section 41, demodulation section 42 and roll-off filter 44, and then automatic gain control is performed by the gain control section 45.

Figure 23:
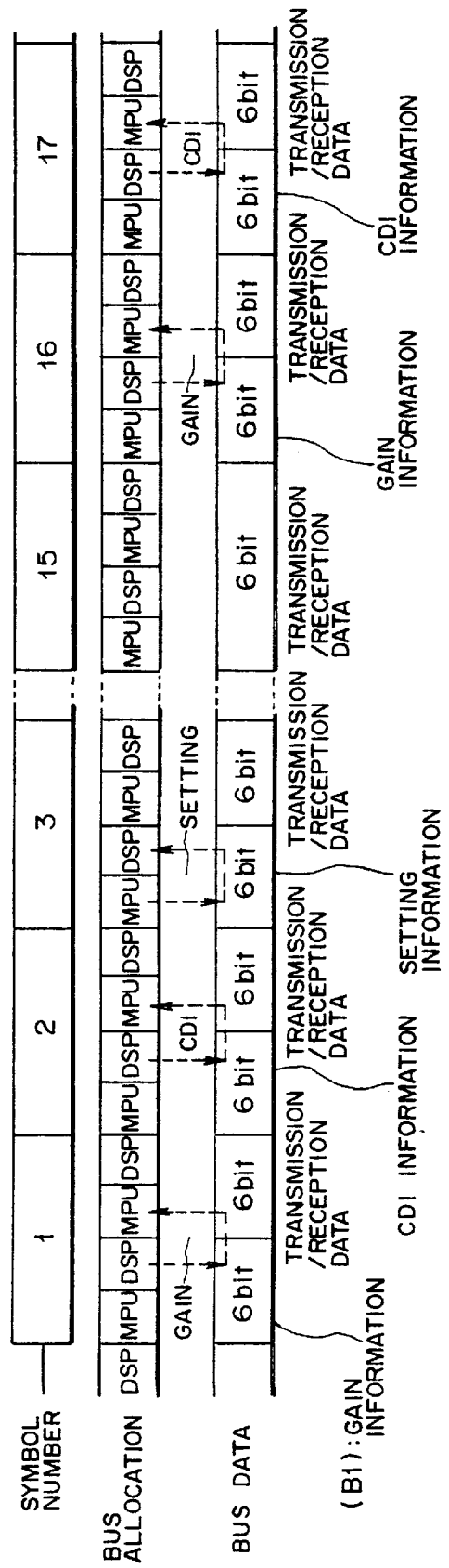
FIG. 23 is a diagrammatic view illustrating operation of the modem of FIGS. 15 and 16.

Gain information to be used for the automatic gain control by the gain control section 45 is sent out, for example, at the rate of once (6 bits) per 15 symbols as seen from gain information (B1) in FIG. 23. For example, where transmission data are transmitted by 3 kHz, gain information is transmitted by 200 Hz.

The single tone discrimination section 47 discriminates, based on the fixedness of the level of a demodulation signal successively inputted by a predetermined number of times (for example, 15 times) from the gain control section 45, whether or not the transmission data are a single tone signal. In particular, when the demodulation signal has a fixed level over successive 15 symbols, the single tone discrimination section 47 discriminates that the transmission data are a single tone signal, but when the demodulation signal does hot have a fixed level over successive 15 symbols, the single tone discrimination section 47 discriminates that the transmission data are a signal other than a single tone signal such as, for example, a voice signal or a FAX signal.

If it is discriminated by the single tone discrimination section 47 that the transmission data are a single tone signal, then the discrimination section 48 performs coordinate discrimination of a result of calculation of phase finite differences of successive transmission data from the phase finite difference calculation section 46. However, when it is discriminated that the transmission data are a signal other than a single tone signal, the discrimination section 48 performs coordinate discrimination of the transmission data from the gain control section 45.

Consequently, a single tone signal can maintain a resolution required for recognition of the in-band ringer 107 and can be transmitted without suffering from deterioration of the S/N radio.

In particular, a signal demodulated back into a base band signal by the demodulation section 42 has a fixed signal level if it is a single tone signal, and if the fixed level is successively discriminated by the single tone discrimination section 47, then the signal is discriminated as a single tone signal. Data for which phase finite differences of signals at present and in the past (prior by one tap interval) have been calculated exhibit a fixed phase where they are of a single tone signal. In particular, if the discrimination section 48 discriminates the phase difference signal, then since it appears stationarily at one point on the discrimination plane, also the result of the discrimination always exhibits a fixed point, and a pure tone can be transmitted.

Thereafter, transmission digital data (for example, of 19.2 kbps or more) for which coordinate discrimination has been performed by the discrimination section 48 as described above are transmitted, after modem processing is performed for them by the modem transmission processing section 49, to the opposing (reception side) modem 106 (in-band ringer 107) via the dedicated line 111.

The reception side modem 106 receives the transmission signal from the modem 105 via the dedicated line. The transmission signal is processed successively by the modem reception processing section 51 and the coordinate decoding section 52, and a phase finite sum of successive reception data is calculated by the phase finite sum calculation section 53.

When the transmission data from the opposing (transmission side) modem 105 described above are received as reception data, the single tone discrimination section 54 supervises the continuity of the fixed level of the reception data from the coordinate decoding section 52 to discriminate whether or not the reception data are a single tone signal.

More particularly, the single tone discrimination section 54 discriminates, based on gain information from the gain control data determination section 45*d* of the transmission side modem 105, whether or not the reception data are a single tone signal. In particular, if the reception data exhibit a fixed level over successive 15 symbols, then the single tone discrimination section 54 discriminates that the reception data are a single tone signal, but if the reception data do not exhibit a fixed level, then the single tone discrimination section 54 discriminates that the reception data are a signal other than a single tone signal such as, for example, a FAX signal or a voice signal.

If the result of the discrimination by the single tone discrimination section 54 indicates that the reception data are a single tone signal, then gain control and roll-off filter processing are performed for a result of calculation of a phase finite sum of successive reception data from the phase finite sum calculation section 53, and a resulting signal is modulated by the modulation section 57. If the reception data are not a signal other than a single tone signal such as, for example, a voice signal or a FAX signal, gain control and roll-off filter processing are performed for the reception data from the coordinate decoding section 52, and a resulting signal is modulated by the modulation section 57.

In other words, the modulation section 57 modulates a result of calculation of a phase finite sum when the reception data are discriminated to be a single tone signal, but modulates the reception data when the reception data are determined to be a signal other than a single tone signal.

It is to be noted that the modulation data (of a symbol rate) modulated in such a manner as described above are converted into an analog signal (of a sample rate) by the D/A conversion section 59 and then outputted to the in-band ringer 107. The in-band ringer 107 can recognize the pure tone signal transmitted with discrimination data of finite difference information as described above with certainty.

In this manner, with the modem according to the third embodiment of the present invention, since the modem signal transmission section 40 includes the phase finite difference calculation section 46, single tone discrimination section 47 and discrimination section 48, when it is discriminated that reception data are a single tone signal, phase finite differences between successive reception data are calculated and coordinate discrimination is performed for a result of calculation of phase finite differences, whereafter resulting transmission data are transmitted. Further, since the modem signal reception section 50 is provided, when it is discriminated that reception data are a single tone signal, a phase finite sum of successive reception data is calculated and a result of the calculation of a finite sum is modulated. On the other hand, when it is discriminated that the reception data are a signal other than a single tone signal, the reception data can be modulated. Consequently, such a pure tone signal as satisfies a required S/N ratio can be transmitted, and the tone signal can be recognized with certainty on the termination side.

d2. Modification to the Third Embodiment

In the modem of the third embodiment described above, each of the single tone discrimination section 47 of the modem signal transmission section 40 and the single tone discrimination section 54 of the modem signal reception section 50 discriminates based the fixedness of the level of a signal inputted thereto whether or not transmission data or reception data is a single tone signal. However, the discrimination is not limited to the specific one, and whether or not transmission data or reception data is a single tone signal may be discriminated otherwise based on the fixedness of phase difference information of successively inputted signals.

Figure 24:
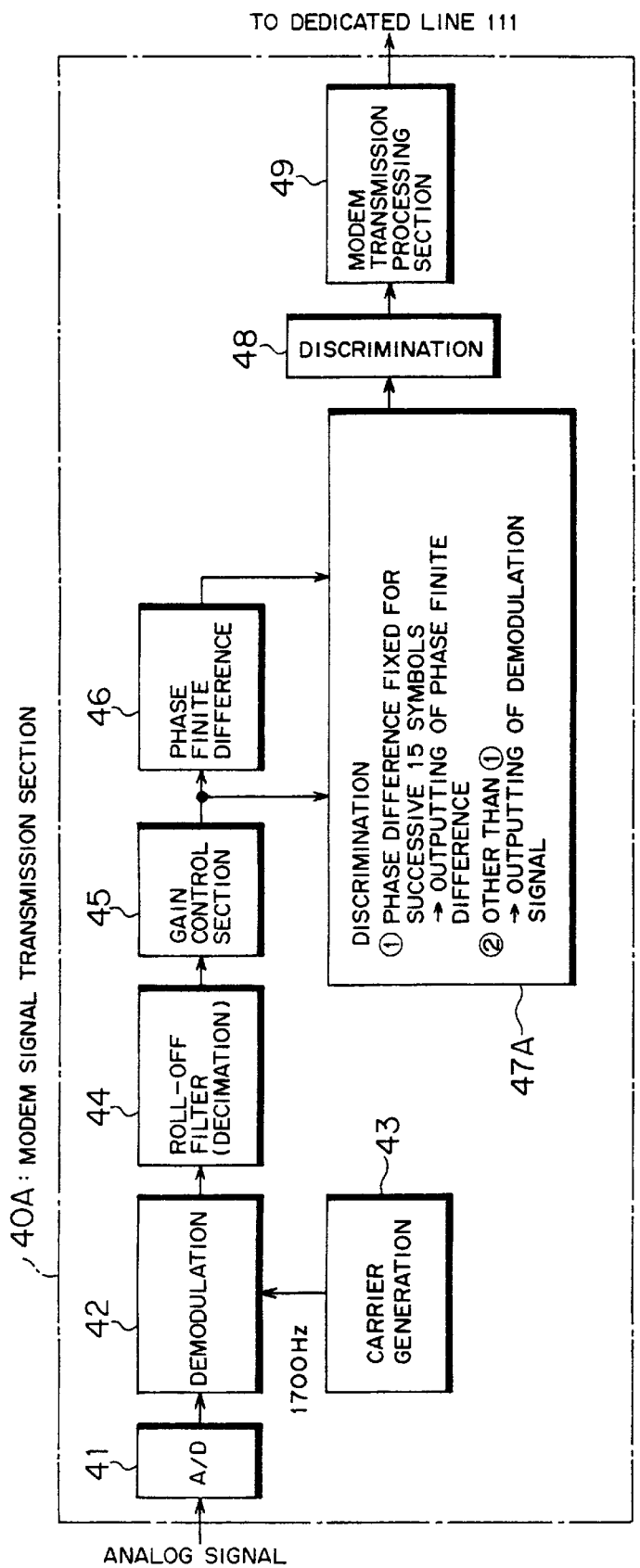
FIGS. 24 and 25 are block diagrams showing modifications to the modem signal transmission section and the modem signal reception section of FIGS. 15 and 16, respectively.
Figure 25:
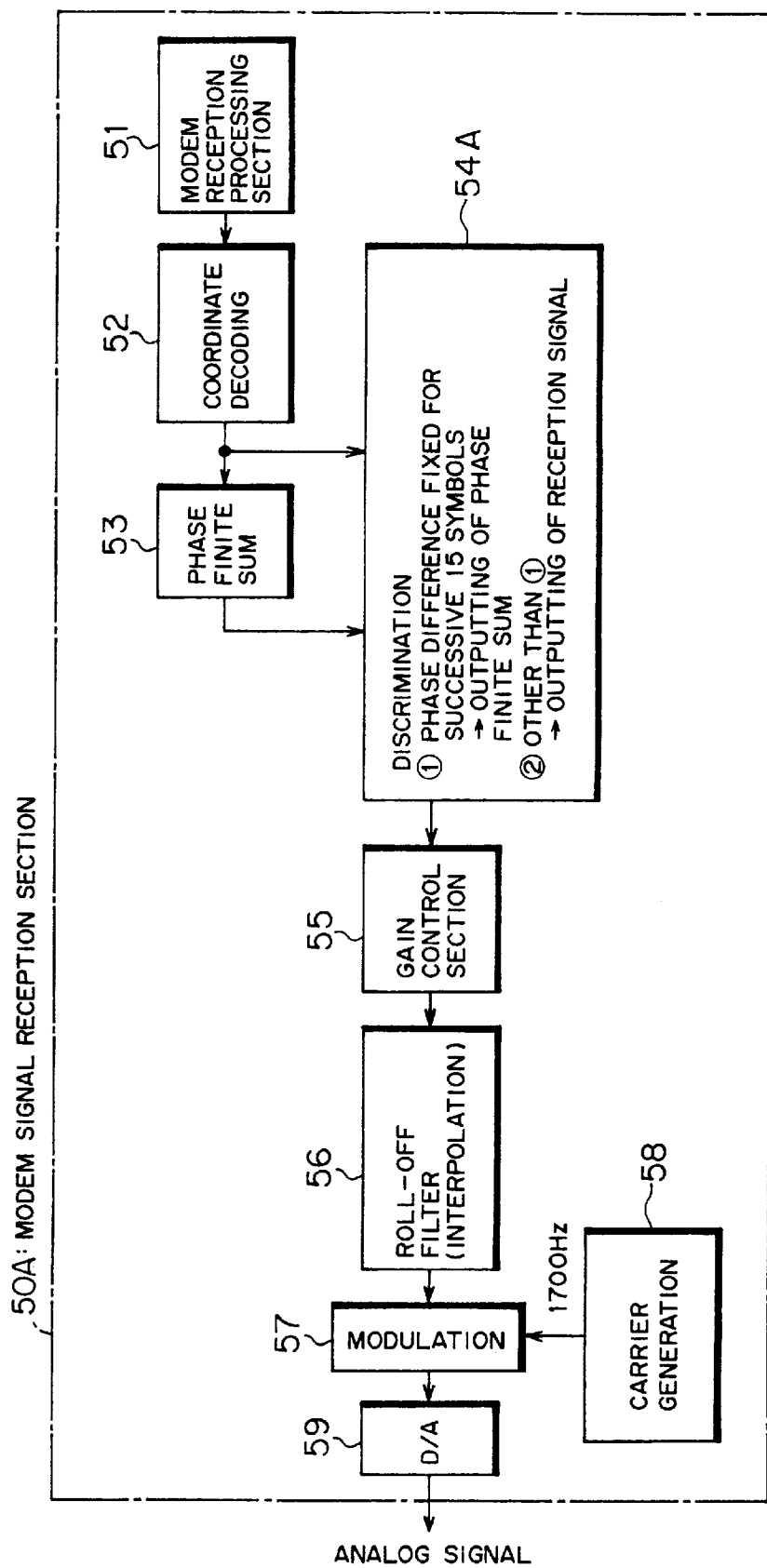

A modem modified in this manner may include a modem signal transmission section 40A having such a construction as shown in FIG. 24 and a modem signal reception section 50A having such a construction as shown in FIG. 25.

Referring first to FIG. 24, the modem signal transmission section 40A includes components similar to those (refer to reference numerals 41 to 46, 48 and 49) of the modem signal transmission section 40 of the modem of the third embodiment described hereinabove except that it includes, in place of the single tone discrimination section 47 in the third embodiment, a single tone discrimination section 47A having a different construction.

The single tone discrimination section 47A discriminates that a modulation signal is a single tone signal when the phase differences of the demodulation signal successively inputted by a predetermined number of times (for example, 15 times) in units of a symbol are fixed or uniform, but discriminates, in any other case, that the demodulation signal is a signal other than a single tone signal such as, for example, a FAX signal or a voice signal.

More particularly, the single tone discrimination section 47A supervises the fixedness of the phase difference from the phase finite difference calculation section 46 and, when the demodulation signal exhibits a fixed phase difference successively for 15 symbols, the single tone discrimination section 47A discriminates that the demodulation signal is a single tone signal and outputs phase finite difference calculation information from the phase finite difference calculation section 46 (refer to ① of FIG. 24). However, when the demodulation signal does not exhibit a fixed phase difference successively for 15 symbols, the single tone discrimination section 47A discriminates that the demodulation signal is a signal other than a single tone signal and outputs the demodulation signal from the gain control section 45 to the discrimination section 48 (refer to ② of FIG. 24).

Consequently, similarly as in the modem of the third embodiment described above, if a result of the discrimination by the single tone discrimination section 47A proves that the demodulation signal is not a single tone signal, then the discrimination section 48 effects coordinate discrimination of the demodulation signal from the gain control section 45, but if the demodulation signal is a single tone signal, then the discrimination section 48 can perform coordinate discrimination of the phase finite difference signal from the phase finite difference calculation section 46.

Referring now to FIG. 25, the also modem signal reception section 50A includes components similar to those (refer to reference numerals 51 to 53 and 54 to 59) of the modem signal reception section 50 of the modem of the third embodiment described hereinabove except that it includes, in place of the single tone discrimination section 54 in the third embodiment, a single tone discrimination section 54A having a different construction (refer to FIG. 16).

The single tone discrimination section 54A discriminates that a reception signal inputted from the coordinate decoding section 52 is a single tone signal when the reception signal exhibits a fixed phase difference successively for a predetermined number of times (for example, 15 times) in units of a symbol, but discriminates in any other case that the reception signal is a signal other than a single tone signal such as, for example, a FAX signal or a voice signal.

More particularly, the single tone discrimination section 54A supervises the fixedness of the phase difference of the reception data from the coordinate decoding section 52, and discriminates that the reception signal is a single tone signal if it exhibits a fixed phase difference successively for 15 symbols and outputs phase finite sum calculation information from the phase finite sum calculation section 53 to the gain control section 55 (refer to ① of FIG. 25). However, if the reception signal does not exhibit a fixed phase difference successively for 15 symbols, then the single tone discrimination section 54A discriminates that the reception signal is a signal other than a single tone signal and outputs the reception signal from the coordinate decoding section 52 to the gain control section 55 (refer to ② of FIG. 25).

Consequently, based on a result of the discrimination of the single tone discrimination section 54A, the modulation section 57 modulates the reception signal from the coordinate decoding section 52 when the reception signal is not a single tone signal, but can modulate the phase finite sum signal from the phase finite sum calculation section 53 when it is discriminated that the reception signal is a single tone signal.

Accordingly, also with the present modified modem, since it includes the modem signal transmission section 40A including the phase finite difference calculation section 46, single tone discrimination section 47A and discrimination section 48 and the modem signal reception section 50A, there is an advantage in that, similarly to the modem of the third embodiment described hereinabove, such a pure tone signal that can satisfy a requested S/N ratio can be transmitted and the tone signal can be recognized with certainty on the termination side.

e1. Fourth Embodiment

Figure 26:
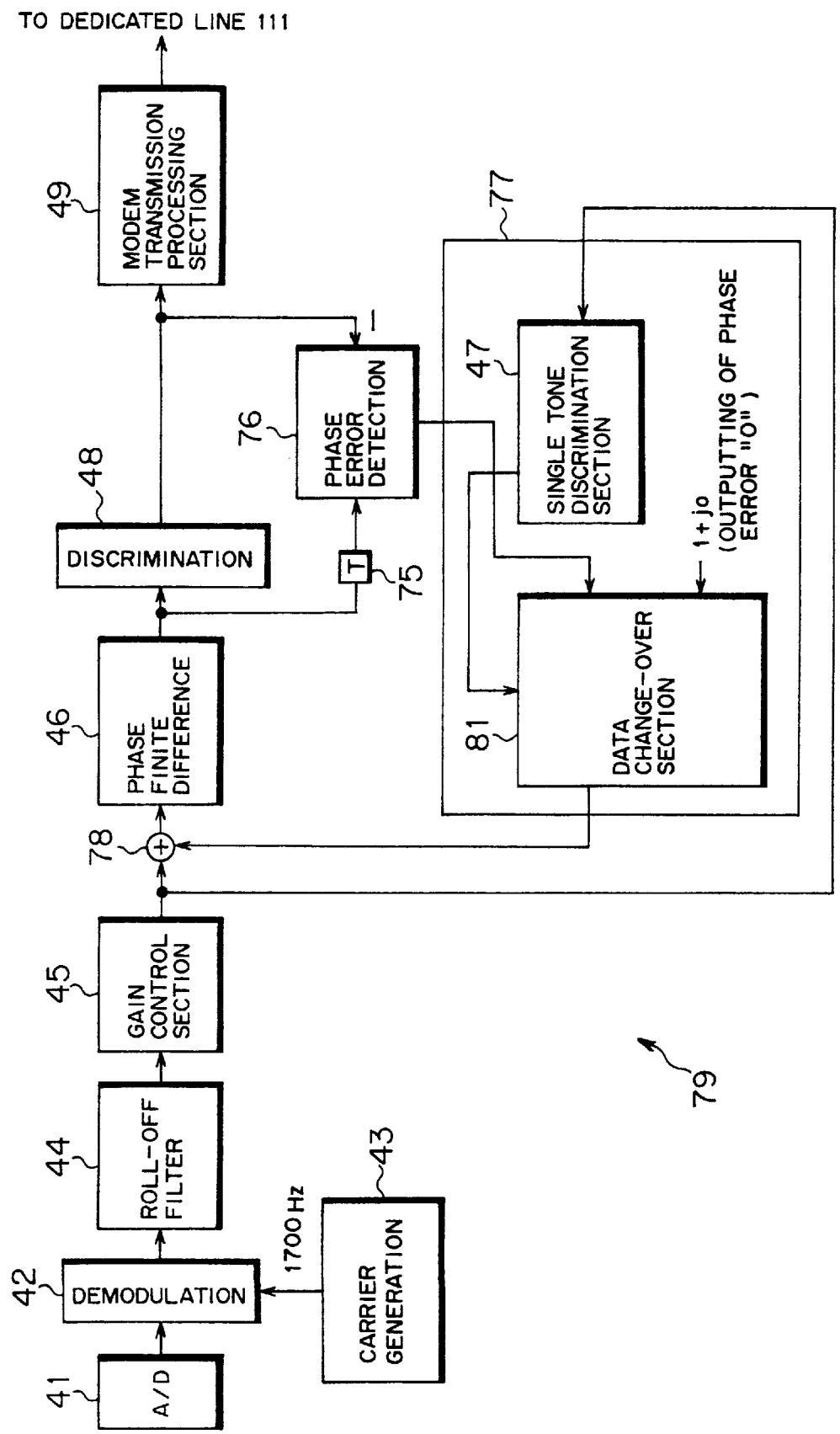
FIGS. 26 and 27 are block diagrams showing a modem signal transmission section and a modem signal reception section of a modem according to a fourth embodiment of the present invention.
Figure 27:
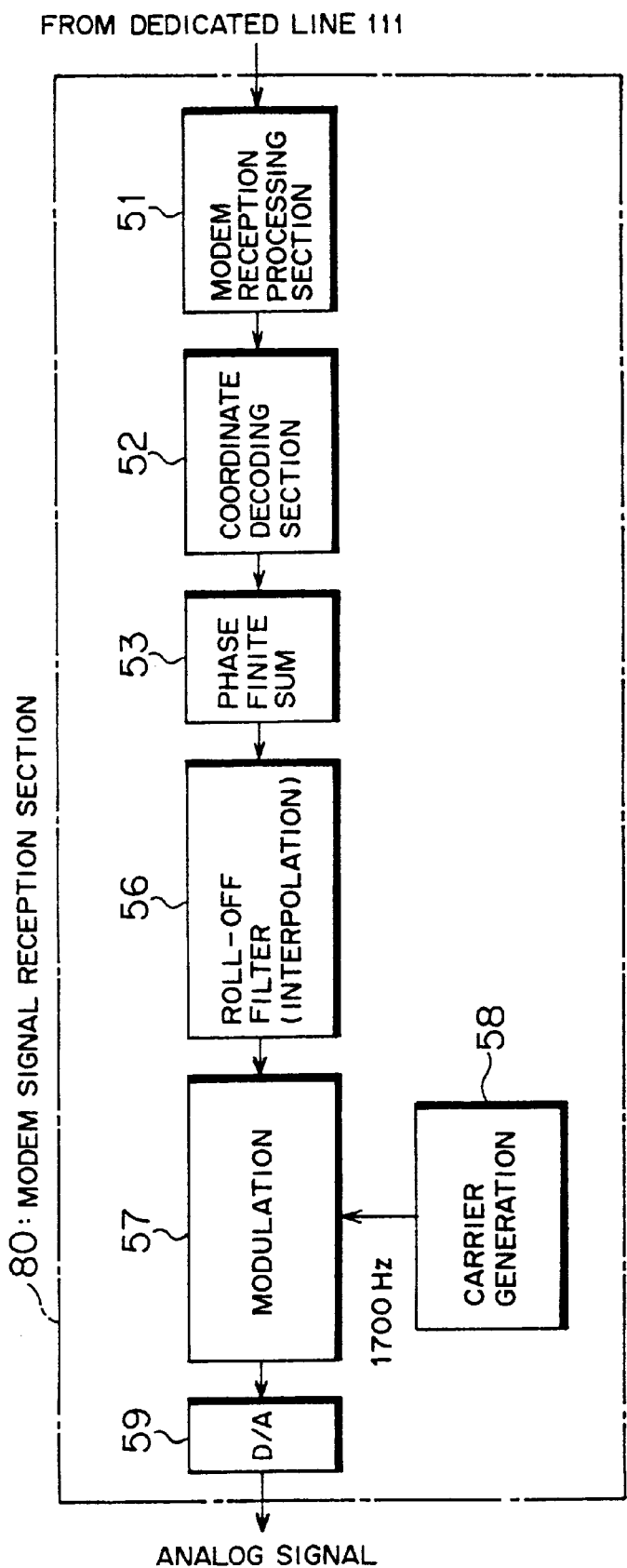

FIGS. 26 and 27 show in block diagrams a modes signal transmission section and a modem signal reception section, respectively, which form a modem according to a fourth embodiment of the present invention.

Also the modem according to the fourth embodiment can be applied as the modem 105 or 106 in such a communication system as described hereinabove with reference to FIG. 31.

Where the modem according to the fourth embodiment is applied as, or disposed at the position of, for example, the modem 105, a transmission analog signal from a terminal 101 or 102 accommodated in the private branch exchange 103 is transmitted to the modem 106 via the dedicated line 111 by a modem signal transmission section 79 shown in FIG. 26 whereas an analog signal from a terminal 109 or 110 on the opposing private branch exchange 108 side can be received by a modem signal reception section 80 shown in FIG. 27.

The modem signal transmission section 79 can perform demodulation and discrimination processing for a single tone signal from the in-band ringer 104 and transmit a resulting signal whereas the modem signal reception section 80 can perform decoding, modulation processing and so forth for a single tone signal (discrimination data) from the in-band ringer 107 and output a resulting signal to the in-band ringer 104.

As described above, the modem according to the fourth embodiment includes, similarly to the modem of the third embodiment described above, the modem signal transmission section 79 shown in FIG. 26 and the modem signal reception section 80 shown in FIG. 27.

The modem signal transmission section 79 is different from the modem signal transmission section 40 of the modem of the third embodiment described hereinabove in that it performs coordinate discrimination of a result of calculation of phase finite differences between successive data irrespective of whether or not an inputted analog signal is a single tone signal. Meanwhile, the modem signal reception section 80 is different from the modem signal reception section 50 of the modem of the third embodiment in that it performs modulation for a result of calculation of phase finite sums of a reception signal successively inputted to the modem signal reception section 80 irrespective of whether or not the reception signal is a single tone signal.

It is to be noted that, while the modem in the following description is applied as the modem 105 in the communication system shown in FIG. 31, naturally the opposing modem 106 has a similar construction to that of the modem 105.

Referring to FIG. 26, the modem signal transmission section 79 in the modem of the fourth embodiment includes an A/D conversion section 41, a demodulation section 42, a carrier generation section 43, a roll-off filter 44, a gain control section 45, a phase finite difference calculation section 46, a discrimination section 48 and a modem transmission processing section 49 similar to those of the modem signal transmission section 40 of the modem of the third embodiment described above, and further includes a delay section 75, a phase error detection section 76, a feedback control section 77 and a phase error addition section 78.

Figure 28:
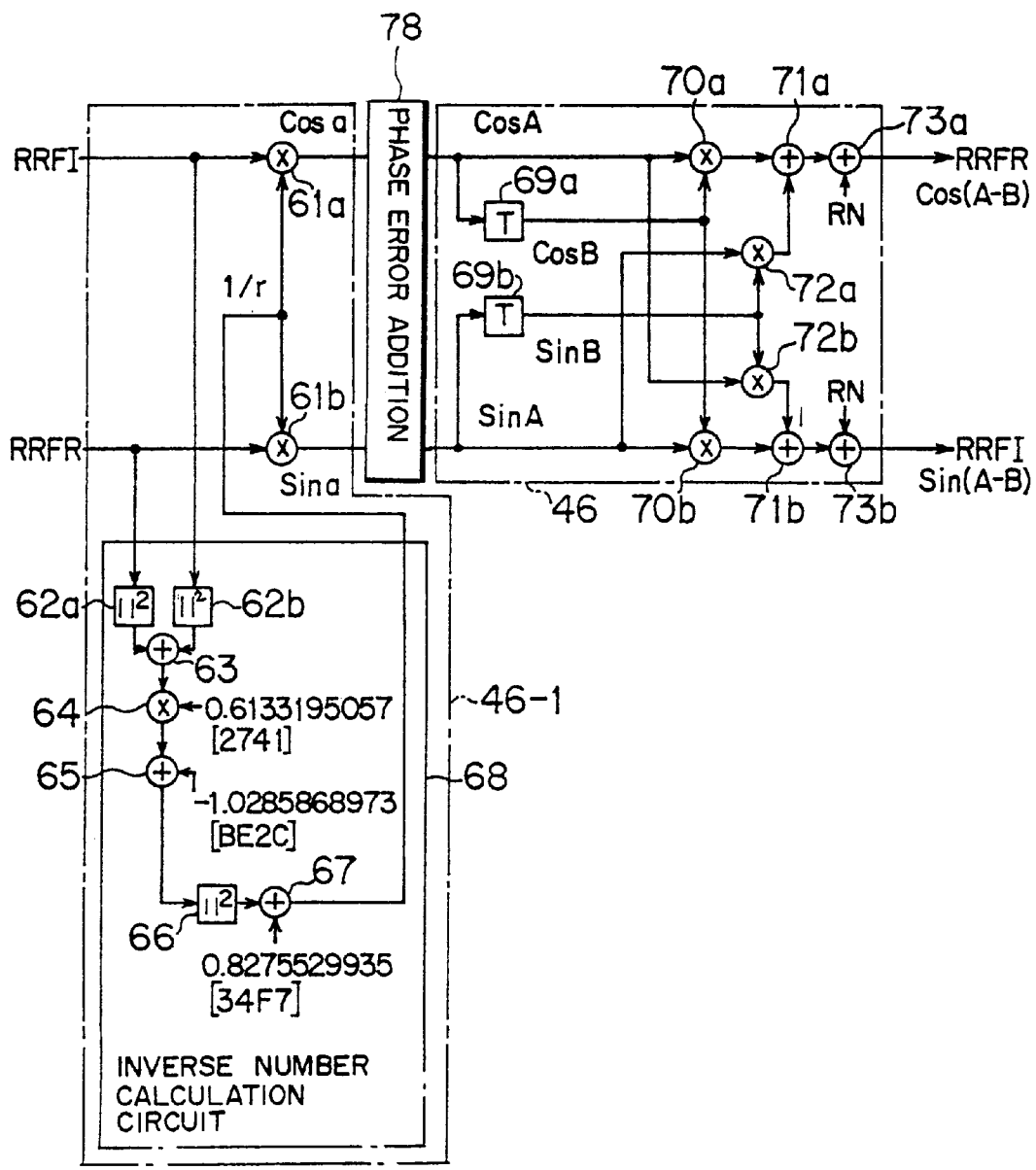
FIGS. 28 and 29 are block diagrams showing part of the modem signal transmission section shown in FIG. 26.

Further, similarly as in the modem signal transmission section 40 of the modem of the third embodiment described hereinabove (refer to FIG. 19), though not shown in FIG. 26, the modem signal transmission section 79 may include a level normalization section 46-1, for example, as shown in FIG. 28, in a stage preceding to the phase finite difference calculation section 46 so that, when necessary, phase finite differences may be calculated from successively inputted data which have been adjusted in level.

Figure 29:
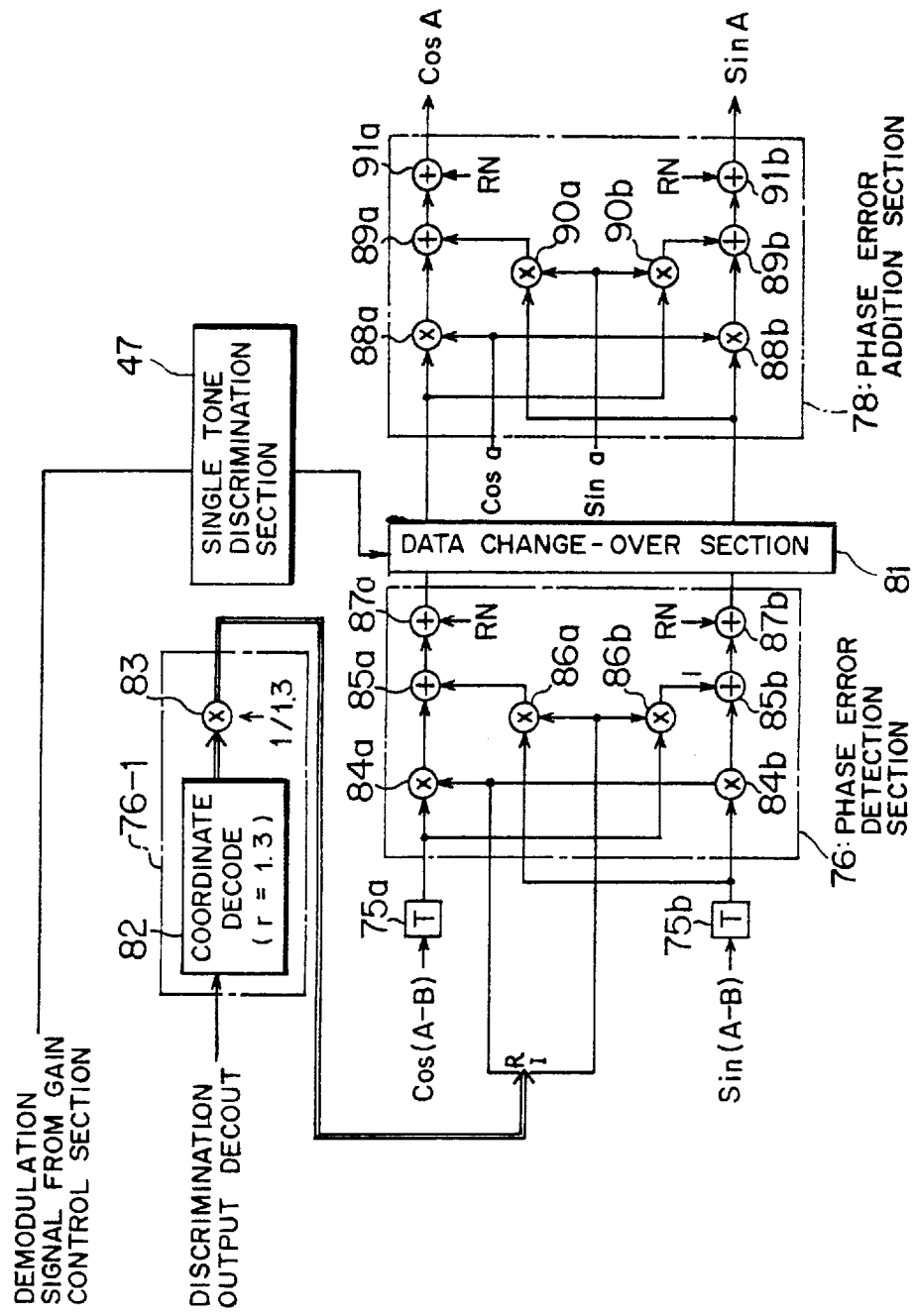
Figure 30:
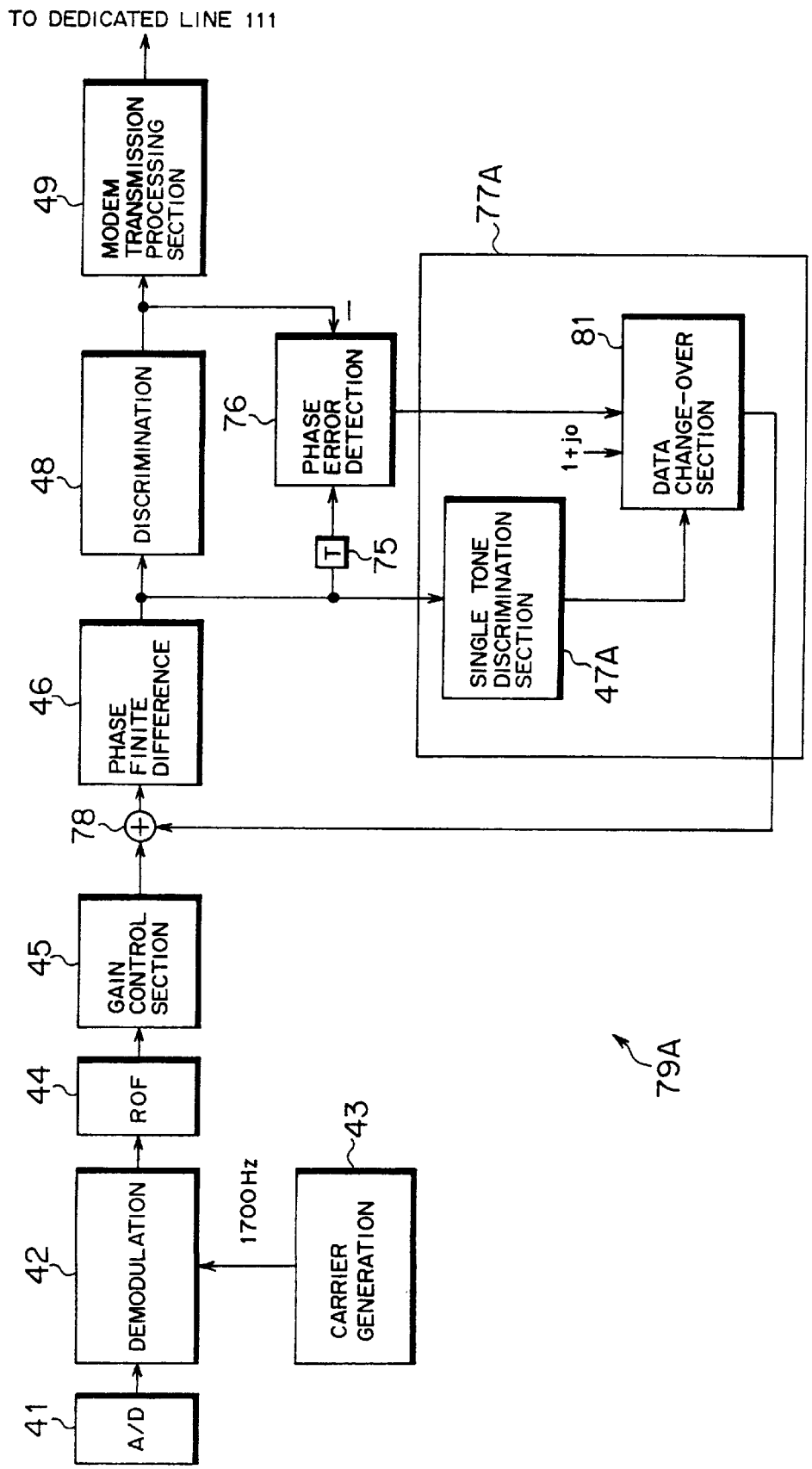
FIG. 30 is a block diagram showing a modification to the modem signal transmission section shown in FIG. 26.

The phase error addition section 78 is interposed between the level normalization section 46-1 and the phase finite difference calculation section 46 and feeds back phase error information, which will be hereinafter described, so as to be added to a demodulation signal, and particularly has such a construction as shown in FIG. 29.

The phase finite difference calculation section 46 calculates phase finite differences of a demodulation signal successively outputted from the demodulation section 42. In particular, whether or not a demodulation signal inputted to the phase finite difference calculation section 46 after processing of a demodulation signal from the demodulation section 42 by the roll-off filter 44, gain control section 45, level normalization section 46-1 and phase error addition section 78 is a single tone signal, the phase finite difference calculation section 46 calculates phase differences of the demodulation signal successively inputted thereto and outputs the phase differences to the discrimination section 48.

More particularly, the phase finite difference calculation section 46 calculates and outputs finite differences of a real component (cos A) and an imaginary component (sin A), whose maximum levels have been normalized by the level normalization section 46-1 and whose phase errors have been corrected by the phase error addition section 78, from data (cos B, sin B) inputted in the preceding cycle. In other words, the phase finite difference calculation section 46 outputs a phase finite difference [cos(A−B)] as a real component (RRFR) and outputs another phase finite difference [sin(A−B)] as an imaginary component (RRFI).

The discrimination section (coordinate discrimination section) 48 receives a signal for which decimation processing has been performed by the roll-off filter 44 (a phase finite difference signal from the phase finite difference calculation section 46) and performs coordinate discrimination for the phase finite difference signal thereby to obtain an amount of information necessary to transmit the signal demodulated into a base band signal over the dedicated line 111. The discrimination section 48 can have, similarly as in the modem of the third embodiment described hereinabove, a discrimination plane formed from, for example, such discrimination points as shown in FIG. 22.

It is to be noted that a result of the discrimination by the discrimination section 48 described above is outputted, similarly as in the modem of the third embodiment described hereinabove, to the modem transmission processing section 49 after modem processing is performed thereto so that it is transmitted to the opposing modem 106 via the dedicated line 111.

The phase error detection section 76 detects a phase error based on a result of the coordinate discrimination from the discrimination section 48 and a result of the phase finite difference calculation from the phase finite difference calculation section 46 inputted via the delay section 75.

In particular, the result of the phase finite difference calculation from the phase finite difference calculation section 46 to be inputted to the phase error detection section 76 is delayed by the delay section 75. Consequently, a phase error can be detected from the data with which the phase differences have been calculated and the corresponding data for which the coordinate discrimination has been performed by the discrimination section 48.

The phase error detection section 76 detects a phase error which arises from coordinate discrimination performed by the discrimination section 48 particularly for the data obtained by calculation of phase finite differences of a signal other than a single tone signal such as a FAX signal or a voice signal by the phase finite difference calculation section 46. The phase error detection section 76 particularly has such a construction as hereinafter described with reference to FIG. 29.

The feedback control section 77 shown in FIG. 26 includes a single tone discrimination section (transmission side single tone discrimination section) 47 having a function similar to that in the modem of third embodiment described hereinabove, and a data change-over section 81.

In particular, the single tone discrimination section 47 supervises the fixedness of the level of a demodulation signal inputted successively by a predetermined number of times (for example, 15 times) from the gain control section 45, and discriminates based on the fixedness whether or not the inputted discrimination signal is a single tone signal. A result of the discrimination is notified to the data change-over section 81.

More particularly, the single tone discrimination section 47 discriminates that the demodulation signal inputted successively by 15 times from the gain control section 45 is a single tone signal when the demodulation signal inputted successively by 15 times exhibits a fixed level. However, when the demodulation signal inputted successively by 15 times does not exhibit a fixed level, the single tone discrimination section 47 discriminates that the demodulation signal is a signal other than a single tone signal such as a FAX signal or a voice signal, and notifies the result of the discrimination to the data change-over section 81.

When the result of the discrimination of the single tone discrimination section 47 proves that the demodulation signal from the gain control section 45 is not a single tone signal, the data change-over section 81 selects and outputs the phase error detection information from the phase error detection section 76 to the phase error addition section 78. However, when the demodulation signal from the gain control section 45 is a single tone signal, the data change-over section 81 selects and outputs a signal indicating that the phase difference is "0", that is, 1+j0, to the phase error addition section 78.

In other words, under the control of the feedback control section 77, the phase error information detected by the phase error detection section 75 is fed back to the phase finite difference calculation section 46 when it is discriminated by the single tone discrimination section 47 that the demodulation signal is not a single tone signal, but when it is discriminated that the demodulation signal is a single tone signal, the feeding back of the phase error signal detected by the phase error detection section 76 to the phase finite difference calculation section 46 is stopped.

The phase error detection section 76, feedback control section 77 and phase error addition section 78 described above particularly have such constructions as shown in FIG. 29.

Here, a level adjustment section 76-1 which, for example, includes a coordinate decoding section 82 and a multiplication section 83 as shown in FIG. 29 may be provided in the preceding stage to the phase error detection section 76 so that level adjustment may be performed when necessary.

In particular, though not shown in FIG. 26, the level adjustment section 76-1 may detect a phase error using, when necessary, a discrimination output (DECOUT) successively inputted thereto after it undergoes coordinate decoding processing by the coordinate decoding section 82 and level adjustment (for example, multiplication of the discrimination output by "1/1.3") by the multiplication section 83.

Further, as seen in FIG. 29, the phase error detection section 76 receives a phase finite difference calculation result [actual component cos(A−B) and imaginary component sin(A−B)] from the phase finite difference calculation section 46 via delay elements 75a and 75b, respectively, which form the delay section 75, and receives a result of discrimination from the discrimination section 48, and calculates a phase difference between the phase difference calculation result and the discrimination result for each of the real component and the imaginary component.

It is to be noted that the phase error detection section 76 includes multiplication sections 84a and 84b, addition sections 85a and 85b, multiplication sections 86a and 86b and rounding processing sections 87a and 87b basically similar to those (reference symbols 70a to 73b) of the phase finite difference calculation section 46 described hereinabove, and performs phase finite difference calculation substantially similar to that of the expressions (3) and (4) given hereinabove.

The phase error addition section 78 adds phase error detection information (1+j0 when a single tone signal is inputted, but the output of the phase error detection section 76 when a signal other than a single tone signal is inputted) from the feedback control section 77 to the demodulation signal (cos a, sin a) adjusted in level by the level normalization section 46-1 for each of the real component and the imaginary component). Consequently, otherwise possible accumulation of phase errors arising from distribution of the discrimination section 48 can be suppressed.

Further, the phase error addition section 78 includes, as particularly shown in FIG. 29, multiplication sections 88a and 88b, addition sections 89a and 89b, multiplication sections 90a and 90b, and rounding processing sections 91a and 91b, and performs such phase error addition calculation as substantially given by the following expressions (5) and (6):

$$\cos(a+X) = \cos a \cdot \cos X - \sin a \cdot \sin X \quad (5)$$

$$\sin(a+X) = \sin a \cdot \cos X - \cos a \cdot \sin X \quad (6)$$

where "a" is the phase information of the demodulation signal from the gain control section 45, and "X" is the phase error detection information detected by the phase error detection section 76.

Meanwhile, the modem signal reception section 80 shown in FIG. 27 includes a modem reception processing section 51, a coordinate decoding section 52, a phase finite sum calculation section 53, a gain control section 55, a roll-off filter 56, a modulation section 57, a carrier generation section 58 and a D/A conversion section 59 similar to those of the modem signal reception section 50 of the modem of the third embodiment described hereinabove. However, the modem signal reception section 80 does not include the single tone discrimination section 54.

In particular, since the modem signal transmission section 79 of the modem 105 discriminates and transmits coordinates of a signal with which phase finite differences have been calculated irrespective of whether or not the signal is a single tone signal, the modem signal reception section 80 of the modem 106 need not discriminate whether or not the reception signal is a single tone signal, and consequently, such a single tone discrimination section 54 as in the modem of the third embodiment can be omitted.

Accordingly, in the modem signal reception section 80 of the modem according to the fourth embodiment, interpolation processing by the roll-off filter 56 is performed first and then modulation by the modulation section 57 is performed for a reception signal successively inputted to the modem signal reception section 80 after calculation of phase finite sums is performed for the reception signal by the phase finite sum calculation section 53 irrespective of whether or not the reception signal is a single tone signal.

It is to be noted that, similarly as in the modem of the third embodiment described above, the components of the modem signal transmission section 79 and modem signal reception section 80 except the A/D conversion section 41 and D/A conversion section 59 are formed from a DSP (Digital Signal Processor) and an MPU (Microprocessor Unit).

Also in the modem according to the fourth embodiment of the present invention having the construction described above, where it is applied as the modems 105 and 106 shown in FIG. 31, when communication is performed between telephone terminals 102 and 110 or between FAX terminals 101 and 109, dial information to which signal conversion has been performed by the in-band ringers 104 and 107 is communicated between the private branch exchanges 103 and 108, and an analog signal such as a voice signal or a FAX signal is communicated via the modems 105 and 106 and the dedicated line 111.

For example, when the modem signal transmission section 40 which forms the modem 105 tries to send out transmission data as a FAX signal from a FAX terminal 101 or as an analog signal from a telephone terminal 102 or the in-band ringer 104 to the dedicated line 111, signal processing is performed for the transmission data individually by the A/D conversion section 41, demodulation section 42 and roll-off filter 44, and then automatic gain control is performed by the gain control section 45.

Here, the single tone discrimination section 47 in the feedback control section 77 discriminates, when coordinate discrimination is to be performed for the transmission data to transmit the same, whether or not the transmission data is a single tone signal.

When it is discriminated by the single tone discrimination section 47 that the transmission data is a single tone signal, the phase finite difference calculation section 46 calculates, without receiving phase error information as a feedback signal from the feedback control section 77, phase finite differences of successive transmission data, and coordinate discrimination is performed for a result of the calculation of phase finite differences by the discrimination section 48, whereafter the discriminated coordinates are transmitted.

In other words, when it is discriminated that the transmission data is a single tone signal, a signal (1+j0) indicating that the phase error is "0" is added to transmission data in a stage preceding to phase difference calculation of the phase finite difference calculation section 46 by the phase error addition section 78 under the control of the feedback control section 77, and then, coordinate discrimination is performed for a result of later calculation of phase finite differences by the discrimination section 48 and the discriminated coordinates are transmitted.

On the other hand, when it is discriminated that the transmission data is a signal other than a single tone signal such as, for example, a voice signal or a FAX signal, the phase finite difference calculation section 46 calculates phase finite differences of successive transmission data, performs coordinate discrimination for a result of the calculation of phase finite differences and transmits resulting coordinates. Further, the phase error detection section 76 extracts an error between the calculation result of phase finite differences and the result of coordinate discrimination, and upon phase finite difference calculation for next transmission data, correction of the error is performed by the feedback control section 77 and the phase error addition section 78.

In other words, when it is discriminated that the transmission data is not a single tone signal, phase error information from the phase error detection section 76 is added to transmission data in a stage prior to phase finite difference calculation of the phase finite difference calculation section 46 under the control of the feedback control section 77 by the phase error addition section 78, and coordinate discrimination is performed for a result of later calculation of phase finite differences by the discrimination section 48 and resulting coordinates are transmitted.

Accordingly, accumulation of phase errors arising from discrimination of a phase finite difference signal from transmission data which is not a single tone signal can be suppressed by feedback control.

It is to be noted that transmission digital data (for example, of 19.2 kbps or more) for which coordinate discrimination has been performed in such a manner as described above by the discrimination section 48 is subject to modem processing by the modem transmission processing section 49 and is then sent out to the opposing (reception side) modem 106 (in-band ringer 107) via the dedicated line 111.

Further, the reception side modem 106 receives the transmission signal from the modem 105 via the dedicated line 111. Thus, after signal processing is performed by the modem reception processing section 51 and the coordinate decoding section 52, phase finite sums of successive reception data are calculated by the phase finite sum calculation section 53.

In particular, since coordinate discrimination is performed for transmission data after phase finite differences are calculated whether or not the transmission data is a single tone signal and resulting coordinates are transmitted by the modem transmission processing section 79 of the transmission side modem 105, the modem signal reception section 80 of the reception side modem 106 need not discriminate whether or not the reception signal is a single tone signal.

Accordingly, a result of calculation of phase finite sums of the phase finite sum calculation section 53 is modulated, after interpolation processing is performed for it by the roll-off filter 56, as it is by the modulation section 57.

It is to be noted that reception data (of the symbol rate) modulated in such a manner as described above is first converted into an analog signal (of the sample rate) by the D/A conversion section 59 and then outputted to the in-band ringer 107. The in-band ringer 107 can recognize a pure tone signal transmitted in the form of discrimination data of finite difference information as described above with certainty.

In this manner, with the modem according to the fourth embodiment of the present invention, since it includes the demodulation section 42, phase finite difference calculation section 46 and discrimination section 48, it is advantageous in that, similarly to the modem of the third embodiment described hereinabove, it can transmit such a pure tone signal that can satisfy a requested S/N ratio, and the tone signal can be recognized with certainty on the termination side.

First, since the modem according to the fourth embodiment includes the phase error detection section 76, feedback control section 77 and phase error addition section 78, when it is discriminated by the single tone discrimination section 47 that a demodulation signal is not a single tone signal, phase error information detected by the phase error detection section 76 can be fed back to the phase finite difference calculation section 46, but when it is discriminated that the demodulation signal is a single tone signal, the feeding back of phase error information detected by the phase error detection section 76 to the phase finite sum calculation section can be stopped. Consequently, otherwise possible accumulation of phase errors arising from discrimination of a phase finite difference signal from transmission data which is not a single tone signal can be suppressed by feedback control. The modem according to the fourth embodiment is further advantageous in that discrimination of a single tone signal need not be performed by the modem signal reception section and, while simplifying the construction of the modem signal reception section, a single tone signal, a voice signal or a FAX signal can be communicated with a reduced noise state.

e2. Modification to the Fourth Embodiment

In the modem signal transmission section 79 of the modem of the fourth embodiment described above, the single tone discrimination section 47 of the feedback control section 77 discriminates based the fixedness of the level of a signal inputted thereto whether or not transmission data or reception data are a single tone signal. However, the discrimination is not limited to the specific one, and whether or not transmission data or reception data are a single tone signal may be discriminated otherwise based on the fixedness of phase difference information of a successively inputted signal.

A modem modified in this manner may include a modem signal transmission section 79A which includes elements similar to those (refer to reference numerals 41 to 46, 48 and 49) of the modem signal transmission section 79 of the modem of the fourth embodiment described hereinabove except that it includes, in place of the single tone discrimination section 47 of the modem signal transmission section 79, a single tone discrimination section 47A which is different from the single tone discrimination section 47.

Also the modified modem may include a modem signal reception section similar to that (refer to reference numeral 80) of the modem of the fourth embodiment described hereinabove.

The single tone discrimination section 47A discriminates, similarly as in the modification to the modem of the third embodiment described hereinabove, when a demodulation signal inputted successively by a predetermined number of times (for example, 15 times) in units of a symbol is fixed, that the demodulation signal is a single tone signal, but discriminates in any other case that the demodulation signal is a signal other than a single tone signal such as, for example, a FAX signal or a voice signal.

More particularly, the single tone discrimination section 47A supervises the fixedness of phase differences from the phase finite difference calculation section 46, discriminates that the demodulation signal is a single tone signal when the demodulation signal exhibits a fixed phase difference successively for 15 symbols, and notifies the discrimination to the data change-over section 81. Consequently, the data change-over section 81 can output a signal (1+j0) indicating that the phase difference is "0" to the phase error addition section 78.

On the other hand, when the demodulation signal does not exhibit a fixed phase difference successively for 15 symbols, the single tone discrimination section 47A discriminates that the demodulation signal is a signal other than a single tone signal, and notifies the discrimination to the data change-over section 81. Consequently, the data change-over section 81 can select phase error detection information from the phase error detection section 76 and output it to the phase error addition section 78.

It is to be noted that the discrimination section 48 effects discrimination of a phase finite difference calculation result from the phase finite difference calculation section 46 irrespective of whether or not the demodulation signal is a single tone signal.

Consequently, where the demodulation signal is a single tone signal, such a pure tone signal that can satisfy a requested S/N ratio can be transmitted, but particularly where the demodulation signal is not a single tone signal, a phase error detected by the phase error detection section 76 is fed back upon next phase finite difference calculation. Consequently, otherwise possible accumulation of phase errors arising from discrimination of a phase finite difference signal from transmission data which is not a single tone signal can be suppressed.

Consequently, also with the present modified modem, since the modem signal transmission section 79A includes the demodulation section 42, phase finite difference calculation section 46 and discrimination section 48 as well as the phase error detection section 76, feedback control section 77A and phase error addition section 78, there is an advantage in that, similarly as in the modem of the third embodiment described hereinabove, such a pure tone signal that satisfies a requested S/N ratio can be transmitted, and the tone signal can be recognized with certainty on the termination side. The modified modem is further advantageous in that otherwise possible accumulation of phase errors arising from discrimination of a phase finite difference signal from transmission data which is not a single tone signal can be suppressed by feedback control and the modem signal reception section need not effect discrimination of a single tone signal any more, and consequently, a single tone signal, a voice signal or a FAX signal can be communicated in a reduced noise state while simplifying the construction of the modem signal reception section.

f. Others

While, in the embodiments described above, the present invention is applied to a modem as a communication apparatus which includes a transmission section and a reception section, according to the present invention, the modem signal transmission section 40, 40A, 79 or 79A or reception section 50, 50A, 80 or 80A described hereinabove may be applied merely as a transmission apparatus or a reception apparatus.

Further, while it is described in the description of the embodiments of the present invention that the modem according to the present invention is applied to the modems 105 and 106 connected to each other by the dedicated line 111, the modem can be applied to any other circuit over which a tone signal is transmitted from and received by the modem.

The present invention is not limited to the specifically described embodiment, and variations and modifications may be made without departing from the scope of the present invention.

What is claimed is:

1. A transmission apparatus wherein coordinates of an analog signal inputted thereto on a two-dimensional coordinate plane are discriminated and the signal with which the coordinates have been discriminated is transmitted as a digital signal, comprising:
   a frequency shifting section for performing frequency shifting for the inputted analog signal so that a tone signal of a single frequency may be a dc signal; and
   a coordinate discrimination section for discriminating coordinates on the two-dimensional coordinate plane of the analog signal for which the frequency shifting by said frequency shifting section has been performed.

2. A transmission apparatus as claimed in claim 1, further comprising:
   a discrimination point judgment section for receiving a result of the coordinate discrimination from said coordinate discrimination section and discriminating whether or not a same discrimination result is successively obtained;
   a phase difference detection section for detecting, when the same discrimination result successively appears, a phase difference between a phase of the signal for which the frequency shifting has been performed and a phase of an output signal of said coordinate discrimination section; and
   a phase correction section for correcting the phase of the signal frequency shifted by said frequency shifting section with the phase difference detected by said phase difference detection section and outputting the signal of the corrected phase to said coordinate discrimination section.

3. A transmission apparatus as claimed in claim 1, further comprising a demodulation section for demodulating the inputted analog signal with a carrier signal having a fixed frequency, said frequency shifting section shifting the frequency of the inputted analog signal by an amount corresponding to a finite difference between the frequency of the tone signal and the frequency of the carrier signal.

4. A transmission apparatus as claimed in claim 1, wherein an amount of the phase shifting by said frequency shifting section can be set in response to the single frequency of the tone signal included in the inputted analog signal.

5. A reception apparatus, comprising:
   a frequency shifting section for performing frequency shifting for a received digital signal so that a tone signal having a fixed frequency is reproduced from a dc signal; and
   a digital to analog conversion section for converting the digital signal, for which the frequency shifting has been performed by said frequency shifting section, into an analog signal.

6. A reception apparatus as claimed in claim 5, further comprising a modulation section for modulating the digital signal outputted from said frequency shifting section with a carrier signal having a fixed frequency, said frequency shifting section performing the frequency shifting for the digital signal by a frequency corresponding to a finite difference between the frequency of the tone signal and the frequency of the carrier signal.

7. A communication apparatus which includes a transmission section for converting an analog signal into digital signal and sending out the digital signal and a reception section for converting a received digital signal into an analog signal, comprising:
   a first frequency shifting section provided in said transmission section for performing frequency shifting for an analog signal inputted thereto so that a tone signal having a fixed frequency is converted into a dc signal;
   a coordinate discrimination section provided in said transmission section for discriminating coordinates of a signal outputted from said first frequency shifting section on a two-dimensional coordinate plane; and
   a second frequency shifting section provided in said reception section for performing frequency shifting for a digital signal received so that a dc signal is converted into a tone signal having a fixed frequency.

8. A communication apparatus as claimed in claim 7, wherein the frequency shifting by said second frequency shifting section corresponds to reverse frequency shifting to the frequency shifting by said first frequency shifting section.

9. A communication apparatus as claimed in claim 7, further comprising:

a demodulation section for demodulating an analog signal inputted thereto with a first carrier signal having a fixed frequency and outputting the demodulated signal to said first frequency shifting section; and a modulation section for modulating a signal outputted from said second frequency shifting section with a second carrier signal having another particular frequency and outputting the modulated signal;

said first frequency shifting section performing the frequency shifting for the signal inputted thereto by a frequency corresponding to a finite difference between the frequency of the tone signal and the frequency of the first carrier signal;

said second frequency shifting section performing the frequency shifting for the signal inputted thereto by a frequency corresponding to a finite difference between the frequency of the tone signal and the frequency of the second carrier signal.

10. A communication apparatus as claimed in claim 8, further comprising:

a demodulation section for demodulating an analog signal inputted thereto with a first carrier signal having a fixed frequency and outputting the demodulated signal to said first frequency shifting section; and a modulation section for modulating a signal outputted from said second frequency shifting section with a second carrier signal having another particular frequency and outputting the modulated signal;

said first frequency shifting section performing the frequency shifting for the signal inputted thereto by a frequency corresponding to a finite difference between the frequency of the tone signal and the frequency of the first carrier signal;

said second frequency shifting section performing the frequency shifting for the signal inputted thereto by a frequency corresponding to a finite difference between the frequency of the tone signal and the frequency of the second carrier signal.

11. A communication apparatus as claimed in claim 7, further comprising:

a discrimination point judgment section for receiving a discrimination signal outputted from said coordinate discrimination section and discriminating whether or not the discrimination signal successively inputted thereto exhibits a same discrimination result;

a phase difference detection section for detecting, when said discrimination point judgment section discriminates that the same discrimination result successively appears, a phase difference between a phase of the signal outputted from said frequency shifting section and a phase of the signal outputted from said coordinate discrimination section; and a phase correction section for correcting the phase of the signal outputted from said frequency shifting section based on the phase difference detected by said phase difference detection section.

12. A communication apparatus as claimed in claim 9, further comprising:

a discrimination point judgment section for receiving a discrimination signal outputted from said coordinate discrimination section and discriminating whether or not the discrimination signal successively inputted thereto exhibits a same discrimination result;

a phase difference detection section for detecting, when said discrimination point judgment section discriminates that the same discrimination result successively appears, a phase difference between a phase of the signal outputted from said frequency shifting section and a phase of the signal outputted from said coordinate discrimination section; and a phase correction section for correcting the phase of the signal outputted from said frequency shifting section based on the phase difference detected by said phase difference detection section.

13. A communication apparatus as claimed in claim 10, further comprising:

a discrimination point judgment section for receiving a discrimination signal outputted from said coordinate discrimination section and discriminating whether or not the discrimination signal successively inputted thereto exhibits a same discrimination result;

a phase difference detection section for detecting, when said discrimination point judgment section discriminates that the same discrimination result successively appears, a phase difference between a phase of the signal outputted from said frequency shifting section and a phase of the signal outputted from said coordinate discrimination section; and a phase correction section for correcting the phase of the signal outputted from said frequency shifting section based on the phase difference detected by said phase difference detection section.

* * * * *